(12) United States Patent
Hao et al.

(10) Patent No.: US 6,832,127 B1
(45) Date of Patent: Dec. 14, 2004

(54) MOTOR CONTROLLER

(75) Inventors: Shuang-Hui Hao, Fukuoka (JP);
Ryuichi Oguro, Fukuoka (JP);
Hidekazu Miyagawa, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/787,401

(22) PCT Filed: Sep. 16, 1999

(86) PCT No.: PCT/JP99/05064
§ 371 (c)(1),
(2), (4) Date: Mar. 19, 2001

(87) PCT Pub. No.: WO00/17998
PCT Pub. Date: Mar. 30, 2000

(30) Foreign Application Priority Data

Sep. 18, 1998 (JP) ........................... 10-264336

(51) Int. Cl.$^7$ .............................................. G06F 19/00
(52) U.S. Cl. ........................ 700/170; 318/799; 318/560; 318/615; 318/689; 318/432; 388/801
(58) Field of Search .................. 700/170; 388/801; 318/799, 560, 561, 615, 689, 431, 432

(56) References Cited

U.S. PATENT DOCUMENTS

| 5,206,575 A | * | 4/1993 | Nakamura et al. | ........... 318/807 |
|---|---|---|---|---|
| 5,428,285 A | * | 6/1995 | Koyama et al. | ............. 318/799 |
| 5,455,763 A | | 10/1995 | Feingold | ...................... 364/149 |
| 5,511,930 A | * | 4/1996 | Sato et al. | ................... 414/676 |
| 5,646,492 A | * | 7/1997 | Nagano et al. | ............. 318/432 |
| 5,971,579 A | * | 10/1999 | Kim | ............................ 700/42 |
| 6,198,246 B1 | * | 3/2001 | Yutkowitz | ................... 318/561 |

FOREIGN PATENT DOCUMENTS

| JP | 3-268103 | 11/1991 | .......... G05B/13/02 |
|---|---|---|---|
| JP | 4-325886 | 11/1992 | ............. H02P/5/00 |
| JP | 7-213088 | 8/1995 | ............. H02P/5/41 |
| JP | 9-131087 | 5/1997 | ............. H02P/5/00 |

* cited by examiner

Primary Examiner—Albert W. Paladini
Assistant Examiner—Charles Kasenge

(57) ABSTRACT

A motor controller comprising a machine system (12) having a load machine (1), a transmission mechanism (2) for transmitting power, and a motor for driving the load machine through the transmission mechanism; a simulator unit (11) having a numeric model (9) including the machine system, a simulation control section (19) for giving a torque command to the numeric model by using an observable quantity of state of the numeric model, and an evaluating section (10) for sending a control parameter to the simulation control section and an actual control unit; and the actual control unit (18) having an actual control section which receives an observable quantity of state of an actual system and has the same structure as that of the simulator unit and adapted to supply a torque signal to the motor serving as a drive source. Therefore the control gain of a motor controller can be automatically adjusted quickly and optimally.

16 Claims, 55 Drawing Sheets

US 6,832,127 B1

MOTOR CONTROLLER

TECHNICAL FIELD OF THE INVENTION

The present invention relates to an apparatus for controlling an electric motor (direct current motor, induction motor, synchronous motor, linear motor, etc.) that drives a load machine such as, for example, a table of a machine tool, and an arm of a robot, etc.

BACKGROUND ARTS

A description is given of a construction of a prior art example on the basis of drawings. FIG. 79 shows a block diagram of an apparatus for controlling a prior art electric motor, which has been disclosed by Japanese Laid-Open Patent Publication No. Hei-9-131087. In FIG. 79, 20 denotes a servo system, 21 denotes a controlling portion, 22 denotes an approximate model, 23 denotes a model identifying portion, 24 denotes a control gain adjusting portion, 25 denotes a changeover means, 26 denotes a canonical model and 27 denotes an evaluation calculating portion.

Next, a description is further given of actions of the prior art example described above. As shown in FIG. 79, the prior art example is provided with a model identifying portion 23 to prepare an approximate model 22, and a control gain adjusting apparatus 24 that carries out automatic adjustment of control gains by using a genetic algorithm method. In the model identifying portion 23, appropriate models to perform adjustment are defined in advance in the approximate model 22, and only unknown constants are identified by the least-squares method. In the control gain adjusting apparatus 24, the control gains are optimized by utilizing the genetic algorithm. Also, during the adjustment, the control gain adjusting apparatus 24 is changed to the side of an object to be controlled, and a normal operation is commenced. By the abovementioned adjusting apparatus and adjustment method, the control gain of a servo system can be optimally adjusted at a high speed without being biased by a local solution.

However, in the prior art apparatus, only the real control portion 21 is utilized when optimizing the control gain, and this may cause an inconvenience in the applications thereof. In addition, since an identifying instruction is the same as a real instruction, it is difficult to change the instruction. There is another problem in that a longer adjustment time is required.

It is therefore an object of the present invention to automatically and optimally adjust the control gain at a high speed.

DISCLOSURE OF THE INVENTION

An apparatus for controlling an electric motor according to the invention comprises: a mechanical system provided with a load machine, a transmission mechanism to transmit power, and an electric motor that drives the load machine via the transmission mechanism; a simulator portion provided with a numerical model including the mechanical system, a simulation controlling portion to provide the numerical model with a torque instruction by using an observable quantity of state of the numerical model, and an evaluation portion to provide the simulation controlling portion and real controlling portion with control parameters; and a real controlling portion having the same structure as that of the simulator portion, in which an observable quantity of state from the real system is used as an input; and wherein the real controlling portion supplies a torque signal to the electric motor that is a drive source.

Further, an apparatus for controlling an electric motor according to the invention is provided with a means for supplying control parameters, which are obtained by the evaluation portion of the simulation portion to the real control portion after the simulation portion is driven prior to a real operation and a simulation evaluation function for evaluating the behavior of the numerical model satisfies the initial conditions established in advance.

Also, an apparatus for controlling an electric motor according to the invention is provided with the numerical model that provides a simulation speed signal and a simulation position signal based on a simulation torque with respect to a given real position instruction; a simulation PID controlling portion that provides a simulation torque instruction to the numerical model on the basis of the simulation speed signal and simulation position signal of the numerical model; and a real PID controlling portion that provides a real torque signal on the basis of the real position instruction, real position signal and real speed signal.

Further, an apparatus for controlling an electric motor according to the invention is provided with a numerical model that provides a simulation position signal on the basis of a simulation torque instruction; a simulation PID controlling portion that provides the numerical model with the simulation torque instruction on the basis of a simulation position signal of the numerical model; and a real PID controlling portion that provides a real torque signal on the basis of the real position instruction and the real position signal.

In addition, an apparatus for controlling an electric motor according to the invention is provided with a numerical model that provides a simulation speed signal on the basis of a simulation torque instruction with respect to a given real speed instruction; a simulation PID controlling portion that provides the numerical model with a simulation torque instruction on the basis of the simulation speed signal of the numerical model; and a real PID controlling portion that provides a real torque signal on the basis of the real speed instruction and real speed signal.

Further, an apparatus for controlling an electric motor according to the invention is provided with a simulation controlling portion consisting of a simulation PID controlling portion, which provides the numerical model with a simulation torque instruction on the basis of the simulation speed signal and simulation position signal of the numerical model, and a simulation compensating portion; and a real controlling portion consisting of a real PID controlling portion that provides a real torque signal based on the real position instruction, real position signal and real speed signal, and a real compensating portion.

Still further, an apparatus for controlling an electric motor according to the invention is provided with a simulation controlling portion consisting of a simulation PID controlling portion, which provides the numerical model with a simulation torque instruction on the basis of the simulation signal of the numerical model, and a simulation compensating portion; and a real controlling portion consisting of a real PID controlling portion, which provides a real torque on the basis of the real position instruction and real position signal, and a real compensating portion.

Also, an apparatus for controlling an electric motor according to the invention is provided with a real controlling portion consisting of a simulation PI controlling portion that provides the numerical model with a simulation torque instruction on the basis of a simulation speed signal of the numerical model, a simulation compensating portion, a real PI controlling portion that provides a real torque signal on the basis of a real speed instruction and the real speed signal, and a real compensating portion.

Also, an apparatus for controlling an electric motor according to the invention is provided with a simulation controlling portion that is constructed of a simulation PID controlling portion, which provides the numerical model with a simulation torque instruction on the basis of a simulation speed signal of the numerical model and a simulation position signal thereof, and a simulation compensating portion consisting of a plurality of types of simulation compensators; and a real controlling portion that is constructed of a real PID controlling portion, which provides a real torque signal on the basis of a real position instruction, the real position signal and the real speed signal, and a real compensating portion consisting of a plurality of types of the simulation compensators.

Also, an apparatus for controlling an electric motor according to the invention is provided with a simulation controlling portion that is constructed of a simulation PID controlling portion, which provides the numerical model with a simulation torque instruction on the basis of a simulation position signal of the numerical model, and a simulation compensating portion consisting of a plurality of types of simulation compensators; and a real controlling portion that is constructed of a real PID controlling portion, which provides a real torque signal on the basis of a real position instruction and the real position signal, and a real compensating portion consisting of a plurality of simulation compensators.

Further, an apparatus for controlling an electric motor according to the invention is provided with a simulation controlling portion that is constructed of a simulation PI controlling portion, which provides the numerical model with a simulation torque instruction on the basis of a simulation speed signal of the numerical model, and a simulation compensating portion consisting of a plurality of types of simulation compensators; and a real controlling portion that is constructed of a real PI controlling portion, which provides a real torque signal on the basis of a real speed instruction and the real speed signal, and a real compensating portion consisting of a plurality of simulation compensators.

In addition, an apparatus for controlling an electric motor according to the invention is provided with a means for preparing a numerical model by using an observable quantity of state, which is obtained by driving the real system based on the initial controlling parameters initially established by the real controlling portion, and an initial torque instruction given to a real driving portion in the initial state where the numerical model of the simulator portion is constituted; driving the real system after the controlling parameters are provided; re-determining the numerical model of the simulator portion by using, where the behaviors of the real system do not satisfy the on-real running evaluation function established in advance, the real running torque instruction at that time and the observable quantity of the real running state of the real system; and re-starting the simulator portion to re-determine the controlling parameters.

Further, an apparatus for controlling an electric motor according to the invention is provided with a simulation controlling portion that is constructed of a simulation PID controlling portion, which provides the numerical model with a simulation torque instruction on the basis of a simulation speed signal of the numerical model and simulation position signal thereof, and a simulation compensating portion consisting of a plurality of types of simulation compensators; and a real controlling portion that is constructed of a real PID controlling portion, which provides a real torque signal on the basis of a real position instruction, the real position signal and the real speed signal, and a real compensating portion consisting of a plurality of simulation compensators.

Still further, an apparatus for controlling an electric motor according to the invention is provided with a simulation controlling portion that is constructed of a simulation PID controlling portion, which provides the numerical model with a simulation torque instruction on the basis of a simulation position signal of the numerical model, and a simulation compensating portion consisting of a plurality of types of simulation compensators; and a real controlling portion that is constructed of a real PID controlling portion, which provides a real torque signal on the basis of a real position instruction and the real position signal, and a real compensating portion consisting of a plurality of simulation compensators.

Also, an apparatus for controlling an electric motor according to the invention is provided with a simulation controlling portion that is constructed of a simulation PI controlling portion, which provides the numerical model with a simulation torque instruction on the basis of a simulation speed signal of the numerical model, and a simulation compensating portion consisting of a plurality of types of simulation compensators; and a real controlling portion that is constructed of a real PI controlling portion, which provides a real torque signal on the basis of a real speed instruction and the real speed signal, and a real compensating portion consisting of a plurality of simulation compensators.

Therefore, according to claims 1 through 3 of the invention, a real position signal and a real speed signal can be detected by an observation device 1. A simulation speed signal and a simulation position signal are outputted by a 2-inertia numerical model. A simulation torque signal is outputted by the simulation controlling portion. An evaluation portion outputs the first simulation position instruction signal, a simulation gain and a real gain. The machine system is controlled at the optimal gain by the real controlling portion.

Therefore, according to claim 4 of the invention, a real position signal is detected by the observation device 1. A simulation position signal is outputted by the 2-inertia numerical model. A simulation torque signal is outputted by the simulation controlling portion. The evaluation portion outputs the first simulation position instruction signal, a simulation gain and a real gain. The machine system is controlled at the optimal gain by the real controlling portion.

Also, according to claim 5 of the invention, the real speed signal is detected by the observation device 1. A simulation speed signal is outputted by the 2-inertia numerical model. A simulation torque signal is outputted by the simulation controlling portion. The evaluation portion outputs the first simulation speed instruction signal, simulation gain and real gain. The machine system is controlled at the optimal gain by the real controlling portion.

Therefore, according to claim 6 of the invention, the real position signal and real speed signal are detected by the observation device 1. A simulation speed signal and a simulation position signal are outputted by the 2-inertia numerical model. A simulation torque signal is outputted by the simulation controlling portion. The evaluation portion outputs the first simulation position instruction signal, simulation gain and real gain. The machine system is controlled at the optimal compensation gain and optimal feedback gain by the real controlling portion.

Also, according to claim 7 of the invention, the real position signal is detected by the observation device 1. A simulation position signal is outputted by the 2-inertia numerical model. A simulation torque signal is outputted by the simulation controlling portion. The evaluation portion outputs the first simulation position instruction signal, simulation gain and real gain. The machine system is controlled at the optimal compensation gain and optimal feedback gain by the real controlling portion.

Therefore, according to claim 8 of the invention, the real speed signal is detected by the observation device 1. A simulation speed signal is outputted by the 2-inertia numerical model. A simulation torque signal is outputted by the simulation controlling portion. The evaluation portion outputs the first simulation speed instruction signal, simulation gain and real gain. The machine system is controlled at the optimal compensation gain and optimal feedback gain by the real controlling portion.

Therefore, according to claim 9 of the invention, the real position signal and real speed signal are detected by the observation device 1. A simulation speed signal and a simulation position signal are outputted by the 2-inertia numerical model. A simulation torque signal is outputted by the simulation controlling portion. The evaluation portion outputs the first simulation position instruction, simulation gain and real gain. The machine system is controlled by the optimal compensator at the optimal compensation gain and optimal feedback gain by the real controlling portion.

Also, according to claim 10 of the invention, a real position signal is detected by the observation device 1. A simulation position signal is outputted by the 2-inertia numerical model. A simulation torque signal is outputted by the simulation controlling portion. The evaluation portion outputs the first simulation position instruction signal, and simulation gain, and real gain. The machine system is controlled at the optimal compensation gain and optimal feedback gain by the real controlling portion, using an optimal compensator.

Also, according to claim 11 of the invention, the real speed signal is detected by the observation device 1. A simulation speed signal is outputted by the 2-inertia numerical model. A simulation torque signal is outputted by the simulation controlling portion. The evaluation portion outputs the first simulation speed instruction signal, simulation gain and real gain. The machine system is controlled at the optimal compensation gain and optimal feedback gain by the real controlling portion, using an optimal compensator.

Therefore, according to claims 12 and 13 of the invention, a real position signal and a real speed signal are detected by the observation device 1. A simulation speed signal and a simulation position signal are outputted by the 2-inertia numerical model. A simulation torque signal is outputted by the simulation controlling portion. First, the evaluation portion identifies optimal parameters of the 2-inertia numerical model, which approximate the machine system, whereby the first simulation position instruction signal, simulation gain and real gain are outputted without directly measuring the parameters of the machine system. The machine system is controlled at the optimal compensation gain and optimal feedback gain by the real controlling portion, using an optimal compensator.

Therefore, according to claim 14 of the invention, a real position signal is detected by the observation device 1. A simulation position signal is outputted by the 2-inertia numerical model. A simulation torque signal is outputted by the simulation controlling portion. First, the evaluation portion identifies optimal parameters of the 2-inertia numerical model, which approximate the machine system, whereby the first simulation position instruction signal, simulation gain and real gain are outputted without directly measuring the parameters of the machine system. The machine system is controlled at the optimal compensation gain and optimal feedback gain by the real controlling portion, using an optimal compensator.

Also, according to claim 15 of the invention, a real speed signal is detected by the observation device 1. A simulation speed signal is outputted by the 2-inertia numerical model. A simulation torque signal is outputted by the simulation controlling portion. First, the evaluation portion identifies optimal parameters of the 2-inertia numerical model, which approximate the machine system, whereby the first simulation speed instruction signal, simulation gain and real gain are outputted without directly measuring the parameters of the machine system. In the real controlling portion, the machine system is controlled at the optimal compensation gain and optimal feedback gain by an optimal compensator.

BEST MODE FOR CARRYING OUT THE INVENTION

Figure 1:
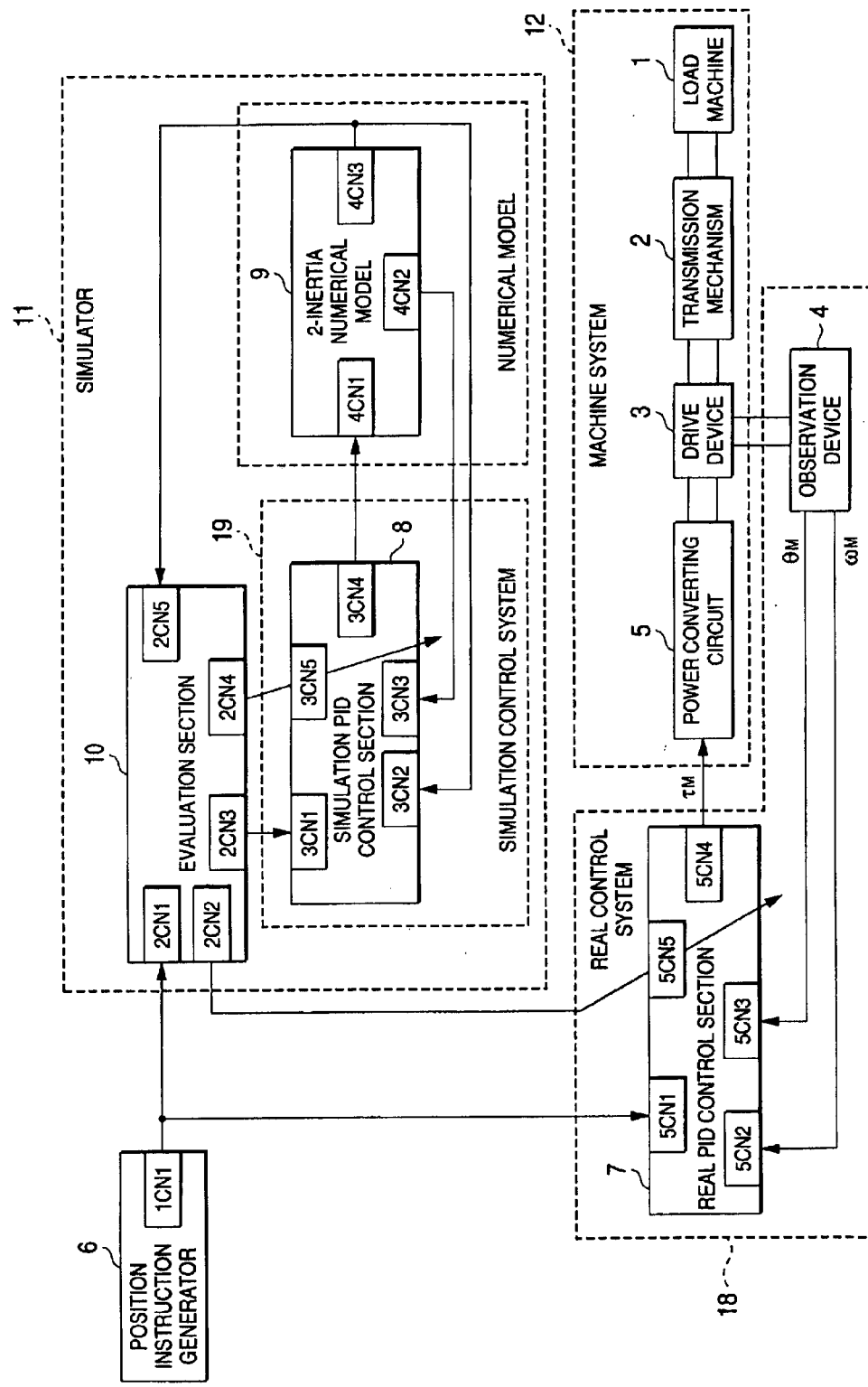
FIG. 1 is a block diagram showing a first embodiment of the invention.

A description is given of the embodiments of the invention with reference to the accompanying drawings. First, the first embodiment of the invention is described with reference to FIG. 1 through FIG. 9. FIG. 1 is a block diagram showing the entirety of the first embodiment of the invention. In FIG. 1, the first embodiment of the invention is provided with a load machine 1, a transmission mechanism 2, a drive unit 3, a power converting circuit 5, an observation device 4, a position instruction generator 6, a real PID controlling portion 7, a simulation PID controlling portion 8, a 2-inertia numerical model 9, and an evaluation portion 10. The load machine 1, transmission mechanism 2, drive unit 3, observation device 4, power converting circuit 5 and position instruction generator 6 are identical to those in the prior art apparatus.

Figure 2:
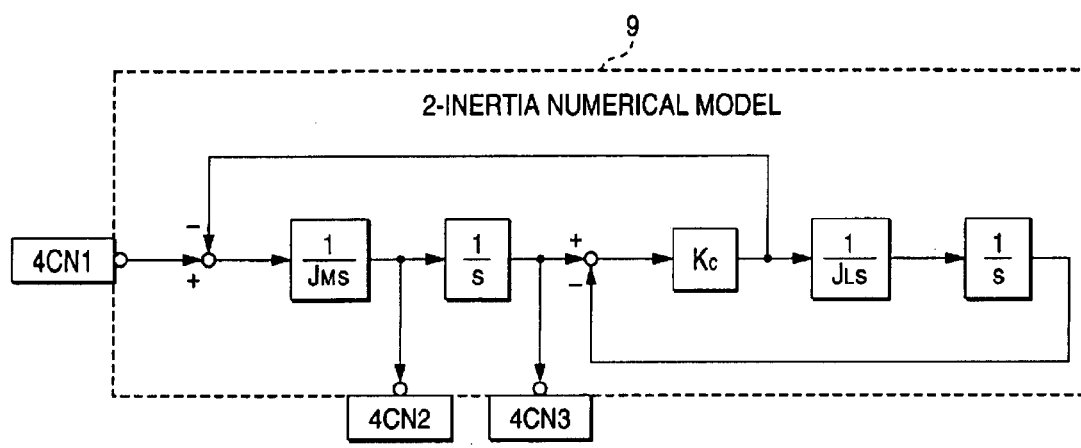
FIG. 2 is a block diagram showing a 2-inertia numerical model according to the first embodiment of the invention.

FIG. 2 is a block diagram showing a detailed construction of the above-described 2-inertia numerical model 9. In FIG. 2, the 2-inertia numerical model 9 consists of 2-inertia systems and one spring system.

Figure 3:
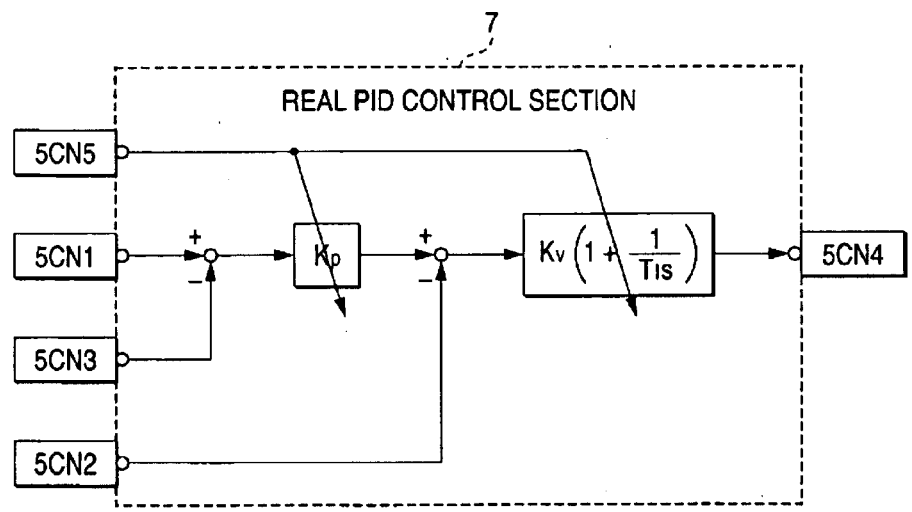
FIG. 3 is a block diagram showing a real PID controlling portion according to the first embodiment of the invention.

FIG. 3 is a block diagram showing a detailed construction of the above-described PID controlling portion 7. In FIG. 3, the real PID controlling portion 7 is constructed of a real position controlling portion and a real speed controlling portion.

Figure 4:
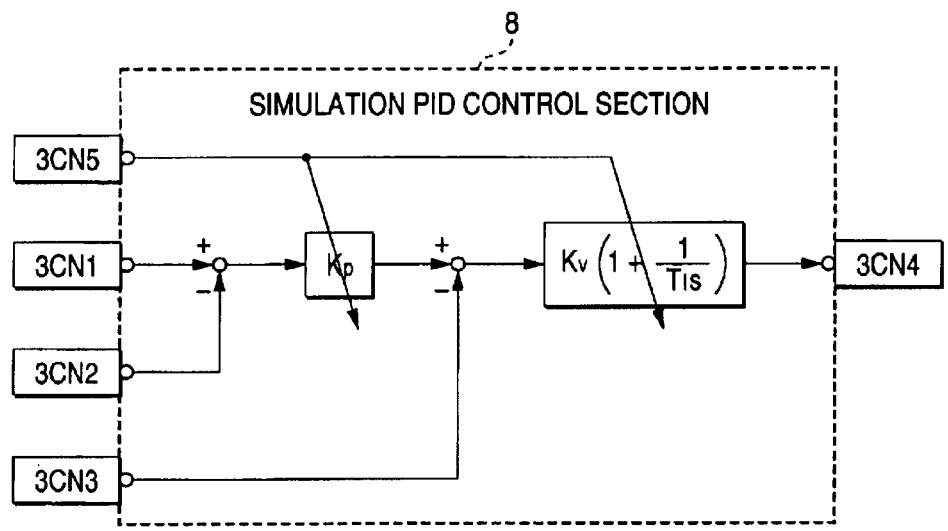
FIG. 4 is a block diagram showing a simulation PID controlling portion according to the first embodiment of the invention.

FIG. 4 is a block diagram showing a detailed construction of the above-described simulation PID controlling portion 7. In FIG. 4, the simulation PID controlling portion 8 has the same structure as that of the real PID controlling portion 7, and is constructed of a simulation position controlling portion and a simulation speed controlling portion.

Figure 5:
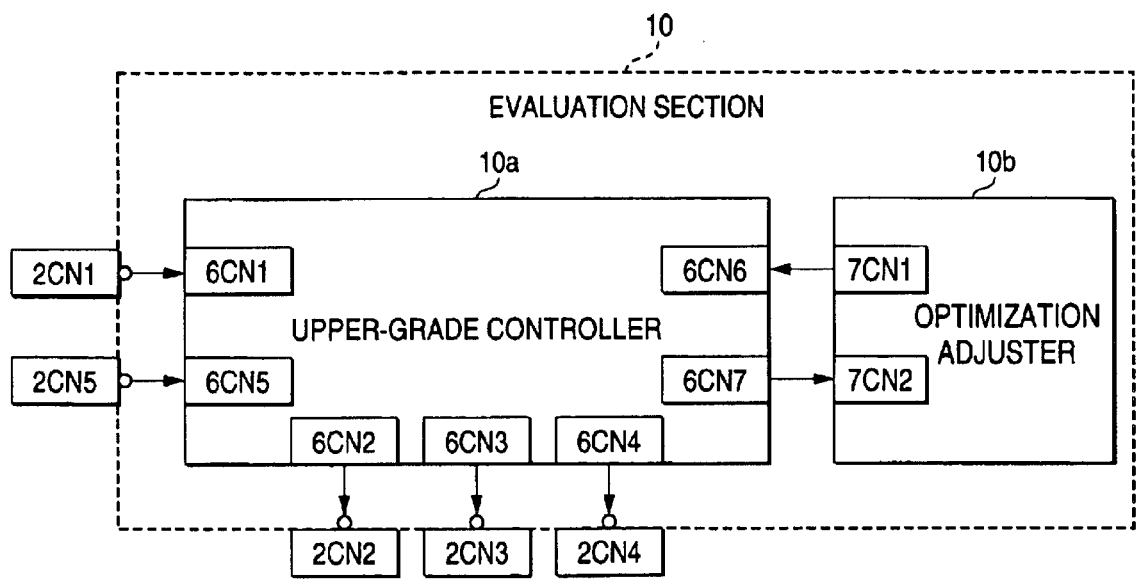
FIG. 5 is a block diagram showing an evaluation portion according to the first embodiment of the invention.

FIG. 5 is a block diagram showing a detailed construction of the above-described evaluation portion 10. In FIG. 5, the evaluation portion 10 is constructed of the upper-grade controller 10a and the optimization adjuster 10b.

Figure 6:
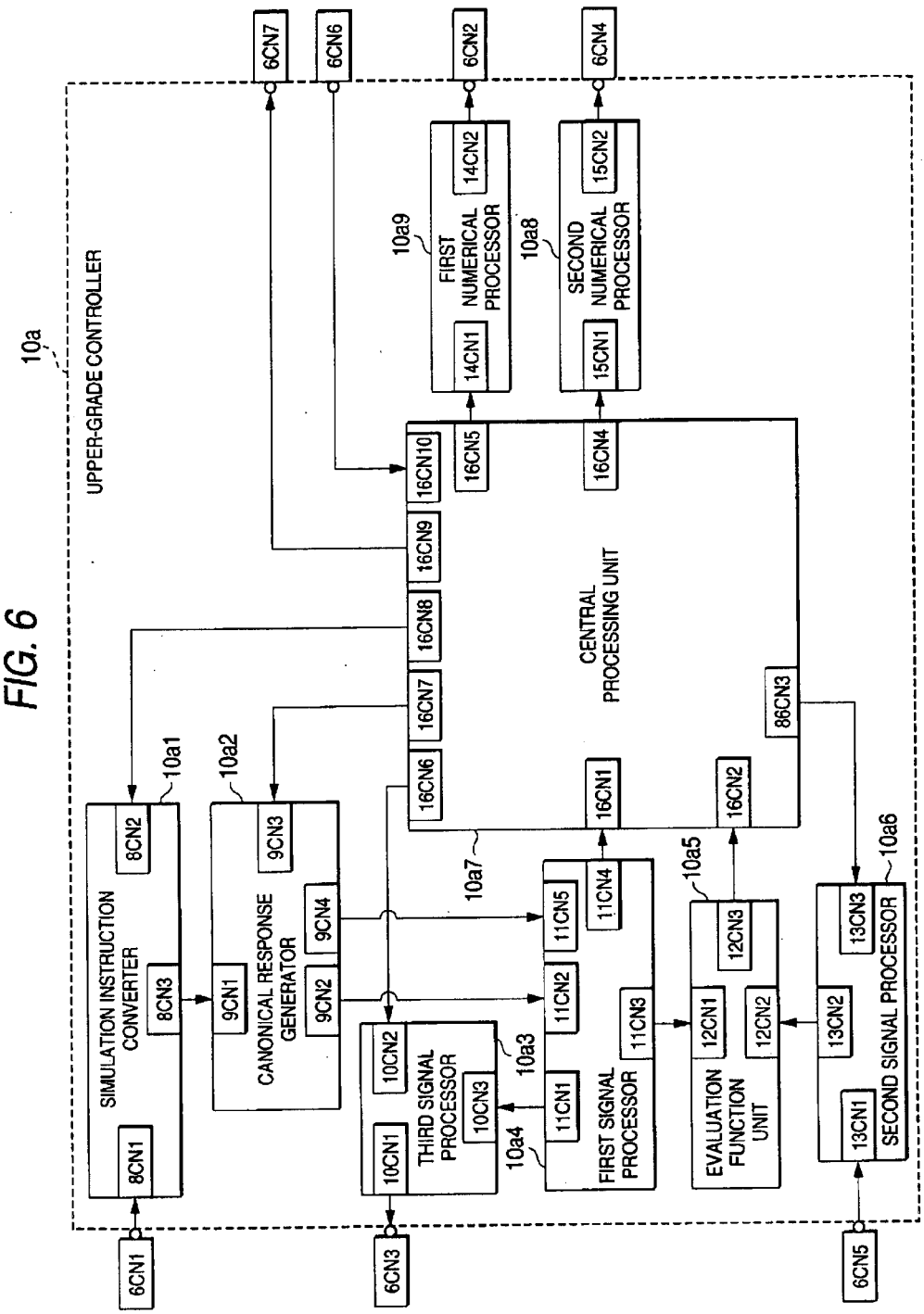
FIG. 6 is a block diagram showing an upper-grade controller according to the first embodiment of the invention.

FIG. 6 is a block diagram showing a detailed construction of the above-described upper-grade controller 10a. In FIG. 6, the upper-grade controller 10a is constructed of a simulation instruction converter 10a1, a canonical response generator 10a2, the third signal processor 10a3, the first signal processor 10a4, an evaluation function unit 10a5, the second signal processor 10a6, a central processing unit 10a7, the second numerical processor 10a8, and the first numerical processor 10a9.

Figure 7:
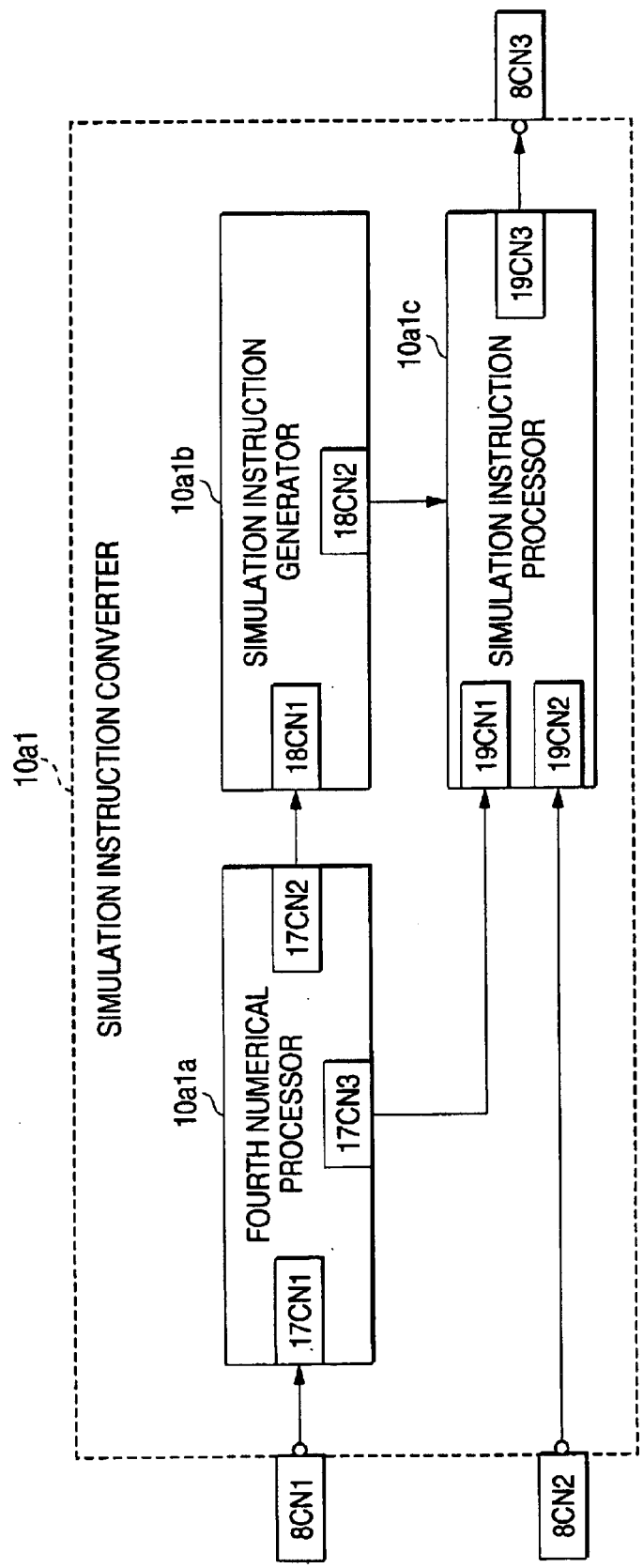
FIG. 7 is a block diagram showing a simulation instruction converter according to the first embodiment of the invention.

FIG. 7 is a block diagram showing a detailed construction of the above-described simulation instruction converter 10a1. In FIG. 7, the above-described simulation instruction converter 10a1 is constructed of the fourth numerical processor 10a1a, simulation instruction generator 10a1b, and a simulation instruction processor 10a1c.

Figure 8:
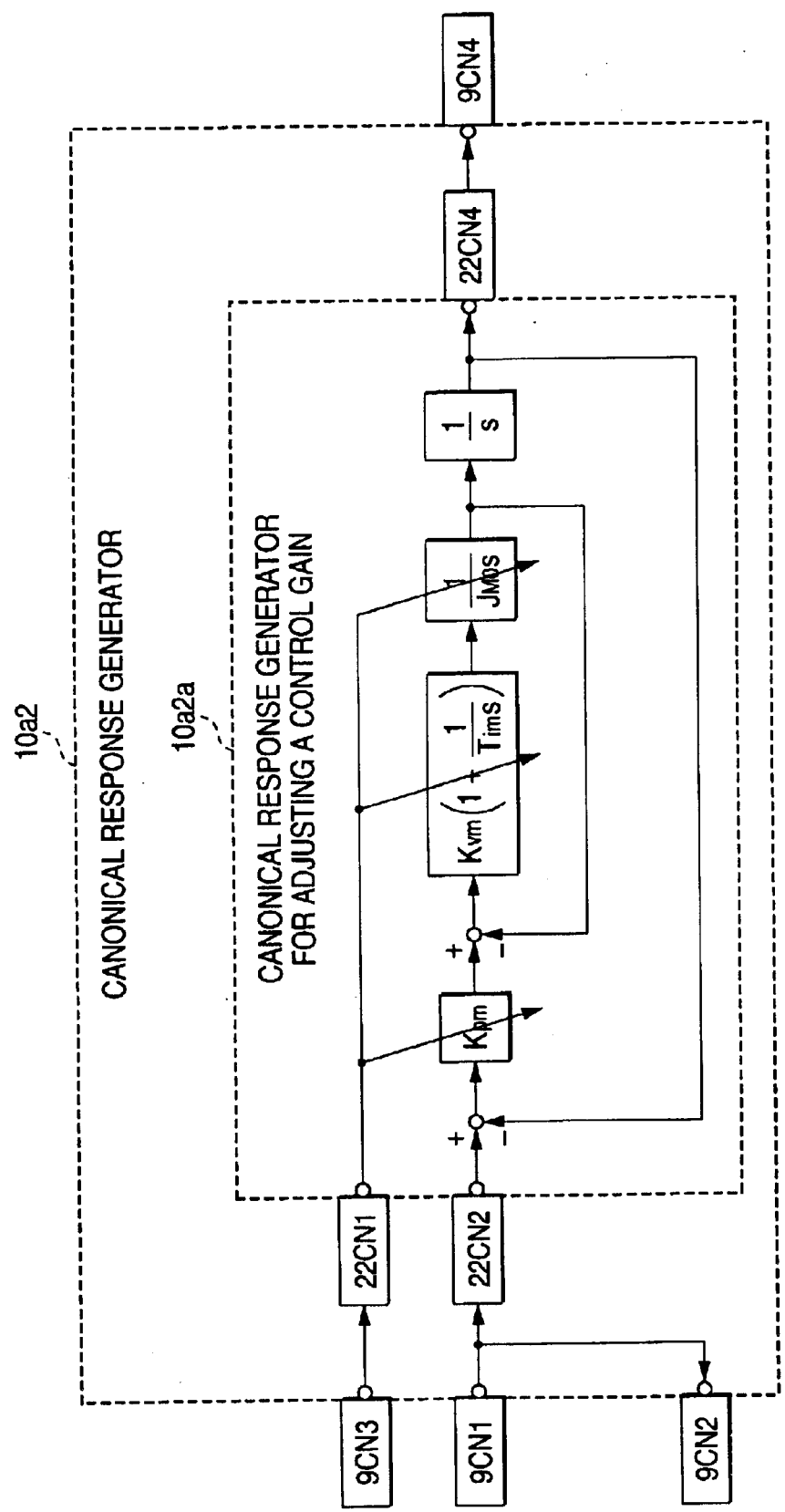
FIG. 8 is a block diagram showing a canonical response generator according to the first embodiment of the invention.
Figure 9:
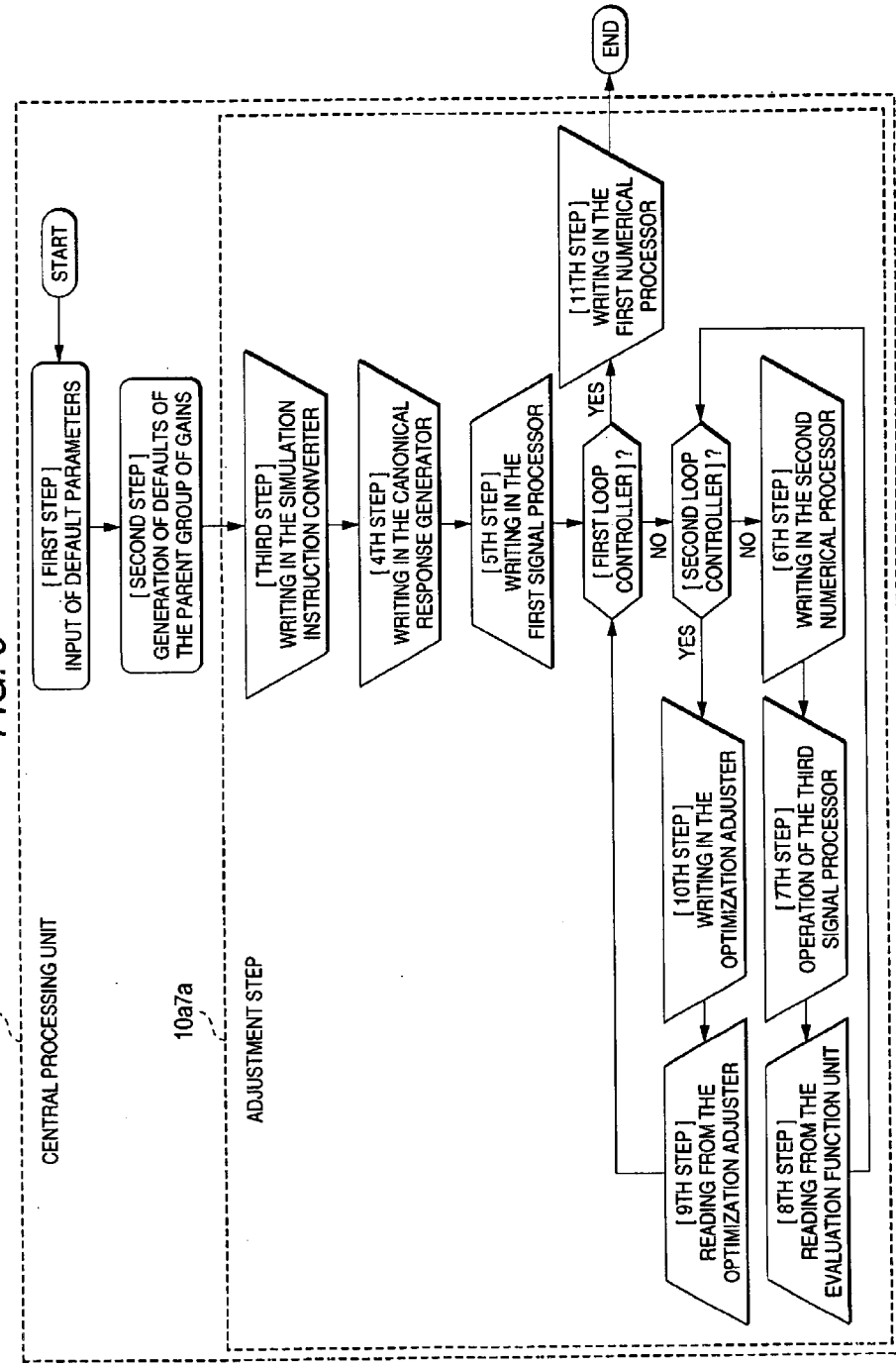
FIG. 9 is a flow chart showing the central processing unit according to the first embodiment of the invention.

FIG. 8 is a block diagram showing a detailed construction of the above-described canonical response generator 10a2. In FIG. 9, the above-described canonical response generator 10a2 is constructed of two integrators expressing a rigidity system, and a canonical position controlling portion and a canonical speed controlling portion, which control the two integrators.

FIG. 9 is a flow chart showing a detailed construction of the above-described central processing unit 10a7. In FIG. 9, the above-described central processing unit 10a7 is provided with an adjustment process, which consists of the third through eleventh steps, the first loop controlling portion and the second loop controlling portion, the first step, and the second step.

Next, a description is given of the actions of the first embodiment with reference to FIG. 1 through FIG. 9.

First, the 2-inertia numerical model 9 shown in FIG. 2 carries out approximation of the input and output characteristics of the above-described machine system. As shown in FIG. 2, in the 2-inertia numerical model 9, a simulation position signal and a simulation speed signal are obtained by four integrators, two adders, and one coefficient unit, which are shown in FIG. 2, with respect to a simulation torque signal inputted through a connector 4CN1, and are, respectively, outputted through connectors 4CN2 and 4CN3. The 2-inertia numerical model 9 shown in FIG. 2 can be achieved by an electric circuit or by digital calculations.

A real PID controlling portion 7 shown in FIG. 3 is a commonly used PID controlling portion. In the real PID controlling portion 7 shown in FIG. 3, a real torque signal is obtained by a real position controlling portion and a real speed controlling portion with respect to a real position instruction, a real position signal and a real speed signal, which are inputted through connectors 5CN1, 5CN2, and 5CN3, and is outputted through a connector 5CN4. However, the real position gain of the above-described real position controlling portion, real speed gain of the above-described real speed controlling portion and real integration gain of the above-described real speed controlling portion are renewed by renewing the real control gain inputted through a connector 5CN5.

A simulation PID controlling portion 8 shown in FIG. 4 has the same construction as that of the real PID controlling portion 7. In the simulation PID controlling portion 8 shown in FIG. 4, a simulation torque signal is obtained by a simulation position controlling portion and a simulation speed controlling portion with respect to the first simulation position instruction signal, simulation position signal and simulation speed signal, which are inputted through connectors 3CN1, 3CN2 and 3CN3, as in the real PID controlling portion 7, and is outputted through a connector 3CN4. But, the simulation position gain of the above-described simulation position controlling portion, the simulation speed gain of the above-described simulation speed controlling portion, and simulation integration gain of the above-described simulation speed controlling portion are renewed by renewing the simulation control gain inputted through the connector 3CN5.

In the evaluation portion 10 shown in FIG. 5, the real position instruction and simulation position signal, which are inputted through the connectors 2CN1 and 2CN5, are inputted into connectors 6CN1 and 6CN5 of the upper-grade controller 10$a$, and the first simulation position instruction signal is obtained through a connector 6CN3 of the upper-grade controller 10$a$ by the upper-grade controller 10$a$ and optimization adjuster 10$b$, and is outputted from the connector 2CN3, wherein the real position gain, real speed gain and real integration gain are obtained from the connector 6CN2 of the upper-grade controller 10$a$ and outputted from the connector 2CN2, and the simulation position gain, simulation speed gain, and simulation integration gain are obtained by the connector 6CN4 of the upper-grade controller 10$a$, and is outputted through the connector 2CN4. The optimization adjuster 10$b$ has a genetic operation shown in the prior arts, wherein by carrying out a genetic operation based on an evaluation value array and parent groups of gains, which are inputted through a connector 7CN2, child groups of gains are outputted through a connector 7CN1.

In the upper-grade controller 10$a$ shown in FIG. 6, the real position instruction inputted through the connector 6CN1 is inputted into a connector 8CN1 of the simulation instruction converter 10$a$1. The simulation position signal inputted through the connector 6CN5 is inputted into a connector 13CN1 of the second signal processor 10$a$6. The child groups of gains inputted through the connector 6CN6 are inputted into a connector 19CN10 of the central processing unit 10$a$7. The first simulation position instruction signal, which is obtained by a connector 10CN1 of the third signal processor 10$a$3, is outputted from a connector 6CN3 by the simulation instruction converter 10$a$1, canonical response generator 10$a$2, the third signal processor 10$a$3, the first signal processor 10$a$4, evaluation function unit 10$a$5, the second signal processor 10$a$6, central processing unit 10$a$7, the second numerical processor 10$a$8, and the first numerical processor 10$a$9. The evaluation value array and parent groups of gains, which are obtained by the connector 16CN9 of the central processing unit 10$a$7 are outputted through a connector 6CN7. The real position gain, real speed gain and integration gain, which are obtained by a connector 14CN2 of the first numerical processor 10$a$9, are outputted from a connector 6CN2. And, the simulation position gain, simulation speed gain and simulation integration gain, which are obtained by a connector 15CN2 of the second numerical processor 10$a$8, are outputted through a connector 6CN4.

The first numerical processor 10$a$9 is provided with a means for dividing a new real gain array, which is inputted through a connector 14CN1, into the real position gain, real speed gain and real integration gain, outputting them from a connector 14CN2, and renewing the real position gain, real speed gain and real integration gain of the real PID controlling portion 7.

The second numerical processor 10$a$8 is provided with a means for dividing a new simulation gain array, which is inputted through a connector 15CN1, into a simulation position gain, simulation speed gain and simulation integration gain, outputting them from a connector 15CN2, and renewing the simulation position gain, simulation speed gain and simulation integration gain of the simulation PID controlling portion 8.

The first signal processor 10$a$4, first, digitizes a canonical instruction signal and a canonical response signal, which are inputted through connectors 11CN2 and 11CN5 at a time interval (sampling time) determined by the first element of the second size array inputted through the connector 11CN4, by a number of times, which is determined by the second element of the above-described second size array, and stores the signals in the first storage space and second storage space of a memory of the first signal processor 10$a$4. Next, the first signal processor 10$a$4 outputs the contents of the first storage space of the above-described memory through the connector 11CN1, depending on the state of the third element of the above-described second size array, and further outputs the contents of the second storage space of the above-described memory by the fourth element of the above-described second size array from the connector 11CN3.

First, the second signal processor 10$a$6 digitizes a simulation signal, which is inputted through a connector 13CN1, at a time interval (sampling time) which is determined by the first element of the third size array inputted through a connector 13CN3, by a number of times, which is determined by the second element of the above-described third size array, and stores it in the memory of the second signal processor 10$a$6. Next, the second signal processor 10$a$6 outputs the contents of the above-described memory from the connector 13CN2, depending on the state of the third element of the above-described second size array.

First, the third signal processor 10$a$3 signalizes, in a fixed sequence, a numerical array which is inputted through a connector 10CN3, depending on the state of the third element of the above-described third size array, by a number of times determined by the second element of the above-described third size array at a time interval (sampling time) that is determined by the first element of the first size array inputted through the connector 10CN2, and outputs it through the connector 10CN1.

The evaluation function unit 10$a$5 carries out a square error calculation with respect to two arrays inputted through connectors 12CN1 and 12CN2 as soon as the contents of the memory of the second signal processor 10$a$6 are inputted through the connectors 12CN2, obtains an evaluation value, and outputs it from the connector 12CN3.

In the simulation instruction converter 10$a$1 shown in FIG. 7, the real position instruction inputted through a connector 8CN1 is inputted into a connector 19CN2 of the simulation instruction processor 10$a$1$c$, and a simulation position instruction array inputted through the connector 8CN2 is inputted into a connector 17CN1 of the fourth numerical processor 10$a$1$a$, wherein the second simulation position instruction signal obtained by the simulation instruction processor 10$a$1$c$ is outputted from the connector 8CN3.

The fourth numerical processor 10$a$1$a$ outputs the first element of the simulation position instruction array inputted through a connector 17CN1, and outputs the second and third elements of the simulation position instruction array through a connector 17CN2.

The simulation instruction processor 10$a$1$c$ selects one of various signals, which are a real position instruction inputted through a connector 19CN2 and the third simulation position instruction signal inputted through a connector 19CN4, depending on the state of the first element of the simulation position instruction array inputted through a connector 19CN2, and outputs it through a connector 19CN3.

The simulation position instruction generator 10$a$1$b$ signalizes, in a fixed sequence, the third element of the simulation position instruction array inputted through a connector 18CN1 at a time interval (sampling time) that is determined by the second element of the simulation position instruction array inputted through a connector 18CN1, and outputs it through a connector 18CN2.

The canonical response generator 10a2a shown in FIG. 8 inputs the second simulation position instruction signal, which is inputted through a connector 9CN1, into a connector 22CN2 of the canonical response generator 10a2a for adjusting the control gain, and further inputs a canonical gain, which is inputted through a connector 9CN3, into a connector 22CN1 of the canonical response generator 10a2a for adjusting the control gain. The canonical response generator 10a2a outputs a canonical response signal, which is obtained from a connector 22CN4 of the canonical response generator 10a2a for adjusting the control gain, from a connector 9CN4 and outputs a canonical position instruction signal, which is obtained from a connector 22CN3 of the canonical response generator 10a2a for adjusting the control gain, from a connector 9CN2.

The canonical response generator 10a2a for adjusting a control gain, first, adjusts coefficients of respective coefficient units shown in FIG. 9 on the basis of respective coefficients of the canonical gain inputted through a connector 22CN1.

Next, the respective calculation actions shown in FIG. 9 are carried out with respect to the second simulation position instruction signal that is inputted through a connector 22CN2, and the obtained canonical response signal is outputted from a connector 22CN4.

Figure 10:
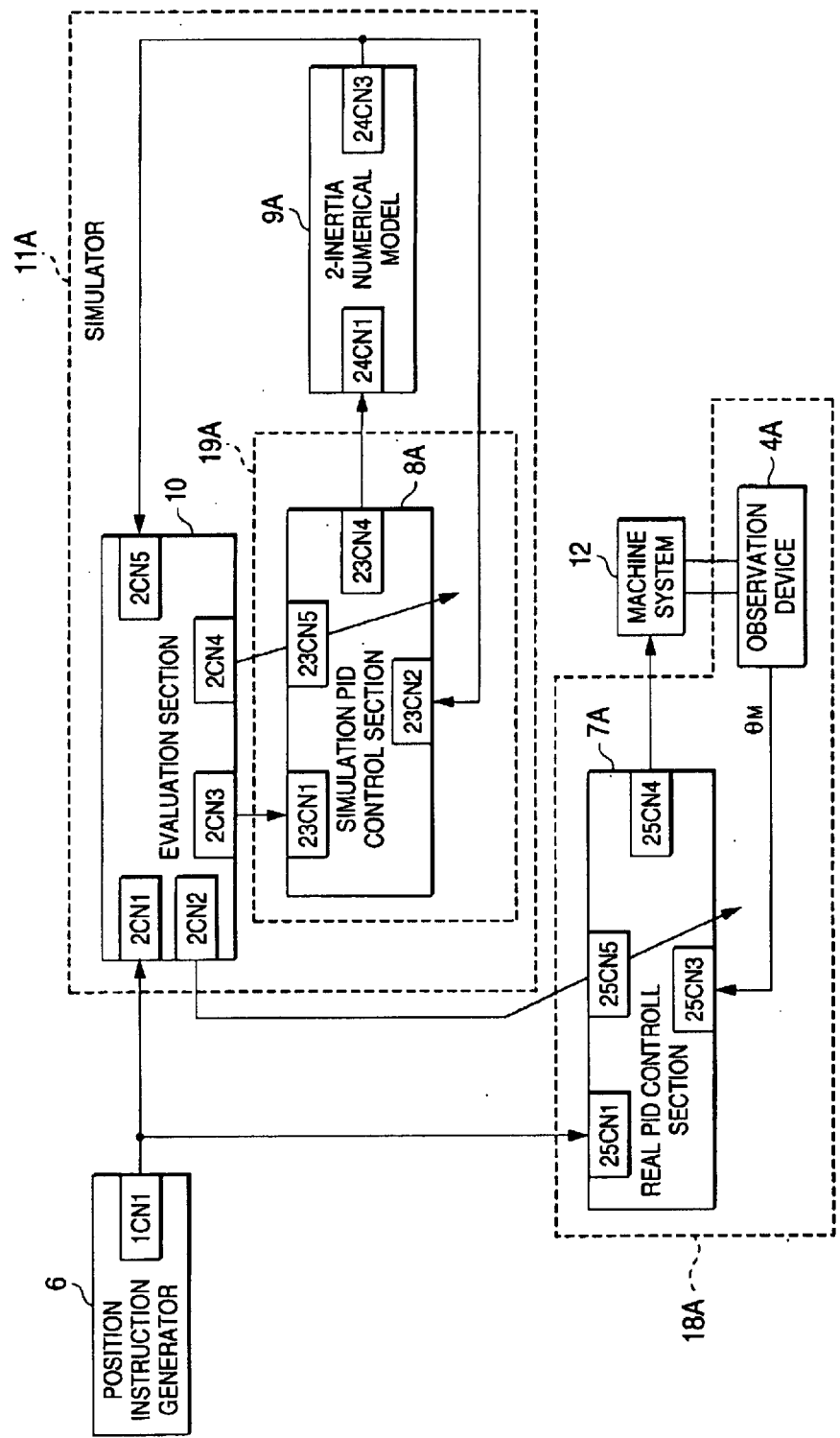
FIG. 10 is a block diagram showing a second embodiment of the invention.

In the central processing unit 10a7 shown in FIG. 9, the first step, second step and adjustment step are carried out in the order shown in FIG. 10.

The first step establishes a simulation position instruction array, a canonical gain, the first size array, the second size array, the third size array, the number of children of the child group of gains, the number of parents of the parent groups of gains, and the number of generations. However, the parent gains in the parent groups are those established so that they compose a gain array including a position gain, speed gain and integration gain.

The second step initializes the parent groups of gains at random and codes the parent groups of gains.

In the order shown in FIG. 10, the adjustment step carries out the third through eleventh steps, and carries out the first loop controlling portion and the second loop controlling portion.

The third step writes a simulation position instruction array in the connector 8CN2 of the simulation instruction converter 10a1 through the connector 16CN8, whereby the second simulation instruction signal is obtained from the connector 8CN3 of the simulation instruction converter 10a1. The fourth step writes a canonical gain in the connector 9CN3 of the canonical response generator 10a2 through the connector 16CN7, whereby a canonical instruction signal is obtained from the connector 9CN2 of the canonical response generator 10a2, and another canonical response signal is obtained from the connector 9CN4 of the canonical response generator 10a2.

The fifth step writes the second size array in the connector 11CN4 of the first signal processor 10a4 through the connector 16CN1, whereby a canonical instruction array is obtained from the connector 11CN1 of the first signal processor 10a4, and a canonical response is obtained from the connector 11CN3 of the first signal processor 10a4.

The sixth step writes a simulation gain array, which is a parent of the parent groups of gains, in the connector 15CN1 of the second numerical processor 10a8 in the fixed order through the connector 16CN1, whereby the respective gains of the simulation PID controlling portion 8 are renewed through the connector 15CN2 of the second numerical processor 10a8.

The seventh step writes the first size array in the connector 10CN2 of the third signal processor 10a3 through the connector 16CN6, and writes the third size array in the connector 13CN3 of the second signal processor 10a6 through the connector 16CN3, whereby a simulation response array is obtained from the connector 13CN2 of the second signal processor 10a6.

The eighth step reads an evaluation value from the connector 12CN3 of the evaluation function unit 10a5 through the connector 16CN2, whereby an evaluation value corresponding to the simulation gain array, which is the parent selected in the sixth step, is obtained.

The ninth step reads parent groups of gains and evaluation value arrays in the connector 7CN2 of the optimization adjuster 10b, whereby child groups of gains are obtained from the connector 7CN1 of the optimization adjuster 10b.

The tenth step reads child groups of gains from the connector 7CN1 of the optimization adjuster 10b through the connector 16CN10, and renews the contents of the parent groups of gains.

The eleventh step writes the optimal gain, which is the optimal parent of the parent groups of gains, in the connector 14CN1 of the first numerical processor 10a9 through the connector 16CN5 as a real gain array, and commences the next operation. Thereby, the respective gains of the real PID controlling portion are renewed.

The second loop controlling portion repeats the above-described sixth through eighth steps by the number of the parents in the parent groups of gains determined in the first step, calculates the evaluation values of the respective parents of the parent groups of gains, and renews the evaluation value arrays. At the end, the process enters the tenth step.

The first loop controlling portion is shifted to the second loop controlling portion by the number of generations determined in the first step. At the end, the process enters the eleventh step.

Hereinafter, a description is given of the second embodiment with reference to FIG. 10 through FIG. 13.

FIG. 10 is a block diagram showing the entirety of the second embodiment of the invention. In FIG. 10, the second embodiment is composed of a machine system 12, an observation device 4A, a position instruction generator 6, a real PID controlling portion 7A, a simulation PID controlling portion 8A, a 2-inertia numerical model 9A, and an evaluation portion 10. The load machine 1, transmission mechanism 2, drive unit 3, observation device 4A, power conversion circuit 5, and position instruction generator 6 are identical to those in the prior arts.

Figure 11:
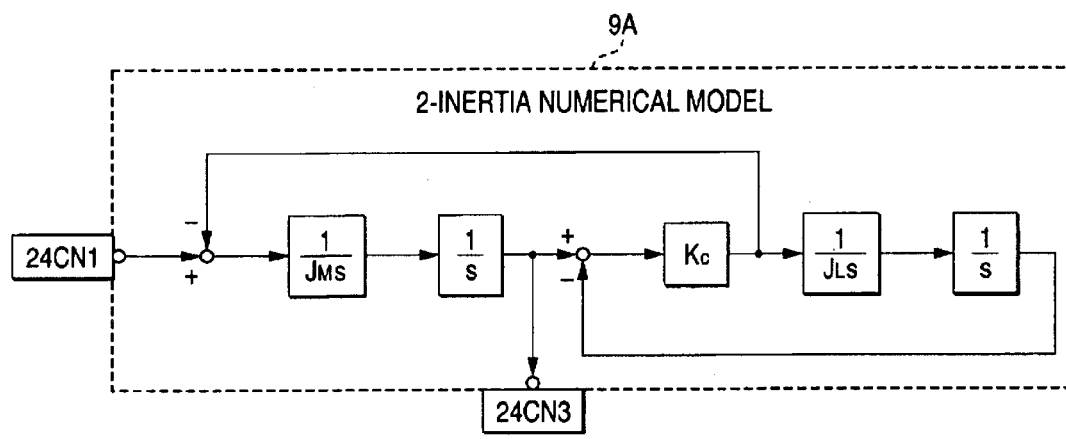
FIG. 11 is a block diagram showing a 2-inertia numerical model according to the second embodiment of the invention.

FIG. 11 is a block diagram showing a detailed construction of the above-described 2-inertia numerical model 9A. In FIG. 11, the 2-inertia numerical model 9A is composed of 2-inertia systems and one spring system.

Figure 12:
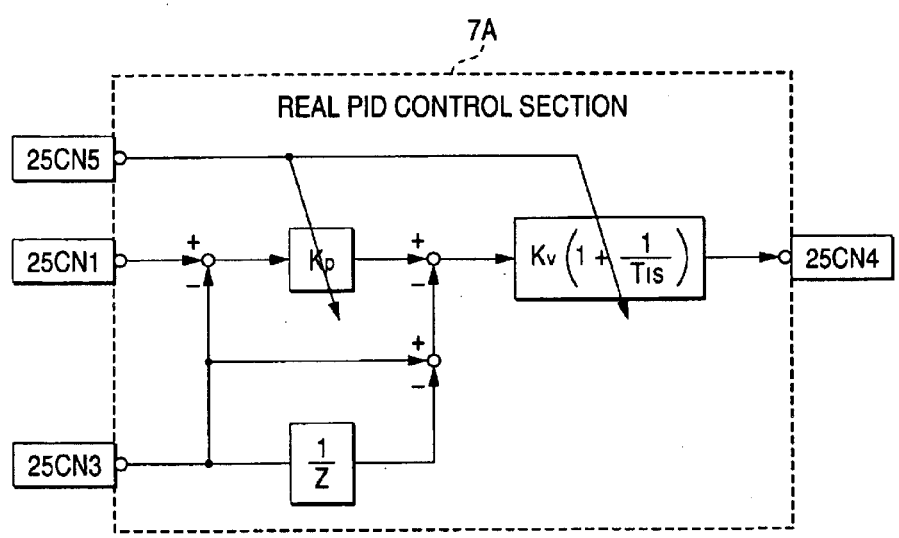
FIG. 12 is a block diagram showing a real PID controlling portion according to the second embodiment of the invention.

FIG. 12 is a block diagram showing a detailed construction of the above-described PID controlling portion 7A. In FIG. 12, the real PID controlling portion 7A is composed of a real position controlling portion, a real speed controlling portion, and a real speed inference unit.

Figure 13:
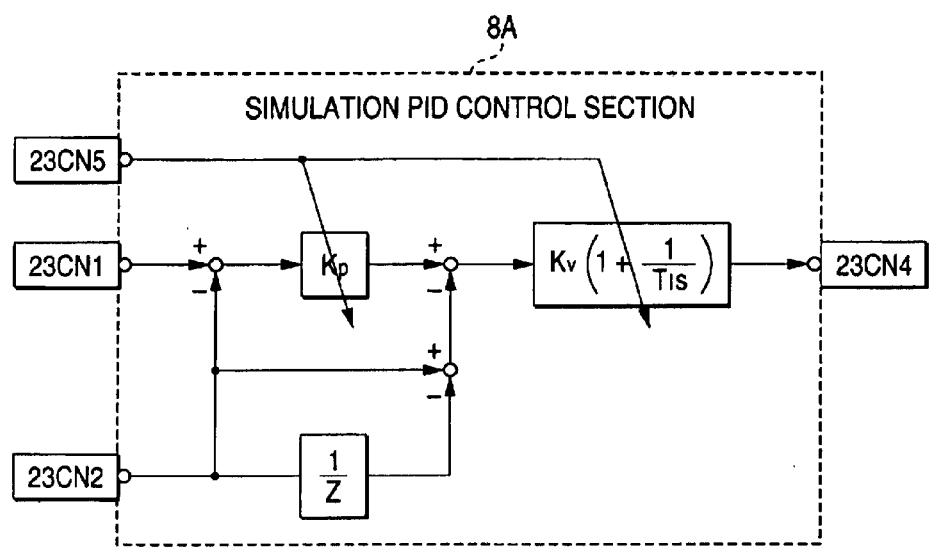
FIG. 13 is a block diagram showing a simulation PID controlling portion according to the second embodiment of the invention.

FIG. 13 is a block diagram showing a detailed construction of the above-described simulation PID controlling portion 8A. In FIG. 4, the simulation PID controlling portion 8A has the same structure as that of the real PID controlling portion 7, which is composed of a simulation position controlling portion, a simulation speed controlling portion, and a simulation speed inference unit. The position instruction generator 6 and evaluation portion 10 are those explained in the first embodiment. Herein, a description of the position instruction generator 6 and evaluation portion 10 is omitted.

Next, a description is given of the actions of the second embodiment with reference to FIG. 10 through FIG. 13.

First, the 2-inertia numerical model 9A shown in FIG. 11 carries out approximation of the input and output characteristics of the above-described machine system 12. In the 2-inertia numerical model 9A as shown in FIG. 11, a simulation position signal is obtained by four integrators, two adders, and one coefficient unit, which are shown in FIG. 11, with respect to the simulation torque signal inputted through the connector 24CN1, and is outputted through the connector 24CN3.

The real PID controlling portion 7A shown in FIG. 12 is a PID controlling portion, which is usually used. In the real PID controlling portion 7A shown in FIG. 12, a real torque signal is obtained by the real position controlling portion, real speed controlling portion, and real speed inference unit with respect to the real position instruction and real position signal, which are inputted through connectors 25CN1 and connector 25CN3, and is outputted through a connector 25CN4. However, the real position gain of the above-described real position controlling portion, the real speed gain of the above-described real speed controlling portion, and real integration gain of the above-described real speed controlling portion are renewed by renewing the real control gain that is inputted through a connector 25CN5.

The simulation PID controlling portion 8A shown in FIG. 13 has the same structure as that of the real PID controlling portion 7A. In the simulation PID controlling portion 8A shown in FIG. 13, as in the real PID controlling portion 7A, a simulation torque signal is obtained by the simulation position controlling portion, simulation speed controlling portion, and simulation speed inference unit with respect to the first simulation position instruction signal and simulation position signal, which are inputted through connectors 23CN1 and 23CN2, and is outputted through a connector 23CN4. However, the simulation position gain of the above-described simulation position controlling portion, the simulation speed gain of the above-described simulation speed controlling portion, and simulation integration gain of the above-described simulation speed controlling portion are renewed by renewing the simulation control torque gain that is inputted through a connector 23CN5.

Hereinafter, a description is given of the third embodiment of the invention with reference to FIG. 14 through FIG. 21. FIG. 16 is a block diagram showing the entirety of the third embodiment of the invention. In FIG. 16, the third embodiment according to the invention is composed of a machine system 12, an observation device 4B, a speed instruction generator 6A, a real PI controlling portion 7B, a simulation PI controlling portion 8B, a 2-inertia numerical model 9B, and an evaluation portion 10A. The machine system 12 and speed instruction generator 6A are identical to those in the prior arts.

Figure 22:
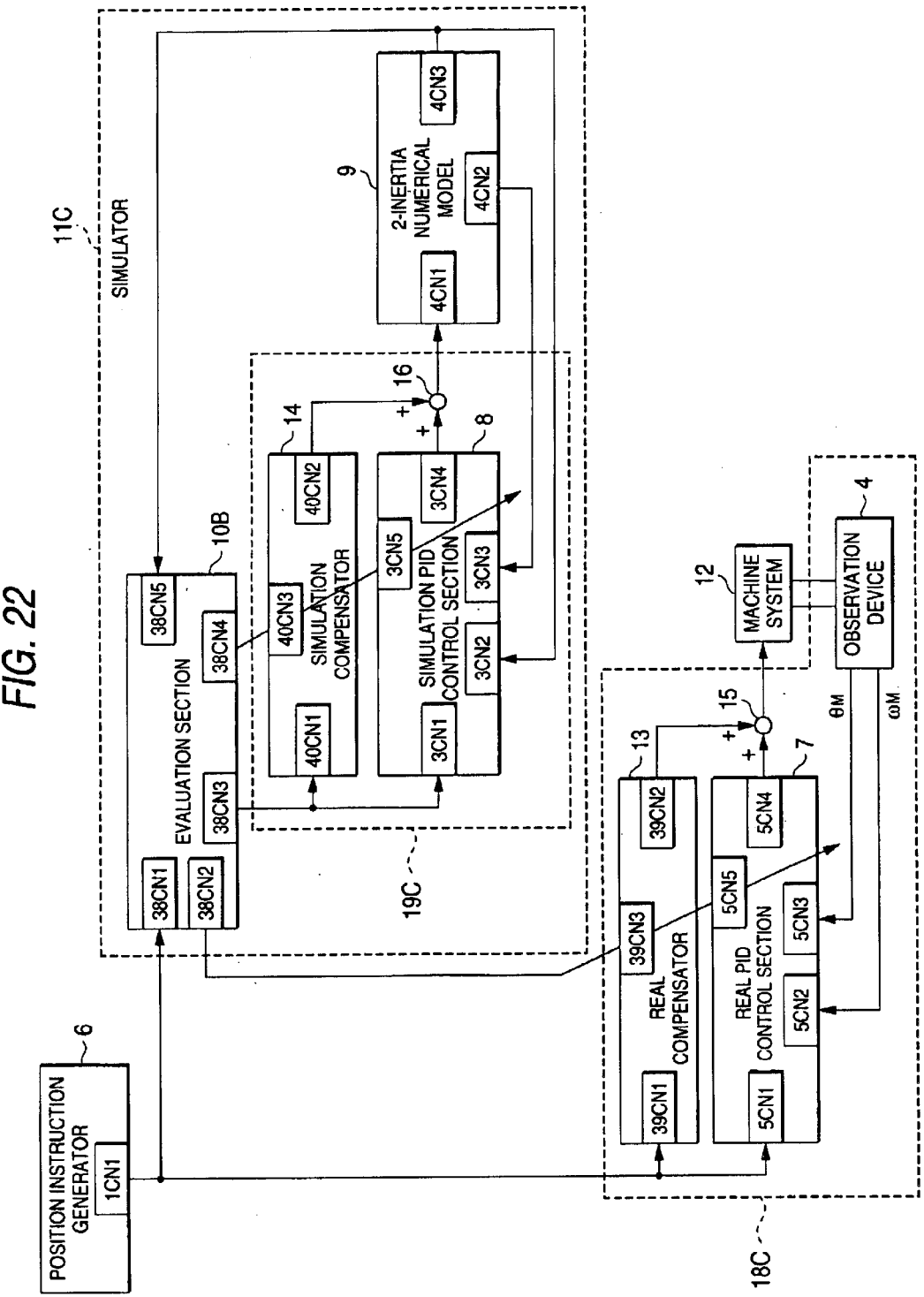
FIG. 22 is a block diagram showing a fourth embodiment of the invention.

FIG. 22 is a block diagram showing a detailed construction of the above-described 2-inertia numerical model 9B. In FIG. 22, the 2-inertia numerical model 9B is composed of 2-inertia systems and one spring system.

Figure 14:
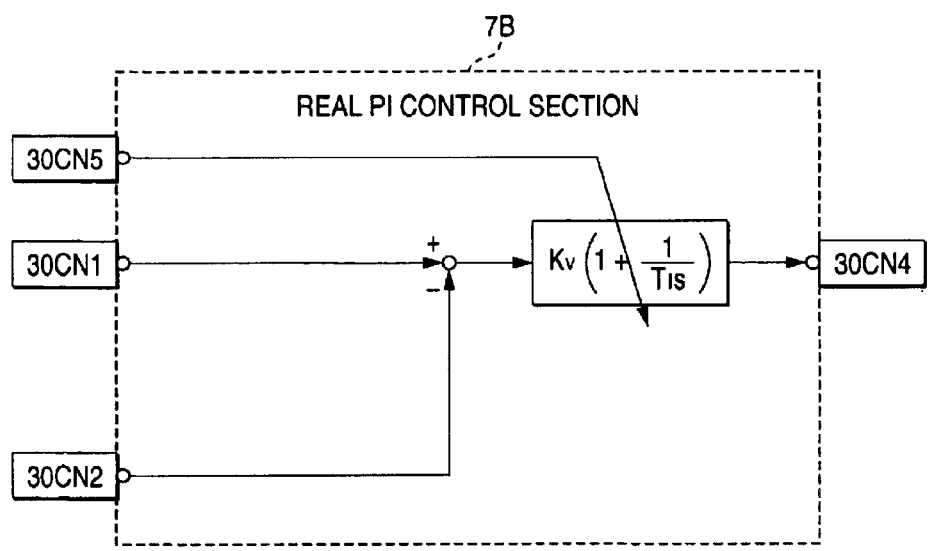
FIG. 14 is a block diagram showing a real PI controlling portion according to a third embodiment of the invention.

FIG. 14 is a block diagram showing a detailed construction of the above-described real PI controlling portion 7B. In FIG. 14, the real PI controlling portion 7 is composed of a real speed controlling portion.

Figure 15:
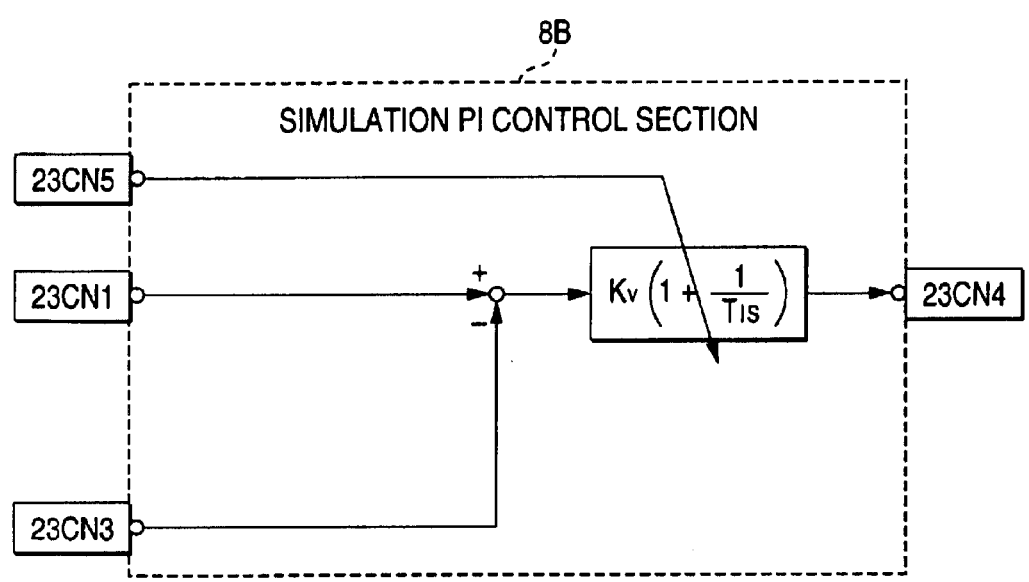
FIG. 15 is a block diagram showing a simulation PI controlling portion according to the third embodiment of the invention.
Figure 16:
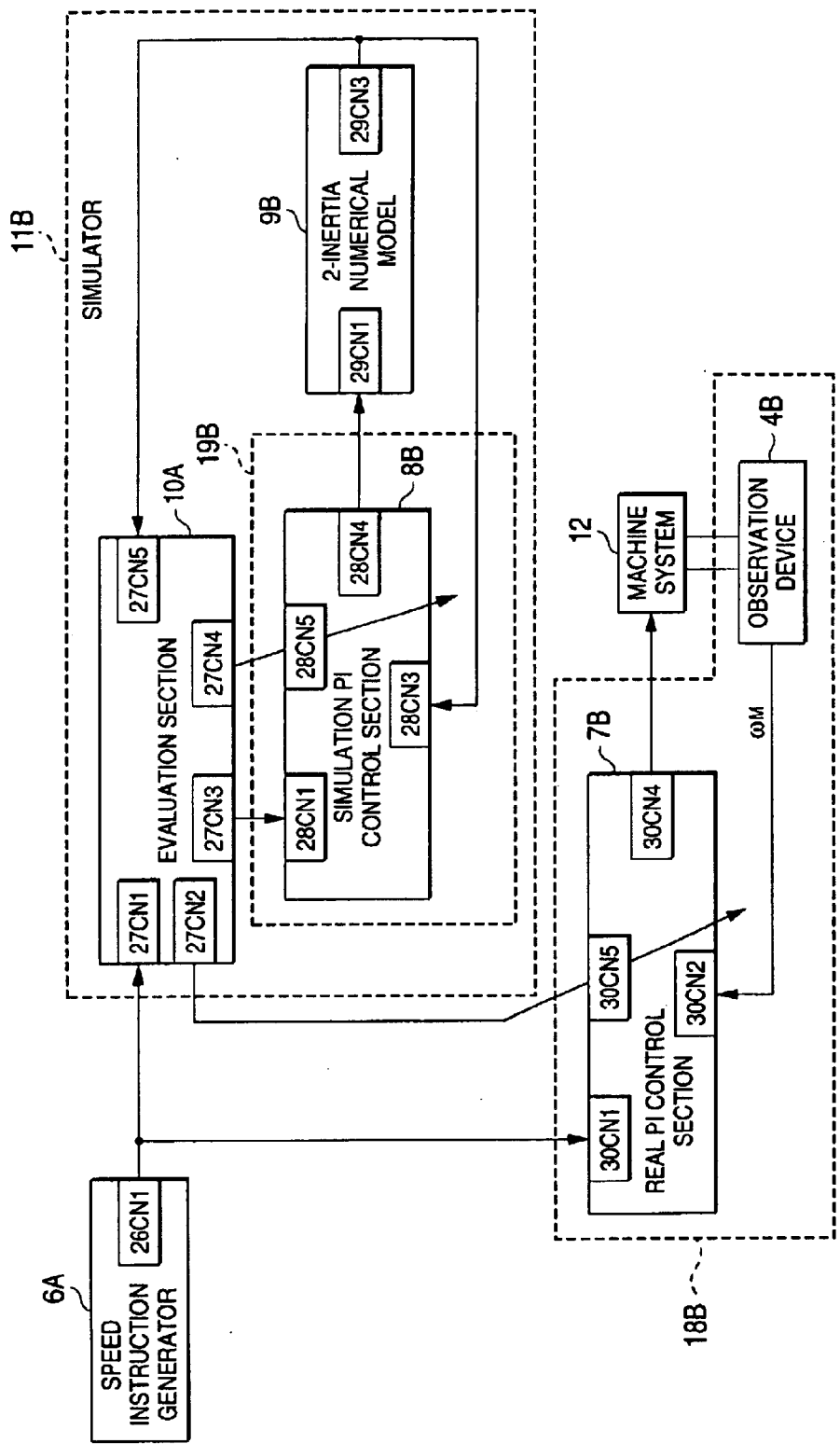
FIG. 16 is a block diagram showing the third embodiment of the invention.

FIG. 15 is a block diagram showing a detailed construction of the above-described PI controlling portion 8B. In FIG. 15, the simulation PI controlling portion 8B has the same structure as that of the real PI controlling portion 7B and is composed of a simulation speed controlling portion.

Figure 17:
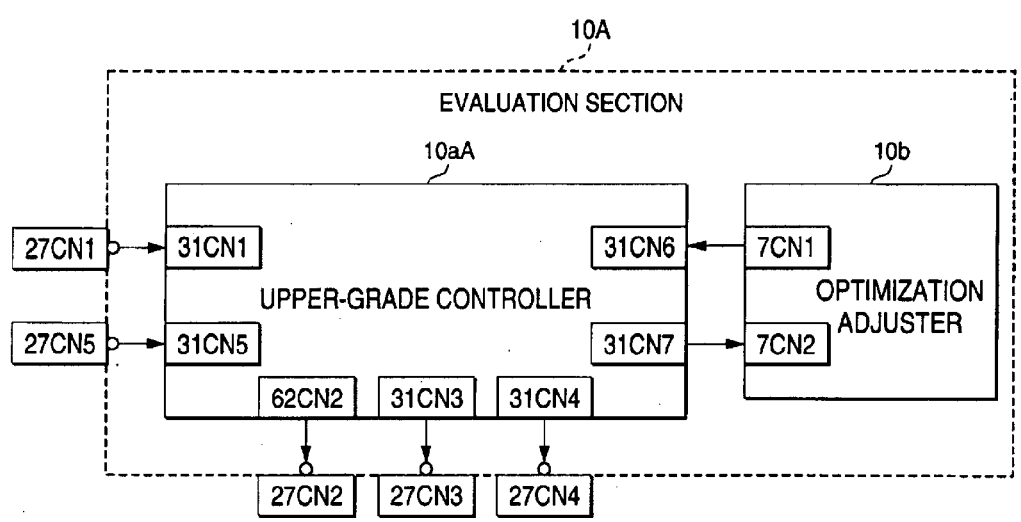
FIG. 17 is a block diagram showing an evaluation portion according to the third embodiment of the invention.

FIG. 17 is a block diagram showing a detailed construction of the above-described evaluation portion 10A. In FIG. 17, the evaluation portion 10A is composed of an upper-grade controller 10aA and an optimization adjuster 10b.

Figure 18:
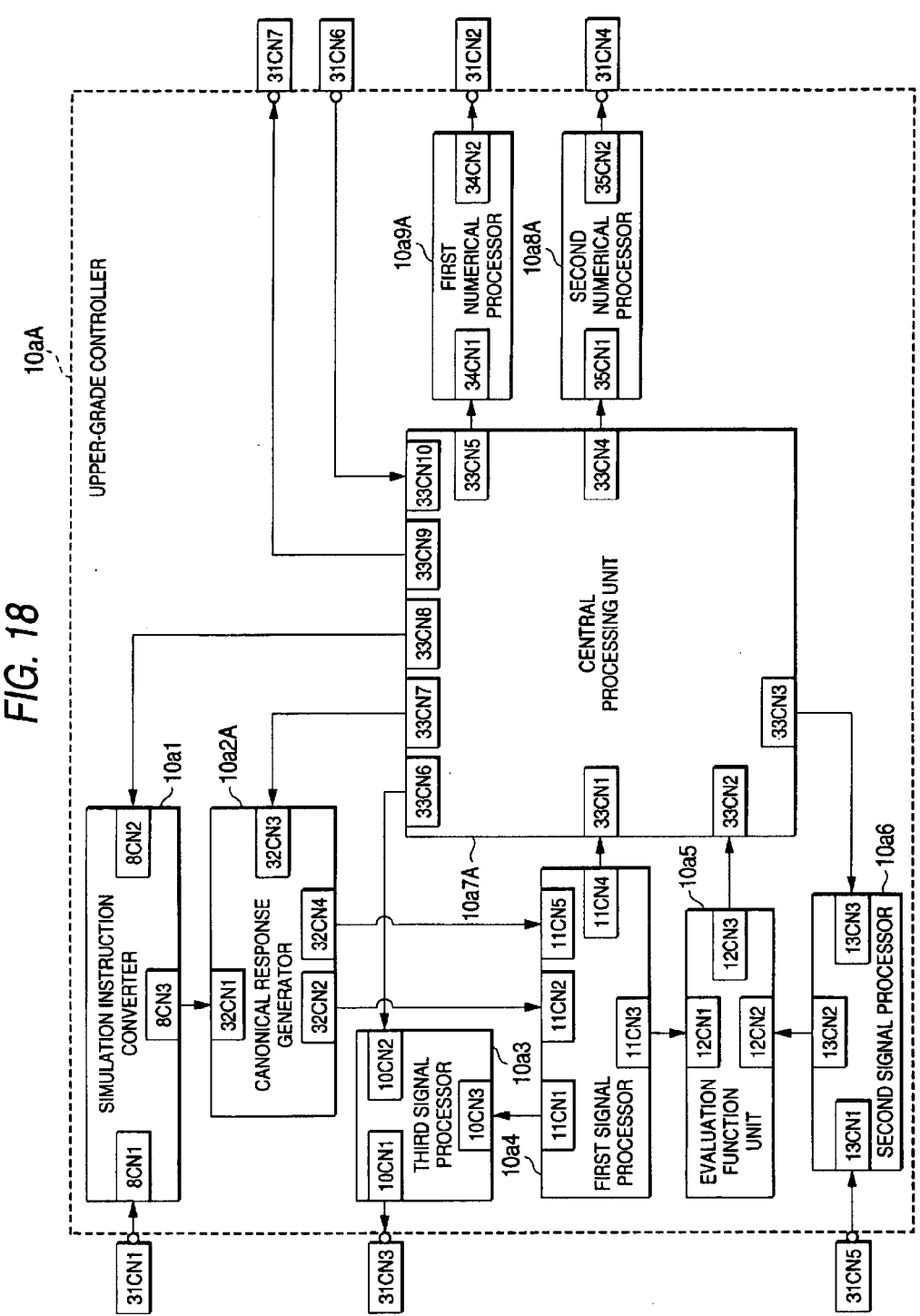
FIG. 18 is a block diagram showing an upper-grade controller according to the third embodiment of the invention.

FIG. 18 is a block diagram showing a detail construction of the above-described upper-grade controller 10aA. In FIG. 18, the upper-grade controller 10aA is composed of a simulation instruction converter 10a1, a canonical response generator 10a2A, the third signal processor 10a3, the first signal processor 10a4, an evaluation function unit 10a5, the second signal processor 10a6, a central processing unit 10a7A, the second numerical processor 10a8A, and the first numerical processor 10a9A.

Figure 20:
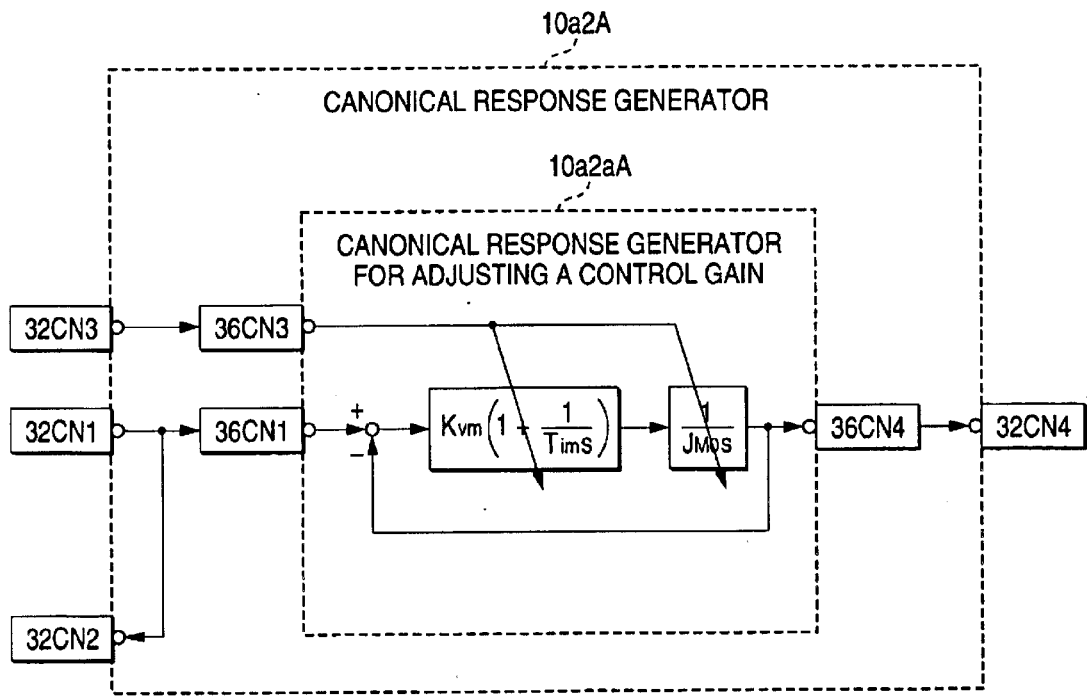
FIG. 20 is a block diagram showing a canonical response generator according to the third embodiment of the invention.

FIG. 20 is a block diagram showing a detail construction of the above-described canonical response generator 10a2A. In FIG. 20, the above-described canonical response generator 10a2A is composed of two integrators expressing a rigidity system and a canonical speed controlling portion for controlling the integrators.

Figure 19:
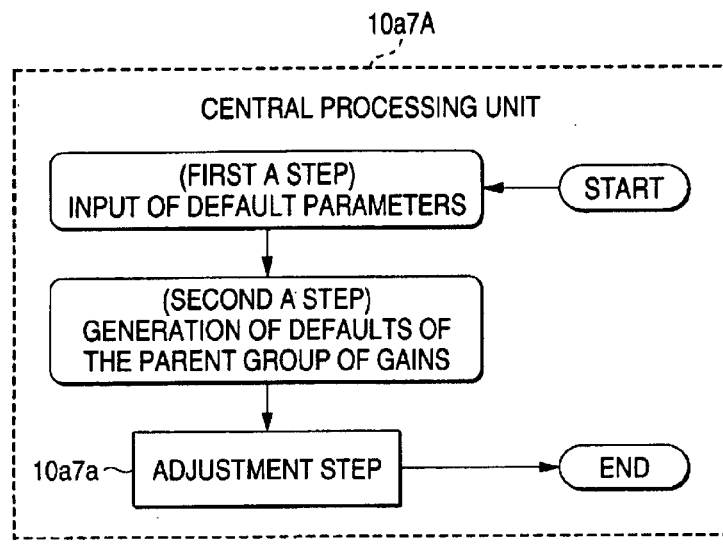
FIG. 19 is a flow chart showing the central processing unit according to the third embodiment of the invention.

FIG. 19 is a flow chart showing a detailed construction of the above-described central processing unit 10a7A. In FIG. 19, the above-described central processing unit 10a7A is composed of an adjustment step 10a7a, the first A step, and the second A step.

The optimization adjuster 10b, simulation instruction converter 10a1, the third signal processor 10a3, the first signal processor 10a4, evaluation function unit 10a5, and the second signal processor 10a6 are those explained in the first embodiment. Herein, overlapping description thereof is omitted.

Next, a description is given of the actions of the third embodiment with reference to FIG. 14 through FIG. 21.

Figure 21:
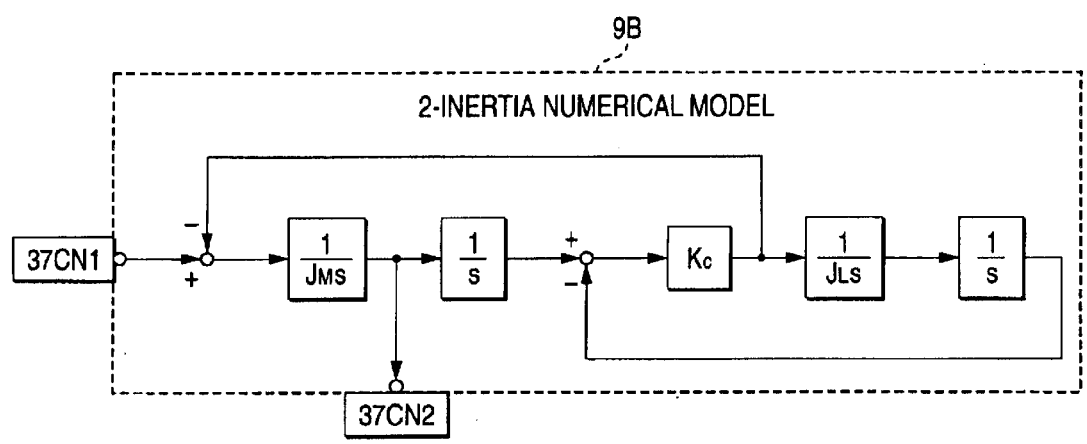
FIG. 21 is a block diagram showing a 2-inertia numerical model according to the third embodiment of the invention.

First, the 2-inertia numerical model 9B shown in FIG. 21 carries out approximation of the input and output characteristics of the above-described machine system. In the 2-inertia numerical model 9B shown in FIG. 21, a simulation speed signal is obtained by four integrators, two adders and one coefficient unit, which are shown in FIG. 21, with respect to the simulation torque signal that is inputted through a connector 37CN1, and is outputted through a connector 37CN2.

The real PI controlling portion 7B is a commonly used PI controlling portion. In the real PI controlling portion 7B shown in FIG. 14, a real torque signal is obtained by the real speed controlling portion with respect to the real speed instruction and real speed signal, which are inputted through connectors 30CN1 and 30CN2, and is outputted through the connector 30CN4. However, the real speed gain of the above-described real speed controlling portion and the real integration gain of the above-described real speed controlling portion are renewed by renewing the real control gains that are inputted through a connector 30CN5.

The simulation PI controlling portion 8B shown in FIG. 15 has the same structure as that of the real PI controlling portion 7B. In the simulation PI controlling portion 8B shown in FIG. 15, a simulation torque signal is obtained by the simulation speed controlling portion with respect to the first simulation speed instruction signal and simulation speed signal, which are inputted through connectors 28CN1 and 28CN2 as in the real PI controlling portion 7B, and is outputted through a connector 28CN4. However, the simulation speed gain of the above-described simulation speed controlling portion and the simulation integration gain of the above-described simulation speed controlling portion are renewed by renewing the simulation control gain, which is inputted through a connector 28CN5.

In the evaluation portion 10 shown in FIG. 17, the real speed instruction and simulation speed signal, which are inputted through connectors 2CN1 and 2CN5, are inputted into connectors 31CN1 and 31CN5 of the upper-grade controller 10aA, and the first simulation speed instruction signal is obtained from a connector 31CN3 of the upper-grade controller 10aA by the upper-grade controller 10aA and optimization adjuster 10b, and is outputted from a connector 27CN3. The real speed gain and real integration gain are obtained from a connector 31CN2 of the upper-grade controller 10aA, and is outputted through a connector 27CN2. Further, the simulation speed gain and simulation integration gain are obtained from a connector 31CN4 of the upper-grade controller 10aA, and is outputted through a connector 27CN4.

In the upper-grade controller 10aA shown in FIG. 18, the real speed instruction that is inputted through a connector 31CN1 is inputted into a connector 8CN1 of the simulation instruction converter 10a1, and the simulation speed signal that is inputted through a connector 31CN5 is inputted into a connector 13CN1 of the second signal processor 10a6. A group of gains, which are inputted through a connector 31CN6, are inputted into a connector 33CN10 of the central processing unit 10a7A. The first simulation speed instruction signal that is obtained by the connector 10CN1 of the third signal processor 10a3 is outputted through a connector 31CN3 by the simulation instruction converter 10a1, canonical response generator 10a2A, the third signal processor 10a3, the first signal processor 10a4, evaluation function unit 10a5, the second signal processor 10a6, central processing unit 10a7, the second numerical processor 10a8, and the first numerical processor 10a9. The evaluation value array and parent groups of gains, which are obtained by a connector 33CN9 of the central processing unit 10a7A are outputted through a connector 31CN7. The real speed gain and real integration gain, which are obtained through a connector 34CN2 of the first numerical processor 10a9A, are outputted through a connector 31CN2. The simulation speed gain and simulation integration gain, which are obtained through a connector 35CN2 of the second numerical processor 10a8A, are outputted through a connector 31CN4.

The first numerical processor 10a9A is provided with a means for dividing a new real gain array, which is inputted through a connector 34CN1, into a real speed gain and a real integration gain, outputting the same through a connector 34CN2, and renewing the real speed gain and real integration gain of the real PI controlling portion 7B.

The second numerical processor 10a8 is provided with a means for dividing a new simulation gain array, which is inputted through a connector 35CN1, into a simulation speed gain and a simulation integration gain, outputting the same through a connector 35CN2, and renewing the simulation speed gain and simulation integration gain of the simulation PI controlling portion 8B.

The canonical response generator 10a2A for adjustment, which is shown in FIG. 20, inputs the second simulation speed instruction signal, which is inputted through a connector 32CN1, into a connector 36CN2 of the canonical response generator 10a2AA for adjusting control gains, and inputs the canonical gain, which is inputted through a connector 32CN3, into a connector 36CN1 of the canonical response generator 10a2aA for adjusting control gains, outputs the canonical response signal, which is obtained from a connector 36CN4 of the canonical response generator 10a2aA for adjusting the control gains, through a connector 32CN4, and outputs the canonical speed instruction signal, which is obtained from a connector 36CN3 of the canonical response generator 10a2aA for adjusting control gains, from a connector 32CN2.

The canonical response generator 10a2aA for adjusting control gains first adjusts coefficients of the respective coefficient units shown in FIG. 20, on the basis of the respective coefficients of the canonical gain inputted through a connector 36CN1. Next, respective calculation operations shown in FIG. 20 are carried out with respect to the second simulation speed instruction signal that is inputted through a connector 36CN2, and the obtained canonical response signal is outputted through a connector 36CN4.

The first A step, second A step and adjustment step 10a7a are carried out by the central processor 10a7A shown in FIG. 19 in the sequence shown in the same drawing.

The first A step establishes a simulation speed instruction array, canonical gain, the first size array, the second size array, the third size array, number of children of the child groups of gains, and number of parents in the parent groups of gains, and number of generations. However, the parent gains in the parent groups of gains are those established so that a gain array including a speed gain and an integration gain is obtained.

The second A step initializes the parent groups of gains at random, and codes the parent groups of gains.

Since the adjustment step 10a7a has been already described in the first embodiment, herein, overlapping description thereof is omitted.

Hereinafter, a description is given of the fourth embodiment with reference to FIG. 22 through FIG. 27. FIG. 22 is a block diagram showing the entirety of the fourth embodiment according to the invention. In FIG. 22, the fourth embodiment of the invention is provided with a machine system 12, an observation device 4, a position instruction generator 6, a real PID controlling portion 7, a simulation PID controlling portion 8, a 2-inertia numerical model 9, an evaluation portion 10B, a real compensator 13, a simulation compensator 14, and adders 15 and 16. The machine system 12, observation device 4 and position instruction generator 6 are identical to those in the prior art.

Since the real PID controlling portion 7, simulation PID controlling portion 8 and 2-inertia numerical model 9 are those described above, herein, overlapping description thereof is omitted.

Figure 23:
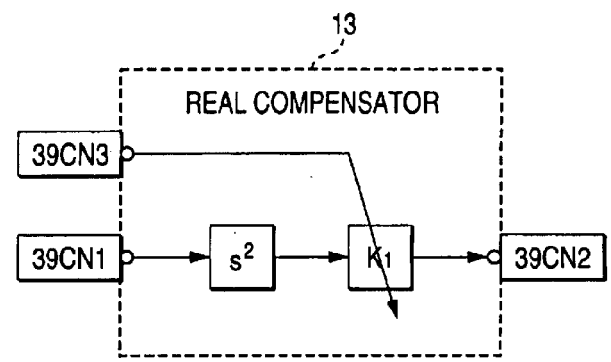
FIG. 23 is a block diagram showing a real compensating portion according to the fourth embodiment of the invention.

FIG. 23 is a block diagram showing a detail construction of the real compensator 13. In FIG. 23, the real compensator 13 is composed of one secondary differentiator and one coefficient.

Figure 25:
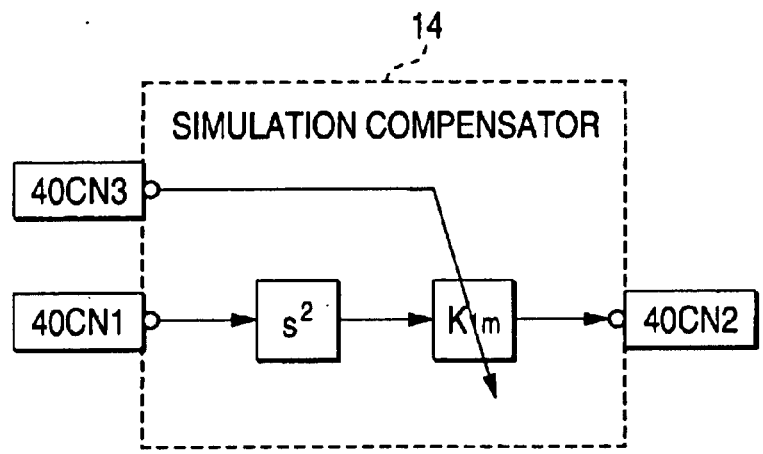
FIG. 25 is a block diagram showing a simulation compensating portion according to the fourth embodiment of the invention.

FIG. 25 is a block diagram showing a detailed construction of a simulation compensator 14. In FIG. 25, the simulation compensator 14 is composed of one secondary differentiator and one coefficient.

Figure 24:
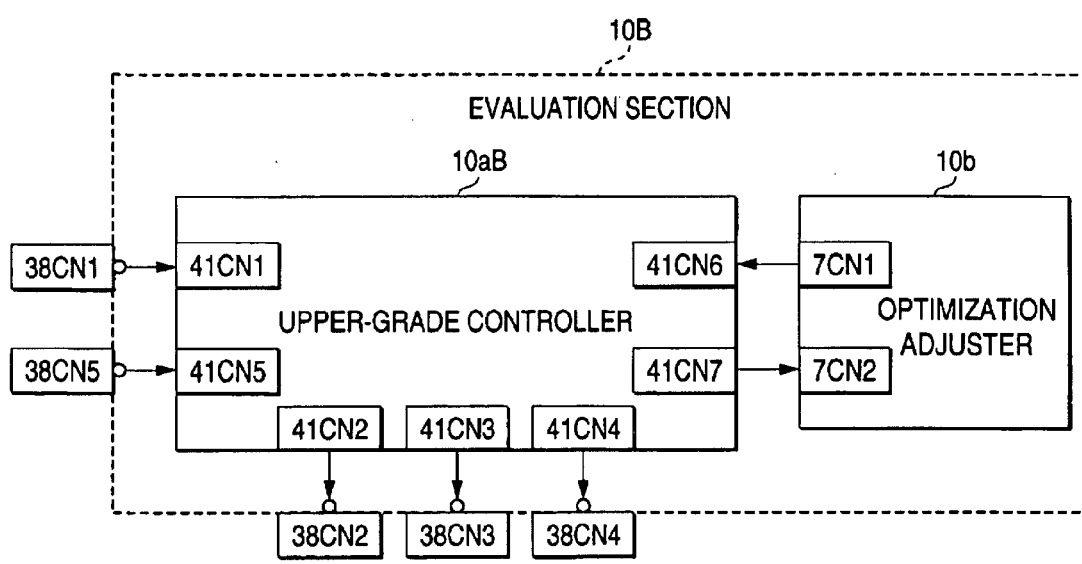
FIG. 24 is a block diagram showing an evaluation portion according to the fourth embodiment of the invention.

FIG. 24 is a block diagram showing a detailed construction of the above-described evaluation portion 10B. In FIG. 24B, the evaluation portion 10B is composed of an upper-grade controller 10aB and an optimization adjuster 10b. The optimization adjuster 10b is that described above. Herein, overlapping description thereof is omitted.

Figure 27:
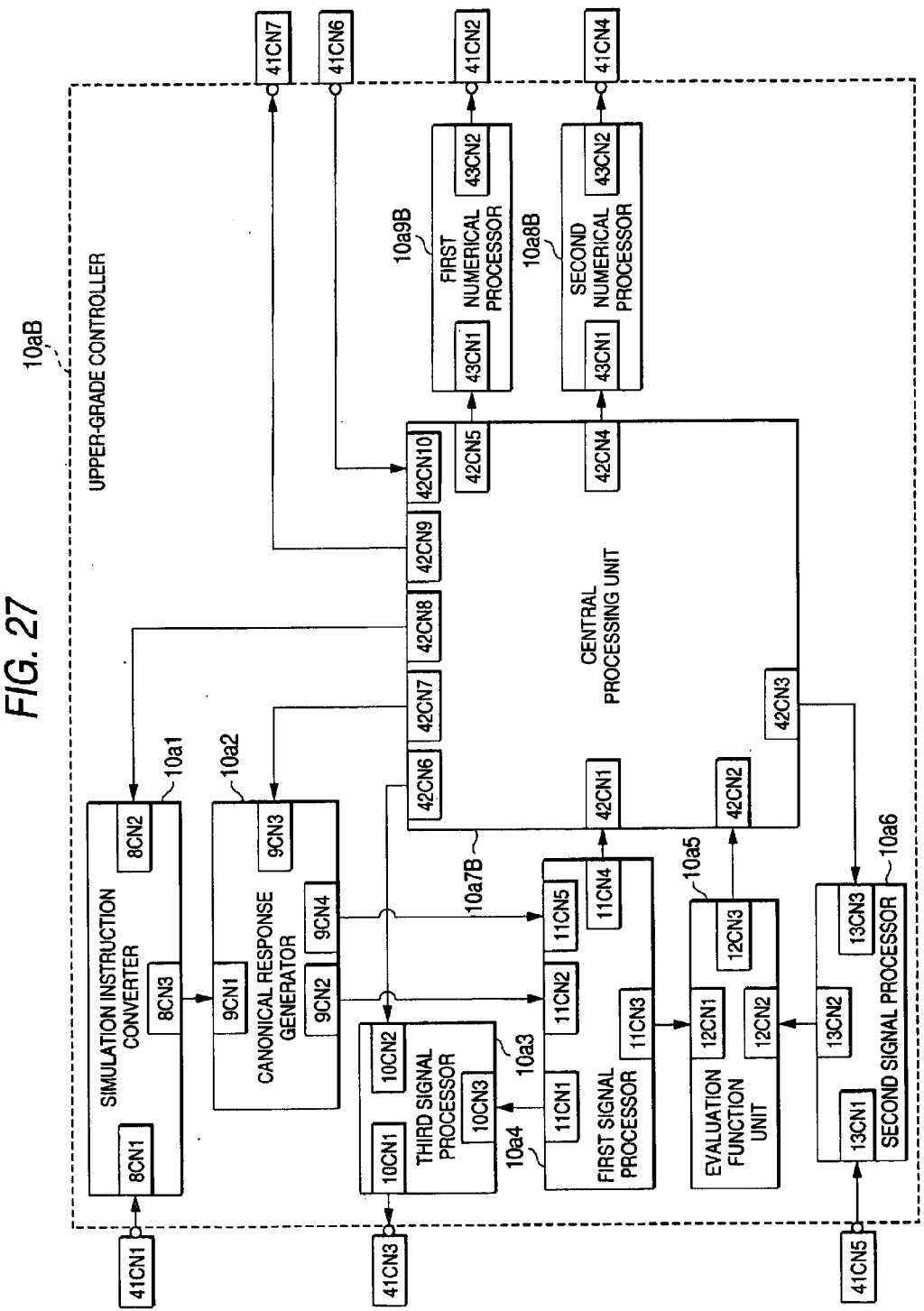
FIG. 27 is a block diagram showing an upper-grade controller according to the fourth embodiment of the invention.

FIG. 27 is a block diagram showing a detailed construction of the above-described upper-grade controller 10aB. In FIG. 27, the upper-grade controller 10aB is composed of a simulation instruction converter 10a1, a canonical response generator 10a2, the third signal processor 10a3, the first signal processor 10a4, an evaluation function unit 10a5, the second signal processor 10a6, a central processor 10a7B, the second numerical processor 10a8B, and the first numerical processor 10a9B. The simulation instruction converter 10a1, canonical response generator 10a2, third signal processor 10a3, first signal processor 10a4, evaluation function unit 10a5, and second signal processor 10a6 are those described above. Hereinafter, overlapping description thereof is omitted.

Figure 26:
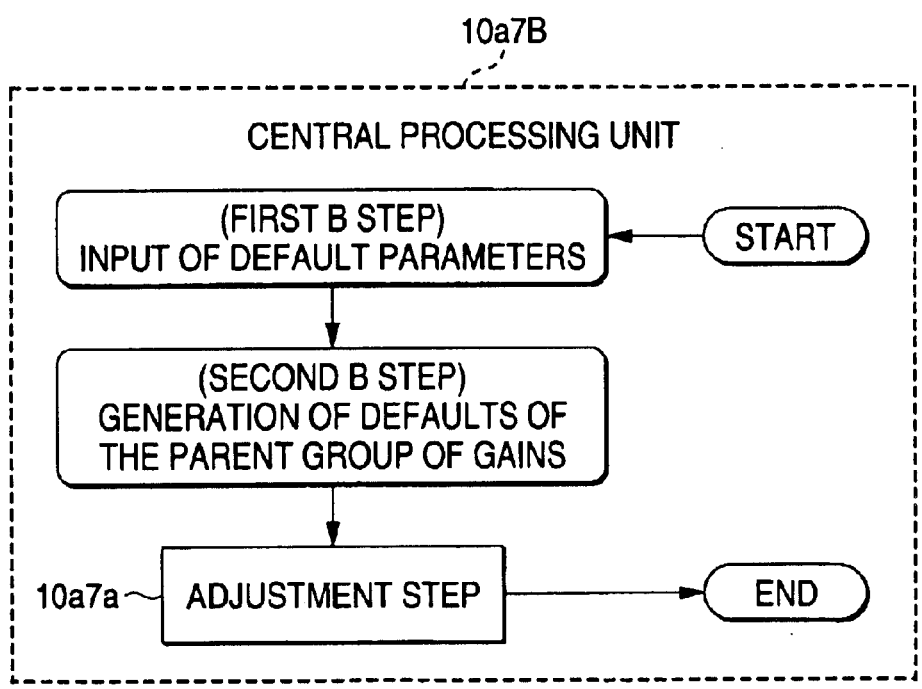
FIG. 26 is a flow chart showing the central processing unit according to the fourth embodiment of the invention.

FIG. 26 is a flow chart showing a detailed construction of the above-described central processor 10a7B. In FIG. 26, the above-described central processor 10a7B is composed of an adjustment step 10a7a, the first B step, and the second B step. The adjustment step 10a7a is that described above. Hereinafter, overlapping description thereof is omitted.

Next, a description is given of the actions of the fourth embodiments with reference to FIG. 22 through FIG. 27.

In the evaluation portion 10B shown in FIG. 24, a real position instruction and a simulation position signal, which are inputted through connectors 38CN1 and 38CN5, are inputted into connectors 41CN1 and 41CN5 of the upper-grade controller 10aB. The first simulation position instruction signal is obtained from a connector 41CN3 by the upper-grade controller 10aB and optimization adjuster 10b, and is outputted from a connector 38CN3, and a real position gain, a real speed gain and a real integration gain are obtained from a connector 41CN2 of the upper-grade controller 10aB, and are outputted through a connector 38CN2. A simulation position gain, a simulation speed gain and a simulation integration gain are obtained from a connector 41CN4 of the upper-grade controller 10a, and are outputted from a connector 38CN4.

In the upper-grade controller 10aB shown in FIG. 27, the real position instruction inputted through the connector 41CN1 is inputted into a connector 8CN1 of the simulation instruction converter 10a1, and the simulation position signal inputted through the connector 41CN5 is inputted into the connector 13CN1 of the second signal processor 10a6. Child groups of gains that are inputted through a connector 41CN6 are inputted into a connector 42CN10 of the central processor 10a7B, and the first simulation position instruction signal, which is obtained by a connector 10CN1 of the third signal processor 10a3, is outputted by the simulation instruction converter 10a1, canonical response generator 10a2, the third signal processor 10a3, the first signal processor 10a4, evaluation function unit 10a5, the second signal processor 10a6, central processor 10a7B, the second numerical processor 10a8B, and the first numerical processor 10a9B. The evaluation value array and parent groups of gains, which are obtained through a connector 42CN9 of the central processor 10a7D, are outputted through a connector 41CN7. The real position gain, real speed gain and real integration gain, which are obtained through a connector 43CN2 of the first numerical processor 10a9B, are outputted through a connector 41CN2. The simulation position gain, simulation speed gain, simulation integration gain, and simulation compensation gain, which are obtained through a connector 44CN2 of the second numerical processor 10a8B, are outputted through a connector 41CN4.

The first numerical processor 10a9B is provided with a means for dividing a new real gain array, which is inputted through a connector 43CN1, into a real position gain, a real speed gain and a real integration gain, outputting the same through a connector 43CN2, and renewing the real position gain, real speed gain and real integration gain of the real PID controlling portion 7.

The second numerical processor 10a8B is provided with a means for dividing a new simulation gain array, which is inputted through a connector 44CN1, into a simulation position gain, a simulation speed gain, and a simulation integration gain, outputting the same through a connector 15CN2, and renewing the simulation position gain, simulation speed gain and simulation integration gain of the simulation PID controlling portion 8.

In the central processor 10a7B shown in FIG. 26, the first B step, second B step and adjustment step 10a7a are carried out in the sequence shown in FIG. 26.

The first B step establishes a simulation position instruction array, a canonical gain, the first size array, the second size array, the third size array, number of children of the child groups of gains, the number of parents of the parent groups of gains, and number of generations. However, the parent gains in the parent groups of gains are those established so that a gain array including a position gain, a speed gain and an integration gain and compensation gain can be brought about.

The second B step initializes the parent groups of gains and codes the parent groups of gains.

In a real compensator shown in FIG. 23, the second real torque signal is obtained by a second differentiator and a coefficient unit with respect to the real position instruction that is inputted through a connector 39CN1, and is outputted through a connector 39CN2. However, the coefficient of the above-described coefficient unit is renewed by renewing the real compensation gain that is inputted through a connector 39CN3.

In the simulation compensator 14 shown in FIG. 25, the second simulation torque signal is obtained by the second differentiator and a coefficient unit with respect to the simulation position instruction, which is inputted through a connector 40CN1, and is outputted through a connector 40CN2. However, the coefficient of the above-described coefficient unit is renewed by renewing the simulation compensation gain that is inputted through a connector 40CN3.

The adder 15 shown in FIG. 22 adds the first real torque signal, which is inputted from the input side of the adder 15, to the second real torque signal, and outputs the real torque signal.

The adder 16 shown in FIG. 22 adds the first simulation torque signal, which is inputted from the input side of the adder 15, to the second simulation torque signal, and outputs the simulation torque signal.

Figure 28:
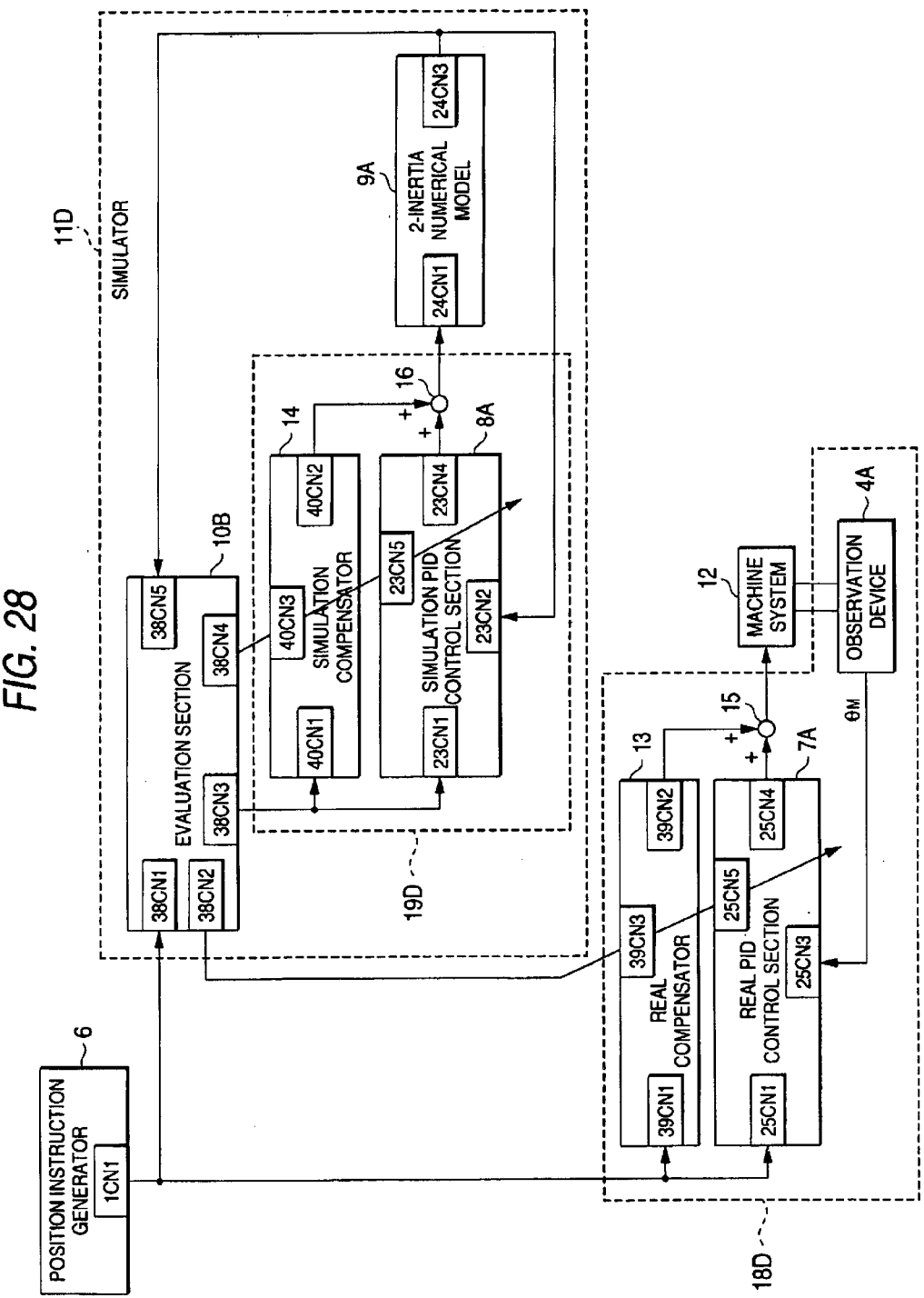
FIG. 28 is a block diagram showing a fifth embodiment of the invention.

Hereinafter, a description is given of the fifth embodiment of the invention with reference to FIG. 28. FIG. 28 is a block diagram showing the entirety of the fifth embodiment of the invention. In FIG. 28, the fifth embodiment according to the invention is composed of a machine system 12, an observation device 4A, a position instruction generator 6, a real PID controlling portion 7A, a simulation PID controlling portion 8A, a 2-inertia numerical model 9A, an evaluation portion 10, a real compensator 13, a simulation compensator 14, and adders 15 and 16, wherein the load machine 1, transmission 2, drive unit 3, observation device 4A, power conversion circuit 5, and position instruction generator 6 are identical to those in the prior art.

The real PID controlling portion 7A, simulation PID controlling portion 8A, 2-inertia numerical model 9A, evaluation portion 10, real compensator 13, simulation compensator 14, and adders 15 and 16 are those described above. Hereinafter, overlapping description thereof is omitted.

Figure 29:
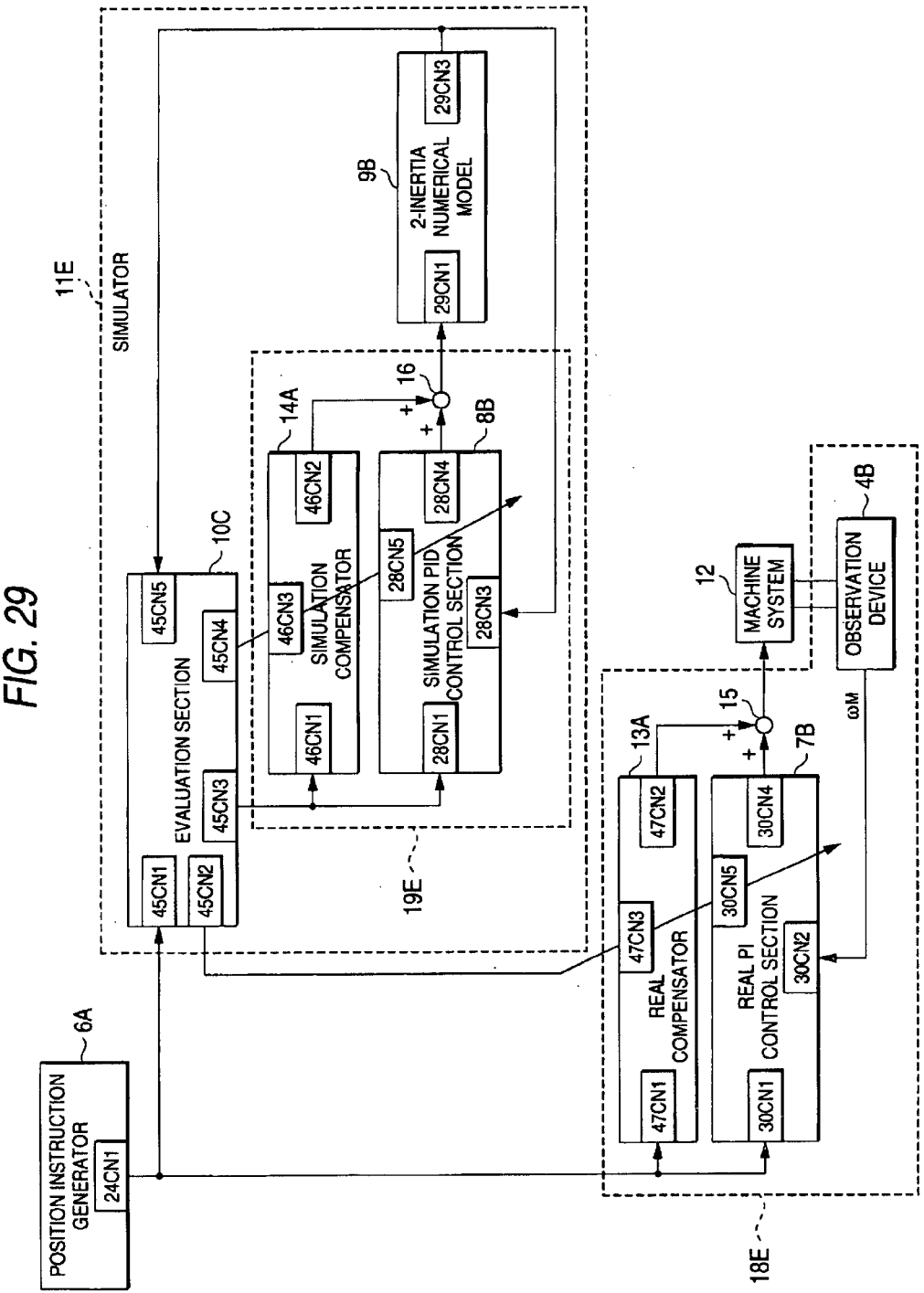
FIG. 29 is a block diagram showing a sixth embodiment of the invention.

Hereinafter, a description is given of the sixth embodiment according to the invention with reference to FIG. 29 through FIG. 34. FIG. 29 is a block diagram showing the entirety of the sixth embodiment according to the invention. In FIG. 29, the sixth embodiment according to the invention is composed of a machine system 12, observation device 4B, speed instruction generator 6A, real PI controlling portion 7B, simulation PI controlling portion 8B, 2-inertia numerical model 9B, evaluation portion 10C, real compensator 13A, simulation compensator 14A, and adders 15 and 16, wherein the machine system 12 and speed instruction generator 6A are identical to those in the prior art.

The real PI controlling portion 7B, simulation PI controlling portion 8B, 2-inertia numerical model 9B, and adders 15 and 16 are those described above, and hereinafter, overlapping description thereof is omitted.

Figure 32:
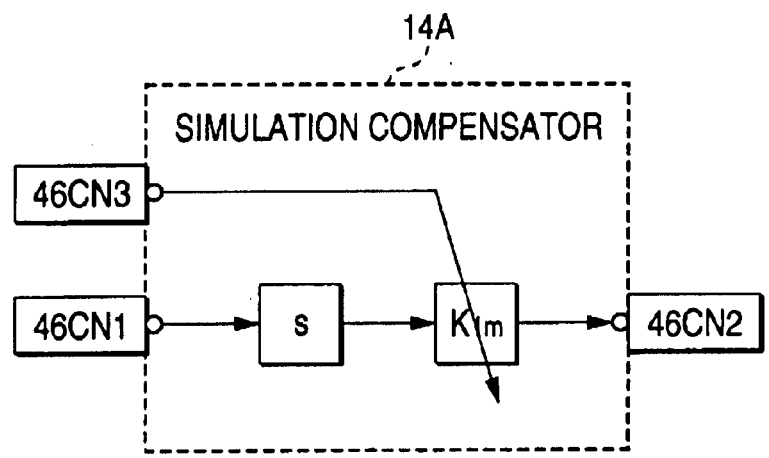
FIG. 32 is a block diagram showing a simulation compensator according to the sixth embodiment of the invention.

FIG. 32 is a block diagram showing a detailed construction of the above-described evaluation portion 10C. In FIG. 32, the evaluation portion 10C is composed of an upper-grade controller 10aC and an optimization adjuster 10b.

Figure 34:
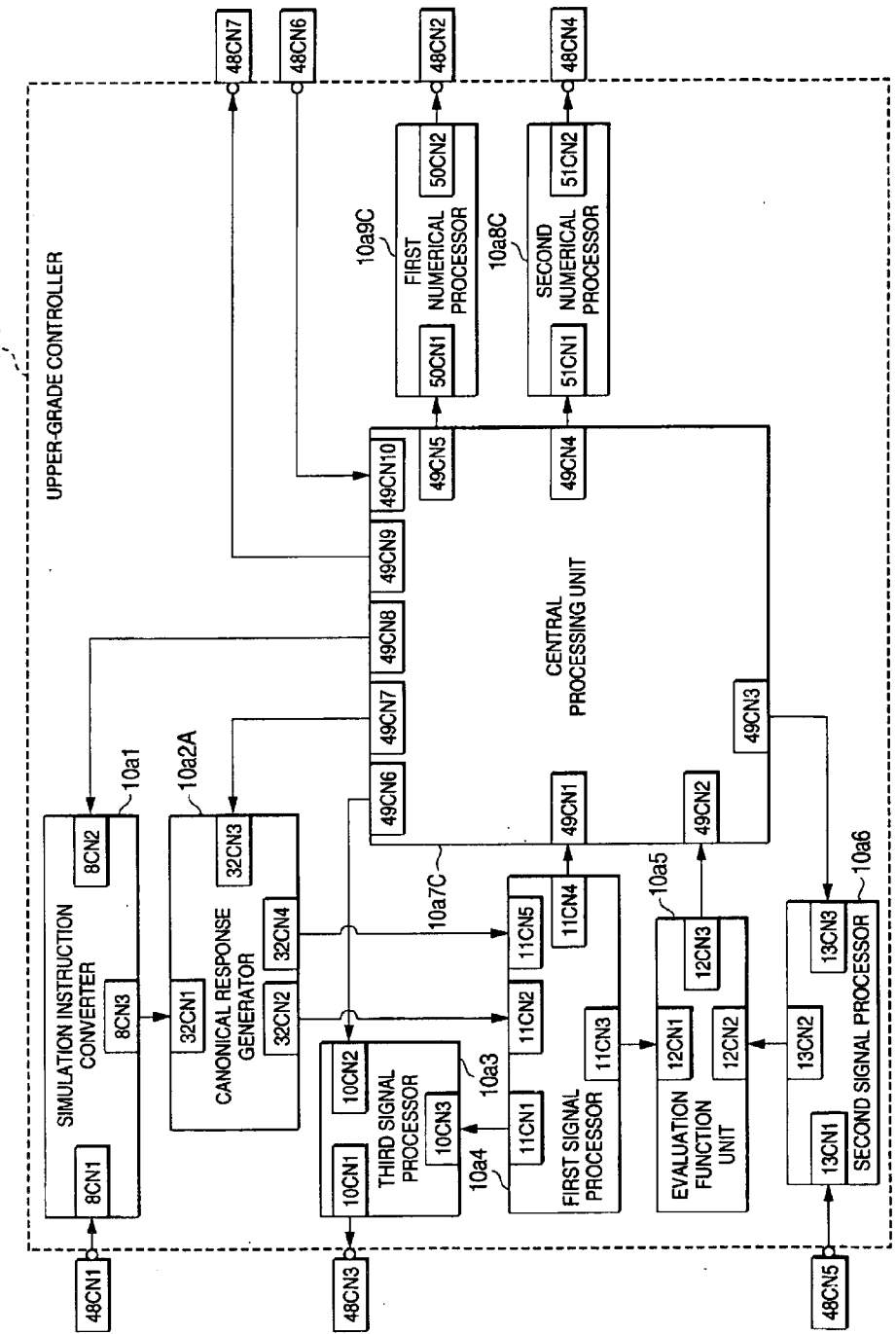
FIG. 34 is a block diagram showing an upper-grade controller according to the sixth embodiment of the invention.

FIG. 34 is a block diagram showing a detailed construction of the above-described upper-grade controller 10aC. In FIG. 34, the upper-grade controller 10aC is composed of a simulation instruction converter 10a1, a canonical response generator 10a2A, the third signal processor 10a3, the first signal processor 10a4, an evaluation function unit 10a5, the second signal processor 10a6, a central processor 10a7C, the second numerical processor 10a8C, and the first numerical processor 10a9C.

Figure 33:
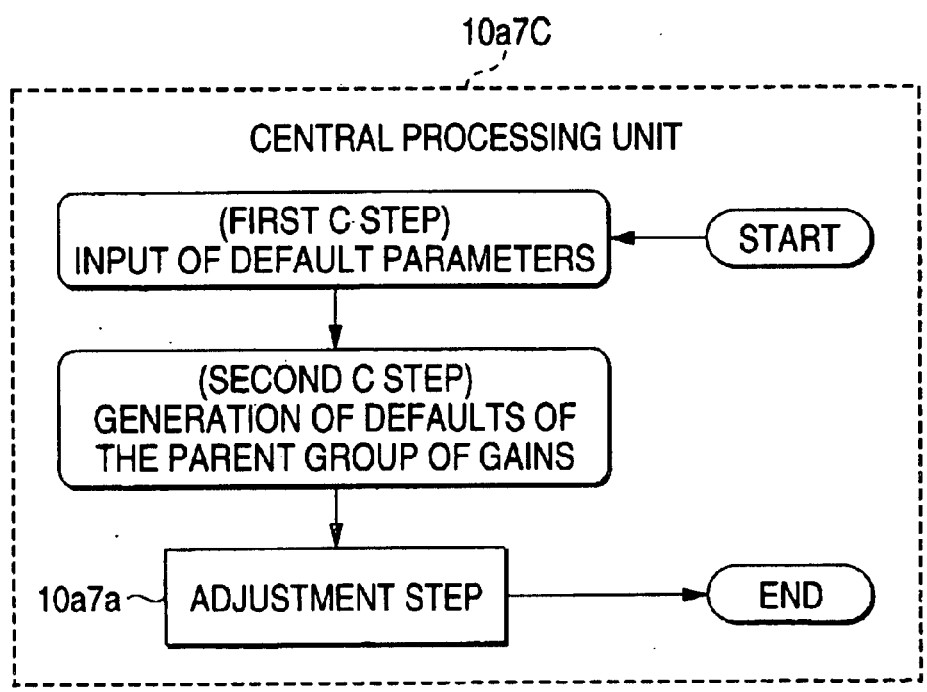
FIG. 33 is a flow chart showing the central processing unit according to the sixth embodiment of the invention.

FIG. 33 is flow chart showing a detailed construction of the above-described central processor 10a7C. In FIG. 33, the above-described central processor 10a7C is composed of an adjustment step 10a7a, the first C step and the second C step.

The optimization adjuster 10b, simulation instruction converter 10a1, canonical response generator 10a2A, the third signal processor 10a3, the first signal processor 10a4, evaluation function unit 10a5, and the second signal processor 10a6 are those described above. Hereinafter, overlapping description thereof is omitted.

Figure 30:
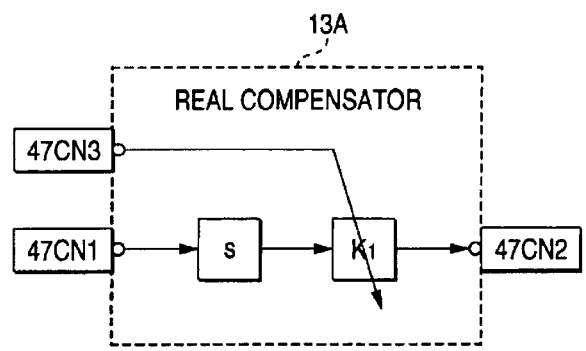
FIG. 30 is a block diagram showing a real compensator according to the sixth embodiment of the invention.
Figure 31:
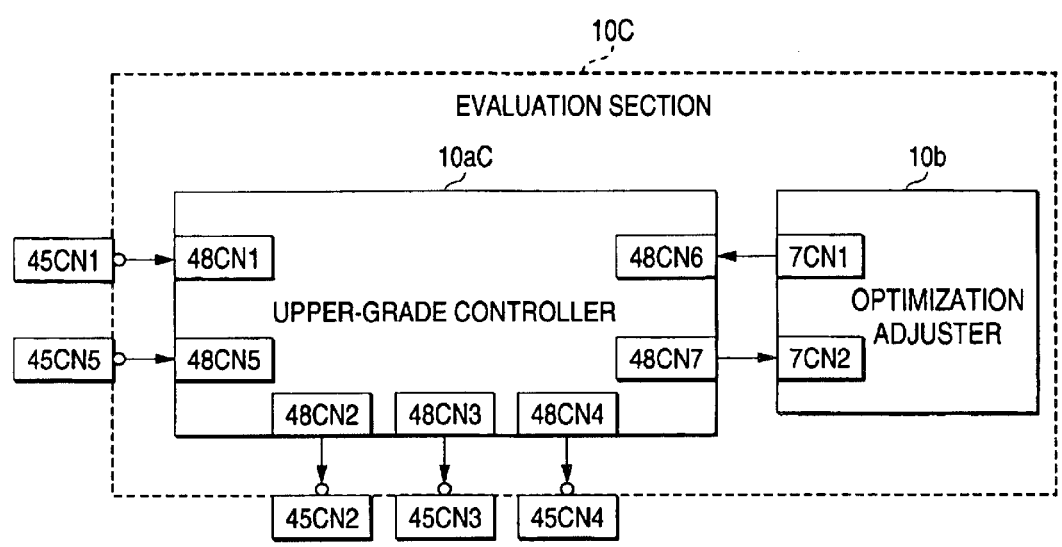
FIG. 31 is a block diagram showing an evaluation portion according to the sixth embodiment of the invention.

FIG. 30 is a block diagram showing a detailed construction of the real compensator 13A. In FIG. 30, the real compensator 13A is composed of one differentiator and one coefficient.

FIG. 32 is a block diagram showing a detailed construction of the simulation compensator 14A. In FIG. 32, the real compensator 14A is composed of one differentiator and one coefficient.

Next, a description is given of the actions of the sixth embodiment with reference to FIG. 29 through FIG. 35. First, in the evaluation portion 10C shown in FIG. 31, the real speed instruction and simulation speed signal, which are inputted through connectors 45CN1 and 45CN5, are inputted into connectors 48CN1 and 48CN5 of the upper-grade controller 10aC. The first simulation speed instruction signal is obtained from a connector 48CN3 of the upper-grade controller 10aC by the upper-grade controller 10aC and optimization adjuster 10b, and is outputted from a connector 45CN3. The real speed gain and real integration gain are obtained from a connector 48CN2 of the upper-grade controller 10aC, and is outputted from a connector 45CN2. The simulation speed gain and simulation integration gain are obtained from a connector 48CN4 of the upper-grade controller 10aC, and are outputted from a connector 45CN4.

In the upper-grade controller 10aC shown in FIG. 34, the real speed instruction, which is inputted through a connector 48CN1, is inputted into a connector 8CN1 of the simulation instruction converter 10a1, and the simulation speed signal, which is inputted through a connector 48CN5, is inputted into a connector 13CN1 of the second signal processor 10a6. Child groups of gains, which are inputted through a connector 48CN6, are inputted into a connector 49CN10 of the central processor 10a7C, and the first simulation speed instruction signal, which is obtained by a connector 10CN1 of the third signal processor 10a3, is outputted from a connector 48CN3 by the simulation instruction converter 10a1, canonical response generator 10a2A, the third signal processor 10a3, the first signal processor 10a4, evaluation function unit 10a5, the second signal processor 10a6, central processor 10a7, the second numerical processor 10a8C, and the first numerical processor 10a9C. The evaluation value array and parent groups of gains, which are obtained by a connector 49CN9 of the central processor 10a7C, are outputted from a connector 48CN7, and the real speed gain and real integration gain, which are obtained through a connector 50CN2 of the first numerical processor 10a9C, are outputted from a connector 48CN2. The simulation speed gain and simulation integration gain, which are obtained through a connector 50CN2 of the second numerical processor 10a8C, are outputted through a connector 48CN4.

The first numerical processor 10a9C is provided with a means for dividing a new real gain array, which is inputted through a connector 50CN1, into a real speed gain, real integration gain and real compensation gain, outputting the same from a connector 50CN2, and renewing the real speed gain and real integration gain of the real PI controlling portion 7B, and the real compensation gain of the real compensator 13A.

The second numerical processor 10a8C is provided with a means for dividing a new simulation gain array, which is inputted through a connector 51CN1, into a simulation speed gain, a simulation integration gain and a simulation compensation gain, outputting the same through a connector 51CN2, and renewing the simulation speed gain and simulation integration gain of the simulation PI controlling portion 8B, and the simulation compensation gain of the simulation compensator 14A.

In the central processor 10a7C shown in FIG. 33, the first C step, the second C step and adjustment step 10a7a are carried out in the sequence shown in FIG. 33.

The first C step establishes a simulation speed instruction array, canonical gain, the first size array, the second size array, the third size array, number of children of the child groups of gains, number of parents of the parent groups of gains, and number of generations. The parent gains of the parent groups of gains are those established so that a gain array including a speed gain, integration gain and compensation gain can be brought about.

The second C step initializes the parent groups of gains at random and codes the parent groups of gains.

Since the adjustment step 10a7a has been already described with respect to the first embodiment, the description thereof is omitted herein.

In the real compensator 13A shown in FIG. 30, the second real torque signal is obtained by a differentiator and a coefficient unit with respect of the real speed instruction that is inputted through a connector 47CN1, and is outputted through a connector 47CN2. However, the coefficient of the above-described coefficient unit is renewed by renewing the real compensation gain that is inputted through a connector 47CN3.

In the simulation compensator 14A shown in FIG. 32, the second simulation torque signal is obtained by a differentiator and a coefficient unit with respect to the simulation position instruction that is inputted through a connector 46CN1, and is outputted through a connector 46CN2. However, the coefficient of the above-described coefficient unit is renewed by renewing the simulation compensation gain that is inputted through a connector 46CN3.

Figure 35:
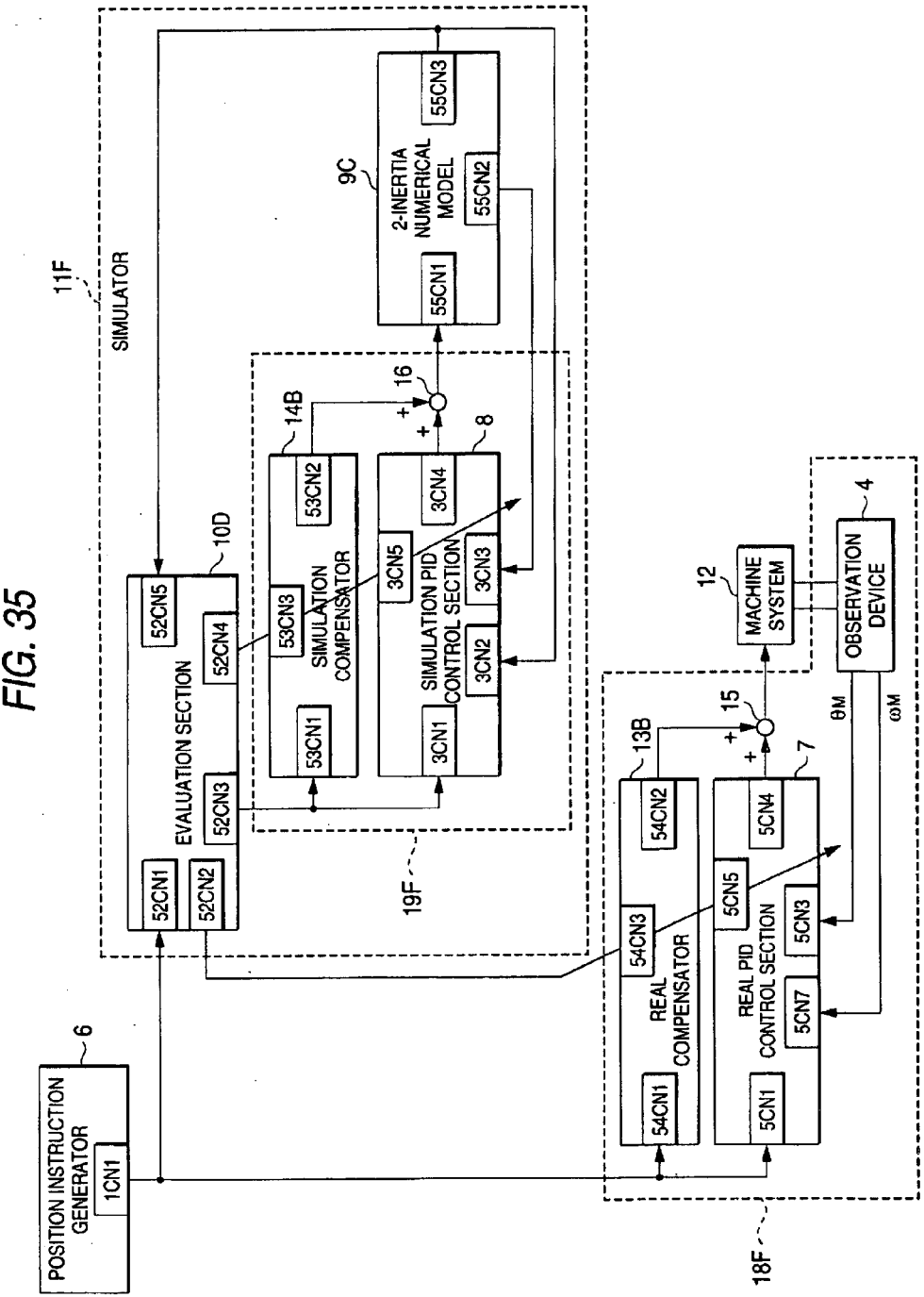
FIG. 35 is a block diagram showing a seventh embodiment of the invention.

Hereinafter, a description is given of the seventh embodiment according to the invention with reference to FIG. 35 through FIG. 47. FIG. 35 is a block diagram showing the entirety of the seventh embodiment according to the invention. In FIG. 35, the seventh embodiment according to the invention is composed of a machine system 12, an observation device 4, a position instruction generator 6, a real PID controlling portion 7, a simulation PID controlling portion 8, a 2-inertia numerical model 9C, an evaluation portion 10D, a real compensator 13B, a simulation compensator 14B, and adders 15 and 16. The machine system 12, observation device 4, and position instruction generator 6 are identical to those of the prior art.

The real PID controlling portion 7, simulation PID controlling portion 8, and adders 15 and 16 are those described above, and hereinafter, overlapping description thereof is omitted.

Figure 40:
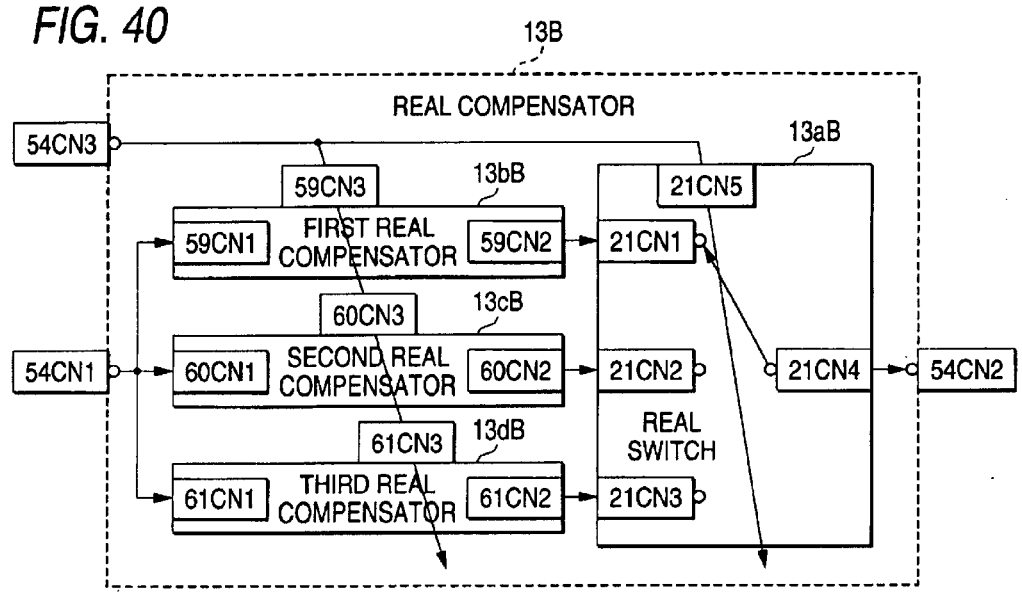
FIG. 40 is a block diagram showing a real compensator according to the seventh embodiment of the invention.

FIG. 40 is a block diagram showing a detailed construction of the real compensator 13B. In FIG. 40, the real compensator 13B is composed of the first real compensator 13cB, the second real compensator 13dB, and real switch 13aB.

Figure 41:
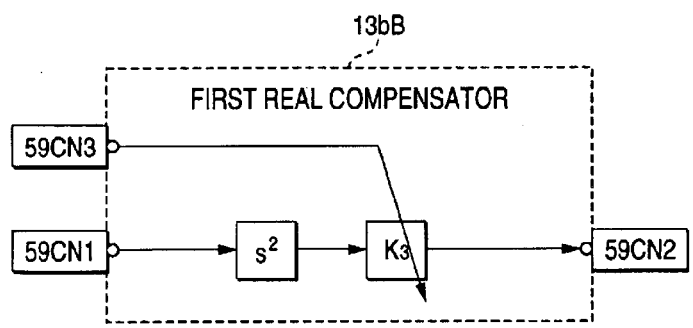
FIG. 41 is a block diagram showing the first real compensator according to the seventh embodiment of the invention.

FIG. 41 is a block diagram showing a detailed construction of the first real compensator 13bB. In FIG. 41, the real compensator 13dB is composed of one secondary differentiator and one coefficient unit.

Figure 42:
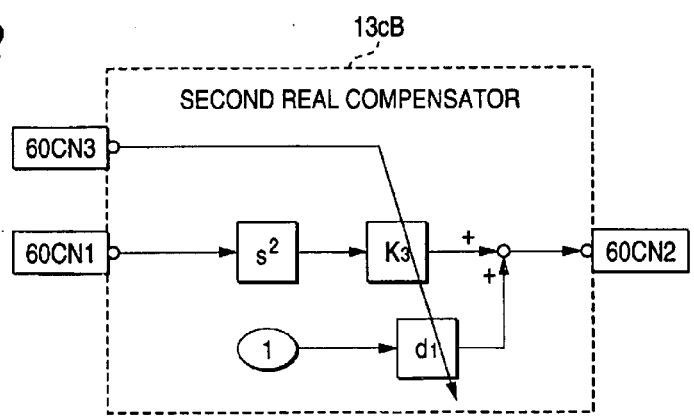
FIG. 42 is a block diagram showing the second real compensating portion according to the seventh embodiment of the invention.

FIG. 42 is a block diagram showing a detailed construction of the second real compensator 13cB. In FIG. 42, the real compensator 13cB is composed of one secondary differentiator and two coefficient units, and one adder.

Figure 43:
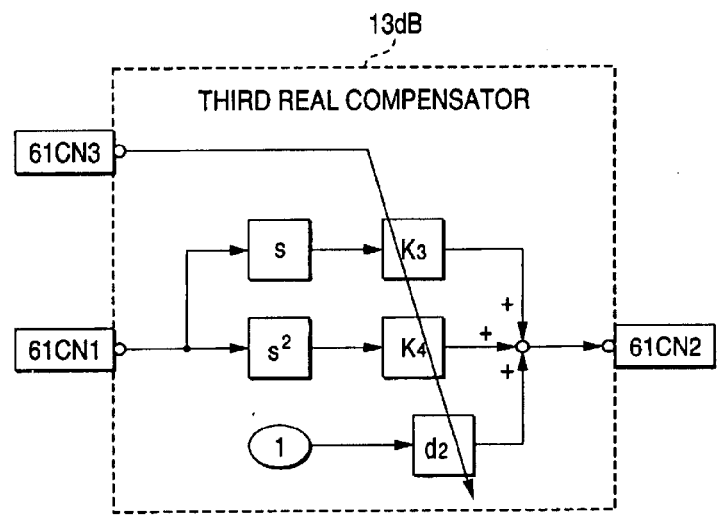
FIG. 43 is a block diagram showing the third real compensating portion according to the seventh embodiment of the invention.

FIG. 43 is a block diagram showing a detailed construction of the second real compensator 13dB. In FIG. 43, the real compensator 13dB is composed of one secondary differentiator, one differentiator, three coefficient units, and one adder.

Figure 36:
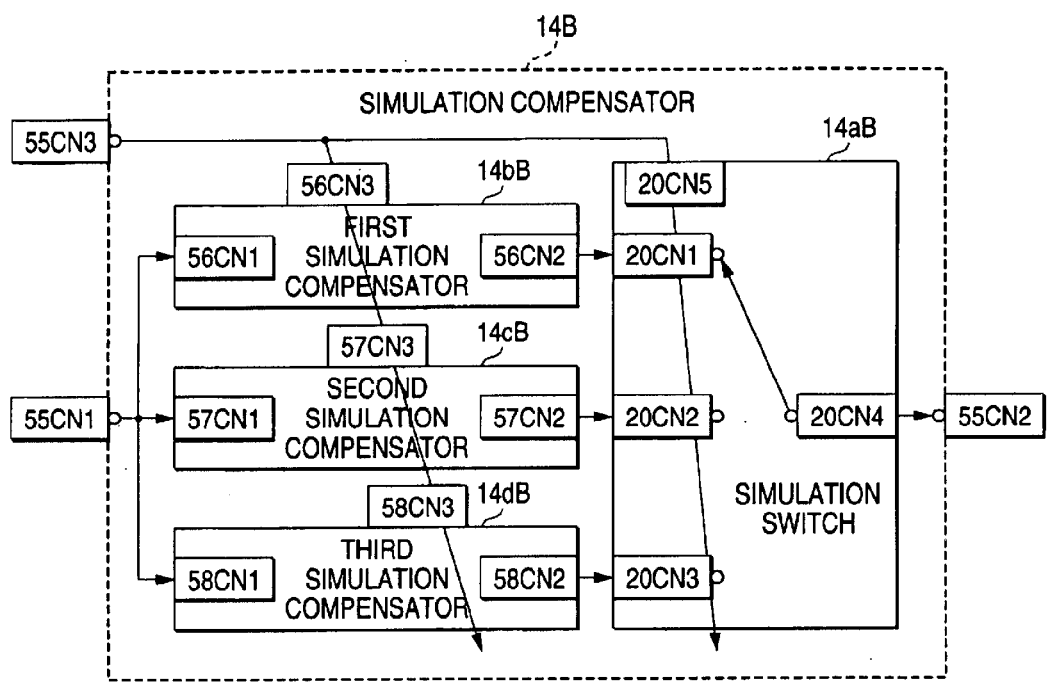
FIG. 36 is a block diagram showing a simulation compensator according to the seventh embodiment of the invention.

FIG. 36 is a block diagram showing a detailed construction of a simulation compensator 14B. In FIG. 36, the real compensator 14B is composed of the first simulation compensator 14bB, the second simulation compensator 14cB and a simulation switch 14aB.

Figure 37:
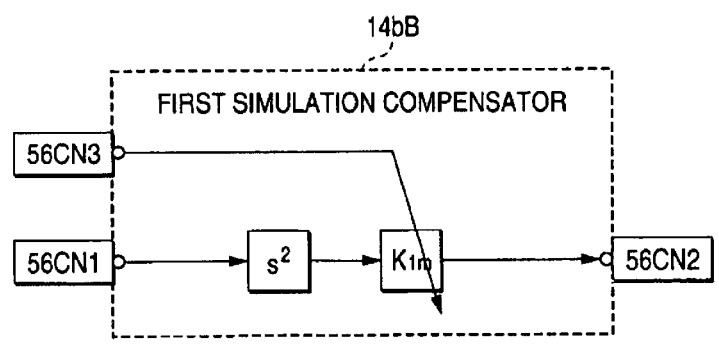
FIG. 37 is a block diagram showing the first simulation compensator according to the seventh embodiment of the invention.

FIG. 37 is a block diagram showing a detailed construction of the first simulation compensator 14bB. In FIG. 37, the simulation compensator 14bB is composed of a secondary differentiator and a coefficient unit.

Figure 38:
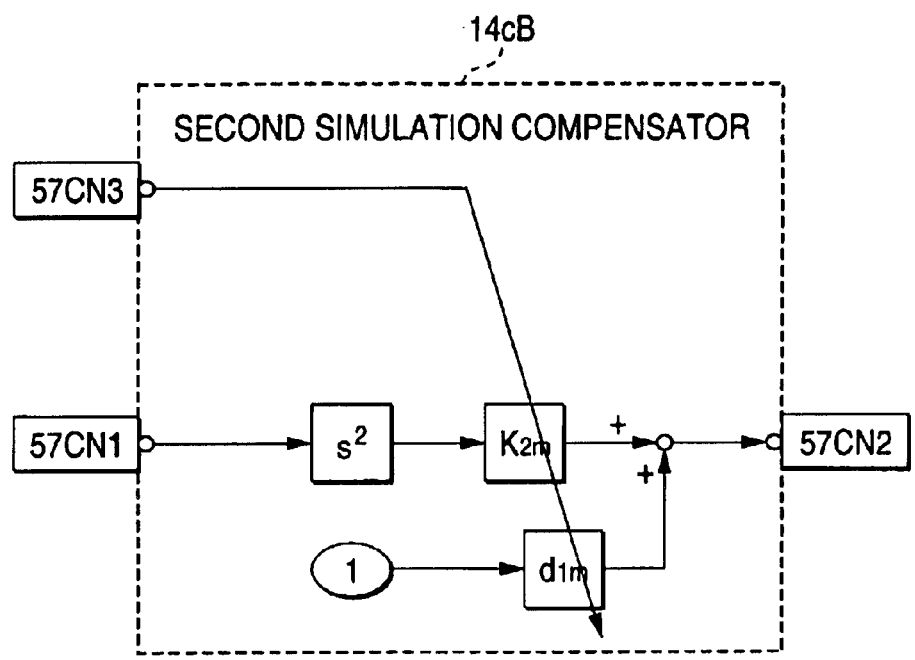
FIG. 38 is a block diagram showing the second simulation compensator according to the seventh embodiment of the invention.

FIG. 38 is a block diagram showing a detailed construction of the first simulation compensator 14cB. In FIG. 38, the simulation compensator 14cB is composed of a secondary differentiator, two coefficient units, and an adder.

Figure 39:
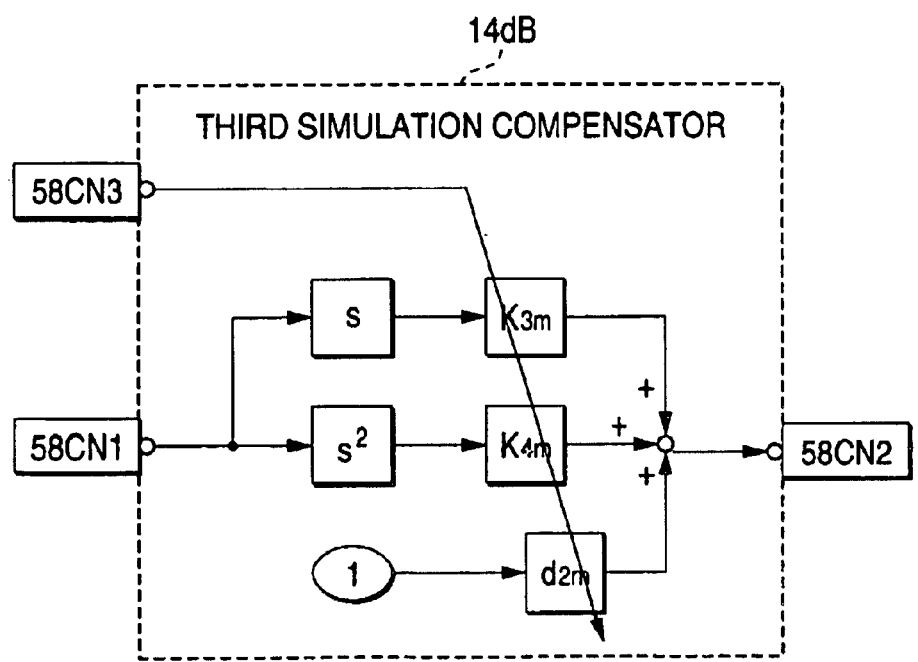
FIG. 39 is a block diagram showing the third simulation compensator according to the seventh embodiment of the invention.

FIG. 39 is a block diagram showing a detailed construction of the second simulation compensator 14dB. In FIG. 39, the simulation compensator. 14dB is composed of a secondary differentiator, a differentiator, three coefficient units, and an adder.

Figure 44:
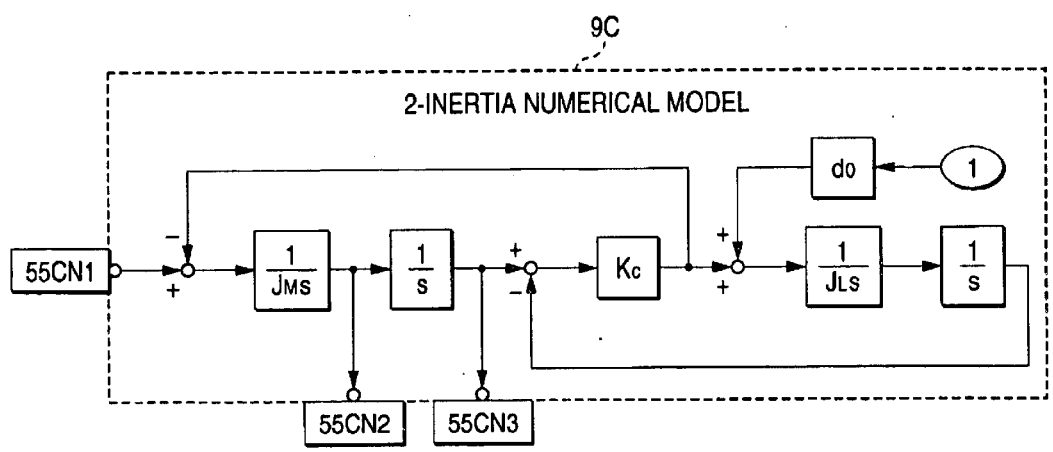
FIG. 44 is a block diagram showing a 2-inertia numerical model according to the seventh embodiment of the invention.

FIG. 44 is a block diagram showing a detailed construction of the 2-inertia numerical model 9C. In FIG. 44, the 2-inertia numerical model 9C is composed of four integrators, two coefficient units, two subtracters, and an adder.

Figure 45:
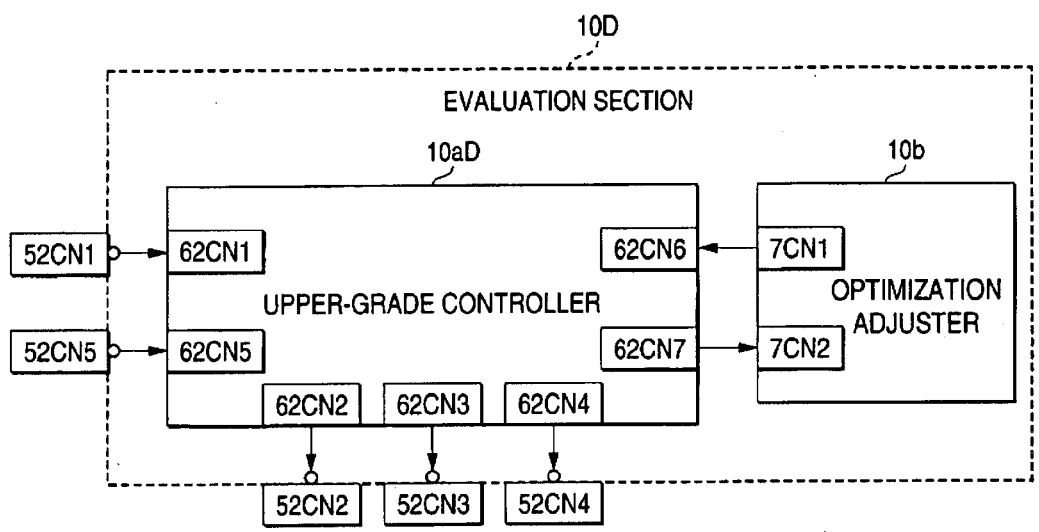
FIG. 45 is a block diagram showing an evaluation portion according to the seventh embodiment of the invention.

FIG. 45 is a block diagram showing a detailed construction of the above-described evaluation portion 10D. In FIG. 45, the evaluation portion 10D is composed of an upper-grade controller 10aD and an optimization adjuster 10b. The optimization adjuster 10b is one that is described above. Hereinafter, overlapping description thereof is omitted.

Figure 47:
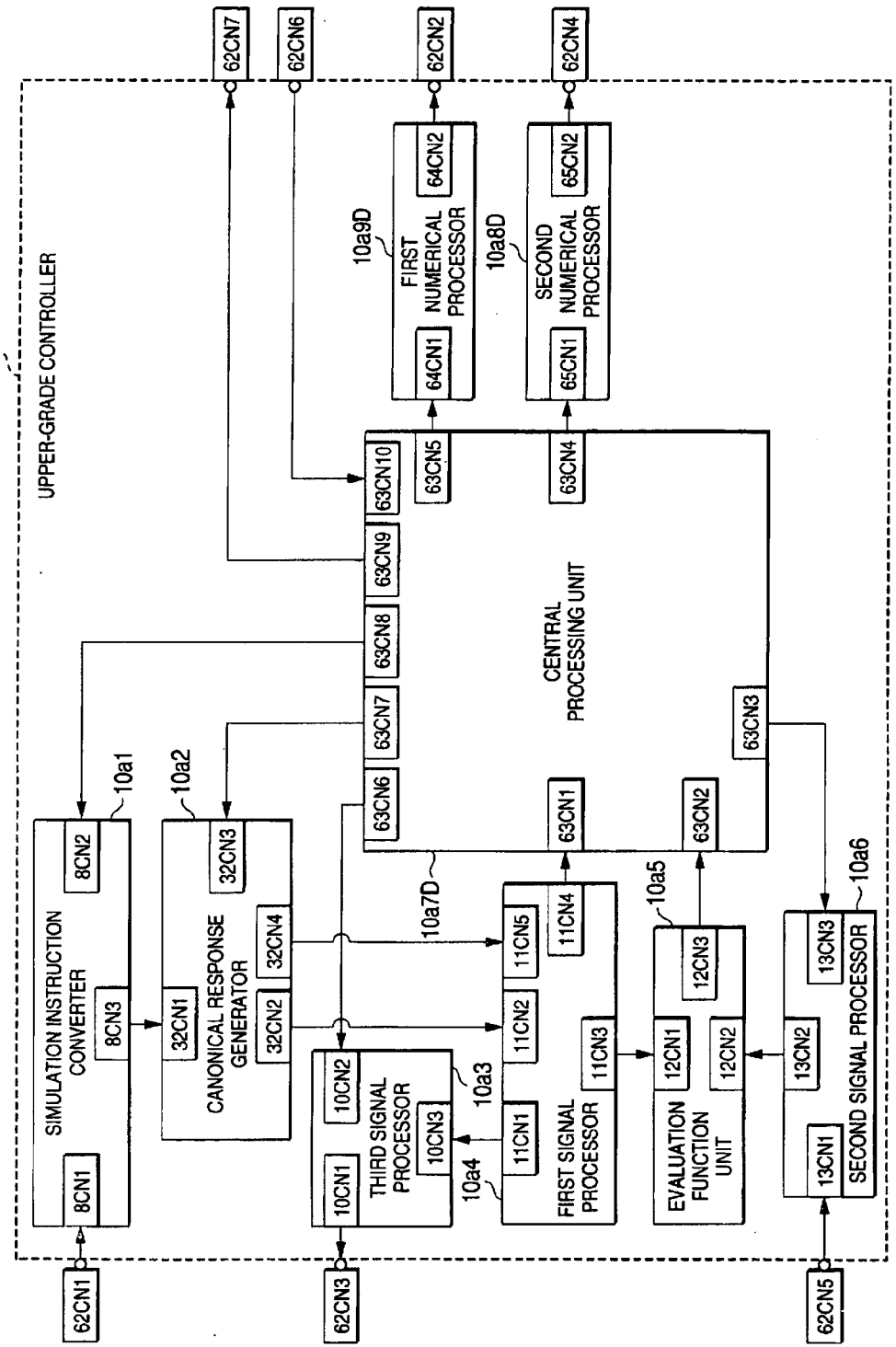
FIG. 47 is a block diagram showing an upper-grade controller according to the seventh embodiment of the invention.

FIG. 47 is a block diagram showing a detailed construction of the above-described upper-grade controller 10aD. In FIG. 47, the upper-grade controller 10aD is composed of a simulation instruction converter 10a1, a canonical response generator 10a2, the third signal processor 10a3, the first signal processor 10a4, an evaluation function unit 10a5, the second signal processor 10a6, a central processor 10a7D, the second numerical processor 10a8D, and the fist numerical processor 10a9D. The simulation instruction converter 10a1, canonical response generator 10a2, third signal processor 10a3, first signal processor 10a4, evaluation function unit 10a5, and second signal processor 10a6 are those described above, and overlapping description thereof is omitted hereinafter.

Figure 46:
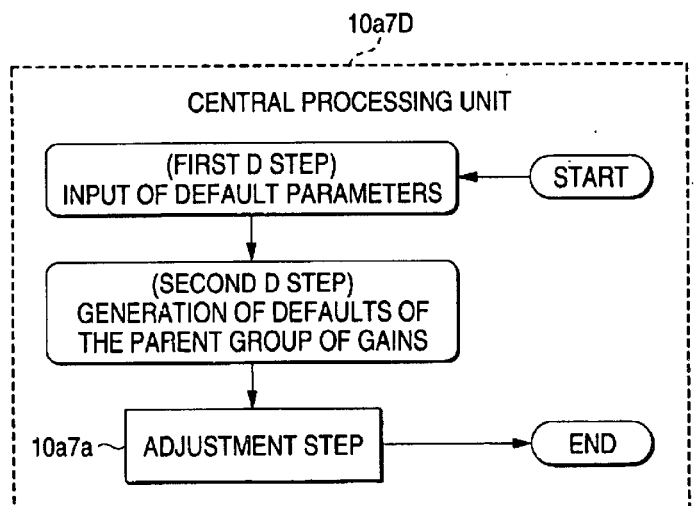
FIG. 46 is a flow chart showing the central processing unit according to the seventh embodiment of the invention.

FIG. 46 is a block diagram showing a detailed construction of the above-described central processor 10a7D. In FIG. 46, the above-described central processor 10a7D is composed of an adjustment step 10a7a, the first D step, and the second D step. The adjustment step 10a7a is that described above. Hereinafter, overlapping description thereof is omitted.

Next, a description is given of actions of the seventh embodiment with reference to FIG. 35 through FIG. 47. First, the 2-inertia numerical model 9C shown in FIG. 44 carries out an approximation expression of the input and output characteristics of the above-described machine system. In the 2-inertia numerical model 9 shown in FIG. 44, a simulation position signal and a simulation speed signal are obtained by the four integrators, three adders and two coefficient units, which are shown in FIG. 44, with respect to the simulation torque signal inputted through a connector 55CN1, and are, respectively, outputted through connectors 55CN2 and 55CN3.

In the evaluation portion 10D shown in FIG. 45, the real position instruction and simulation position signal, which are inputted through connectors 52CN1 and 52CN2, are inputted into connectors 62CN1 and 62CN2 of the upper-grade controller 10aD. The first simulation position instruction signal is obtained through a connector 62CN3 of the upper-grade controller 10aD by the upper-grade controller 10aD and optimization adjuster 10b, and is outputted through the connector 53CN3. A real position gain, real speed gain, real integration gain and real compensation gain are obtained through a connector 62CN2 of the upper-grade controller 10aD, and are outputted through the connector 52CN2. A simulation position gain, simulation speed gain, simulation integration gain, and simulation compensation gain are obtained through a connector 62CN4 of the upper-grade controller 10aD, and are outputted through a connector 52CN4.

In the upper-grade controller 10aD shown in FIG. 47, the real position instruction that is inputted through the connector 62CN1 is inputted into a connector 8CN1 of the simulation instruction converter 10a1, the simulation position signal that is inputted through a connector 62CN5 is inputted into a connector 13CN1 of the second signal processor 10a6, and a child group of gains, which is inputted through a connector 62CN6, is inputted into a connector 63CN10 of the central processor 10a7D. By the simulation instruction converter 10a1, canonical response generator 10a2, third signal processor 10a3, first signal processor 10a4, evaluation function unit 10a5, second signal processor 10a6, central processor 10a7D, second numerical processor 10a8D, and first numerical processor 10a9D, the first simulation position instruction signal, which is obtained through a connector 10CN1 of the third signal processor 10a3, is outputted from the connector 62CN3, an evaluation value array and a parent group of gains, which are obtained through a connector 63CN9 of the central processor 10a7D, are outputted through a connector 62CN7, a real position gain, a real speed gain, and a real integration gain, which are obtained through a connector 64CN2 of the first numerical processor 10a9D, are outputted through the connector 62CN2, and a simulation position gain, a simulation speed gain and a simulation compensation gain, which are obtained through a connector 65CN2 of the second numerical processor 10a8D, are outputted through the connector 62CN4.

The first numerical processor 10a9D is provided with a means for dividing a new real gain array, which is inputted through a connector 64CN1, into a real position gain, a real speed gain, and a real integration gain, outputting the same through a connector 64CN2, and renewing the real position gain, real speed gain and real integration gain of the real PID controlling portion 7 and the real compensation gain of the real compensator 13B.

The second numerical processor 10a8D is provided with a means for dividing a new simulation gain array, which is inputted through a connector 65CN1, into a simulation position gain, a simulation speed gain, a simulation integration gain, and a simulation compensation gain, outputting the same from a connector 65CN2, and renewing the simulation position gain, simulation speed gain and simulation integration gain of the simulation PID controlling portion 8, and the simulation gain of the simulation compensator 14B.

In the central processor 10a7B shown in FIG. 46, the first D step, second D step and adjustment step 10a7a are carried out in the sequence shown in FIG. 46.

The first D step establishes a simulation position instruction array, canonical gain, the first size array, the second size array, the third size array, number of child gains of the child group of gains, number of parents of the parent group of gains, and number of generations. However, the parent gains of the parent group of gains are those that are established so as to become a gain array including a position gain, speed gain, integration gain, and compensation gain. The compensation gain is one that is established so as to include coefficients of the compensator and switching conditions of a switch.

The second D step initializes the parent groups of gains at random and codes the parent groups of gains. In the real compensator 13B shown in FIG. 40, the second real torque signal is obtained from a connector 20CN4 of the real switch 13aB by the first real compensator 13cB, the second real compensator 13dB and real switch 13aB with respect to the real position instruction that is inputted through a connector 54CN1.

In the switch 14aB shown in FIG. 40, the switching conditions of the switch 14aB are renewed by renewing the first element of the real compensation gain that is inputted through a connector 20CN5, with respect to the first real compensation torque signal that is inputted through a connector 20CN1, the second real compensator torque signal that is inputted through a connector 20CN2, and the third real compensation torque signal that is inputted through a connector 20CN2, wherein any one of the same may be outputted from a connector 20CN4 from the first to third real compensation torque signals as the second real torque signal.

In the first real compensator 13dB shown in FIG. 41, the first real compensation torque signal is obtained by one secondary differentiator and one coefficient unit with respect to the real position instruction inputted through a connector 59CN1 and is outputted through a connector 59CN2. However, the coefficient of the above-described coefficient unit is renewed by renewing the second element of the real compensation gain inputted through the connector 59CN3.

In the second real compensator 13cB shown in FIG. 42, the second real compensator torque signal is obtained by one secondary differentiator, two coefficient unit and one adder with the real position instruction that is inputted through a connector 60CN1, and is outputted through a connector 60CN2. However, the coefficient of the above-described coefficient unit is renewed by renewing the third element of the real compensation gain that is inputted through a connector 63CN3.

In the third real compensator 13dB shown in FIG. 43, the third real compensation torque signal is obtained by one secondary differentiator, one differentiator, three coefficient units, and one adder with respect to the real position instruction that is inputted through the connector 61CN1, and is outputted through a connector 61CN2. However, the coefficient of the above-described coefficient units is renewed by renewing the fourth element of the real compensation gain that is inputted through a connector 61CN3.

In the simulation compensator 14B shown in FIG. 36, the second simulation torque signal is obtained from a connector 21CN4 of the simulation switch 14aB by the first simulation compensator 14cB, the second simulation compensator 13dB, and simulation switch 14aB with respect to the simulation position instruction that is inputted through a connector 53CN1, and is outputted through a connector 53CN2.

In the switch 14aB shown in FIG. 36, with respect to the first simulation compensation torque signal that is inputted through a connector 21CN1, the second simulation compensation torque signal that is inputted through a connector 21CN2, and the third simulation compensation torque signal that is inputted through a connector 21CN3, the switching conditions of the switch 14aB are renewed by renewing the first element of the simulation compensation gain that is inputted through a connector 21CN5, wherein any one of the first simulation compensation torque through the third simulation compensation torque is outputted through a connector 21CN4 as the second simulation torque signal.

In the first simulation compensator 14bB shown in FIG. 37, the first simulation compensation torque signal is obtained by one secondary differentiator and one coefficient unit with the simulation position instruction that is inputted through a connector 56CN1, and is outputted from a connector 56CN2. However, the coefficient of the above-described coefficient unit is renewed by renewing the second element of the simulation compensation gain that is inputted through a connector 56CN3.

In the second simulation compensator 14cB shown in FIG. 38, the second simulation compensation torque signal is obtained by one secondary differentiator, two coefficient units and one adder with respect to the simulation position instruction that is inputted through a connector 57CN1, and is outputted from a connector 57CN2. However, the coefficient of the above-described coefficient unit is renewed by renewing the third element of the simulation compensation gain that is inputted through a connector 57CN3.

In the third simulation compensator 14dB shown in FIG. 39, the third simulation compensation torque signal is obtained by one secondary differentiator, one differentiator, three coefficient units and one adder with respect to the simulation position instruction that is inputted through a connector 58CN1, and is outputted from a connector 58CN2. However, the coefficient of the above-described coefficient unit is renewed by renewing the fourth element of the simulation compensation gain that is inputted through a connector 58CN3.

Hereinafter, a description is given of the eighth embodiment of the invention with reference to FIG. 48 and FIG. 49.

Figure 48:
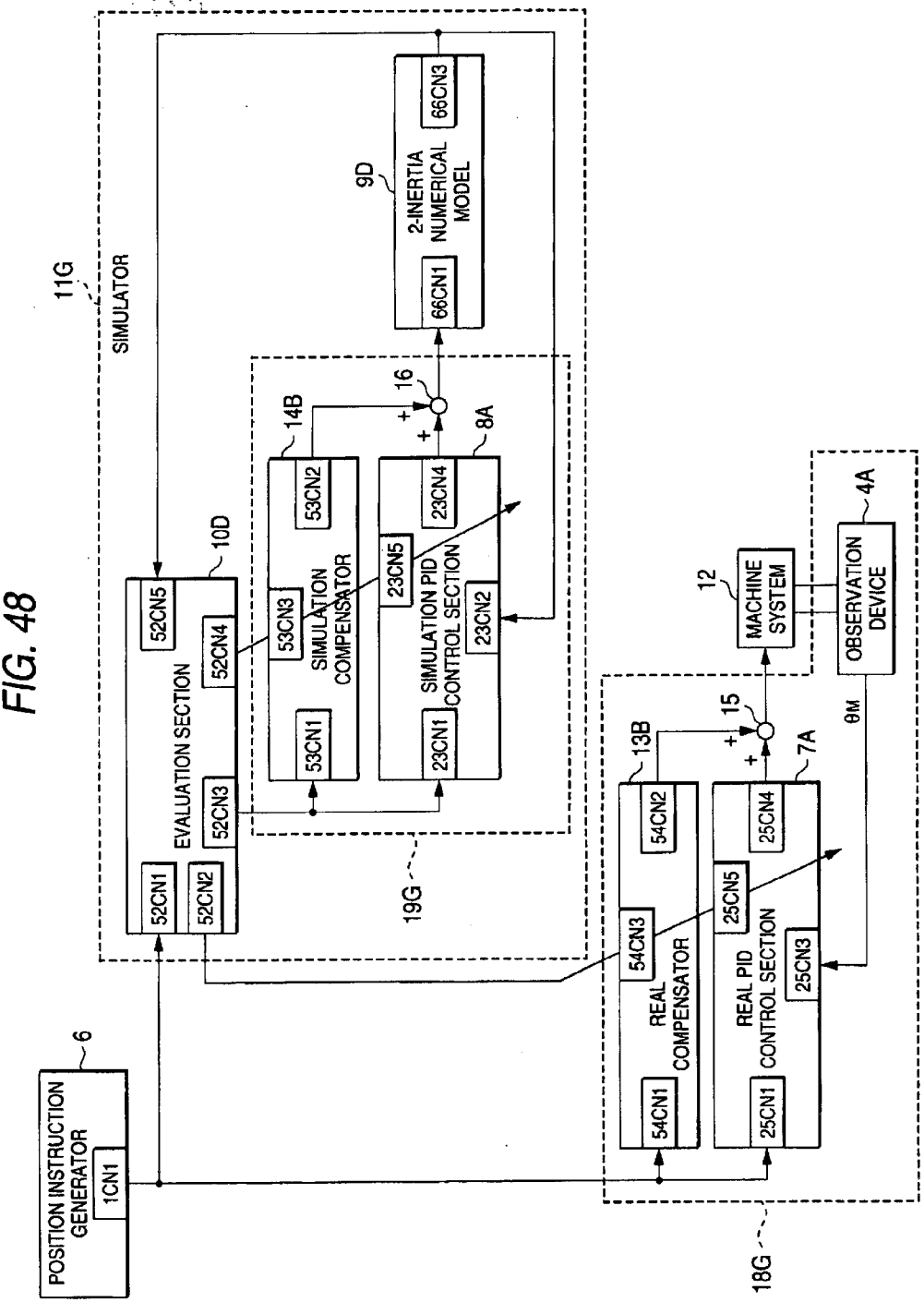
FIG. 48 is a block diagram showing an eighth embodiment of the invention.

FIG. 48 is a block diagram showing the entirety of the eighth embodiment of the invention. In FIG. 48, the eighth embodiment according to the invention is composed of a machine system 12, an observation device 4A, a position instruction generator 6, a real PID controlling portion 7A, a simulation PID controlling portion 8A, a 2-inertia numerical model 9D, an evaluation portion 10D, a real compensator 13B, a simulation compensator 14B, and adders 15 and 16, wherein the load machine 1, transmission 2, drive unit 3, observation device 4A, power conversion circuit 5, and position instruction generator 6 are identical to those in the prior art.

The real PID controlling portion 7A, simulation PID controlling portion 8A, evaluation portion 10, real compensator 13, simulation compensator 14, and adders 15 and 16 are those described above. Hereinafter, overlapping description thereof is omitted.

Figure 49:
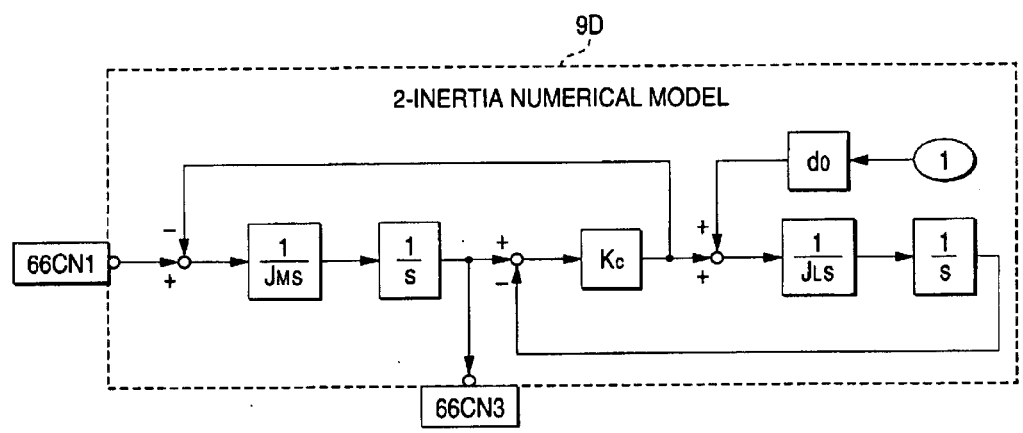
FIG. 49 is a block diagram showing a 2-inertia numerical model according to the eighth embodiment of the invention.

FIG. 49 is a block diagram showing a detailed construction of the above-2-inertia numerical model 9D. In FIG. 49, the above-described 2-inertia numerical model 9D is composed of four integrators, two coefficient units, two subtracters and one adder.

The 2-inertia numerical model 9D shown in FIG. 49 carries out an approximation expression of the input and output characteristics of the above-described machine system 12. In the 2-inertia numerical model 9D shown in FIG. 49, a simulation position signal is obtained by the four integrators, three adders and two coefficient units, which are shown in FIG. 49, with respect to the simulation torque signal that is inputted through a connector 66CN1, and is outputted from a connector 66CN3.

Hereinafter, a description is given of the ninth embodiment of the invention with reference to FIG. 50 through FIG. 62. FIG. 51 is a bloc diagram showing the entirety of the ninth embodiment of the invention. In FIG. 51, the ninth embodiment of the invention is composed of a machine system 12, an observation device 4B, a speed instruction generator 6A, a real PI controlling portion 7B, a simulation PI controlling portion 8B, a 2-inertia numerical model 9E, an evaluation portion 10E, a real compensator 13C, a simulation compensator 14C, adders 15 and 16. The machine system 12 and speed instruction generator 6A are identical to those of the prior arts.

The real PI controlling portion 7B, simulation PI controlling portion 8B, adders 15 and 16 are those that are described above. Hereinafter, overlapping description thereof is omitted.

Figure 56:
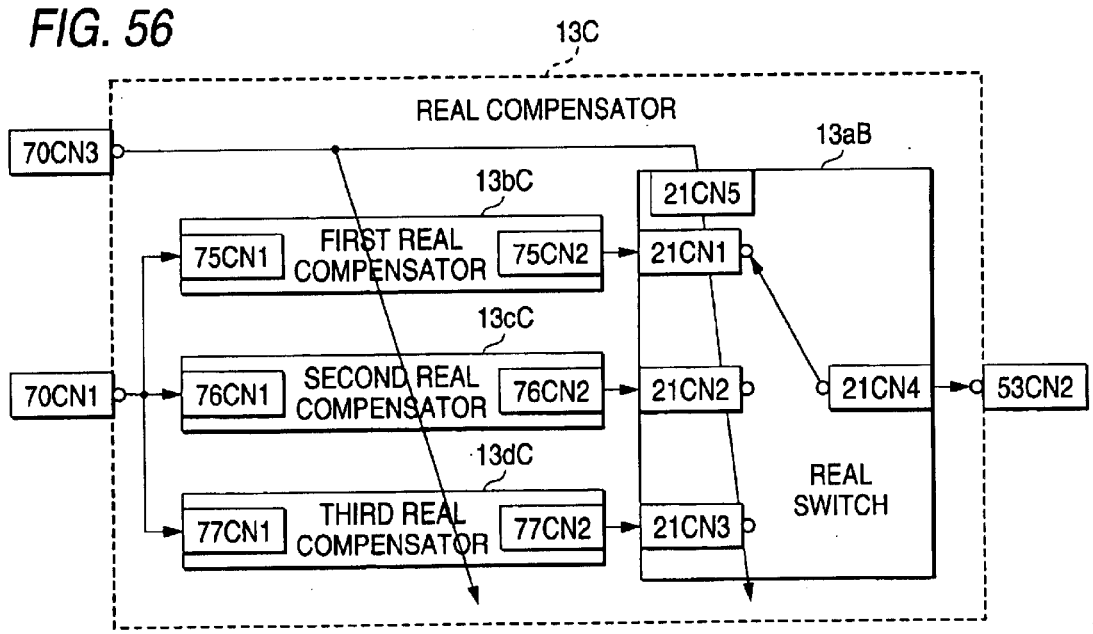
FIG. 56 is a block diagram showing a real compensating portion according to the ninth embodiment of the invention.

FIG. 56 is a block diagram showing a detailed construction of the real compensator 13C. In FIG. 56, the real compensator 13C is composed of the first real compensator 13cC, the second real compensator 13dC, and a real switch 13aB.

Figure 57:
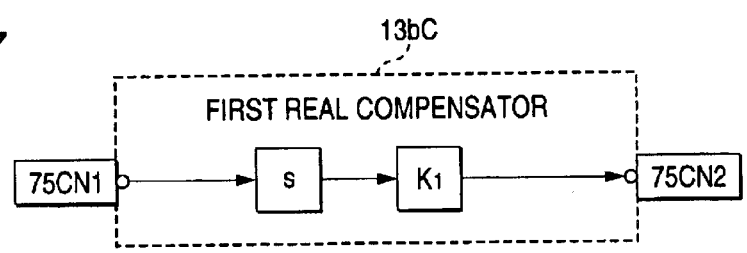
FIG. 57 is a block diagram showing the first real compensating portion according to the ninth embodiment of the invention.

FIG. 57 is a block diagram showing a detailed construction of the first real compensator 13bC. In FIG. 57, the real compensator 13bC is composed of one differentiator and one coefficient unit.

Figure 58:
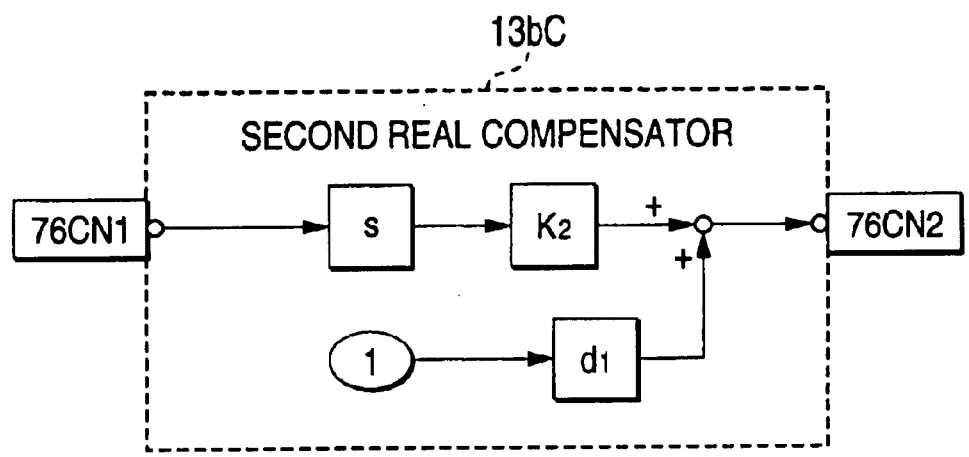
FIG. 58 is a block diagram showing the second real compensating portion according to the ninth embodiment of the invention.

FIG. 58 is a block diagram showing a detailed construction of the second real compensator 13cC. In FIG. 58, the real compensator 13cC is composed of one differentiator, two coefficient units and one adder.

Figure 59:
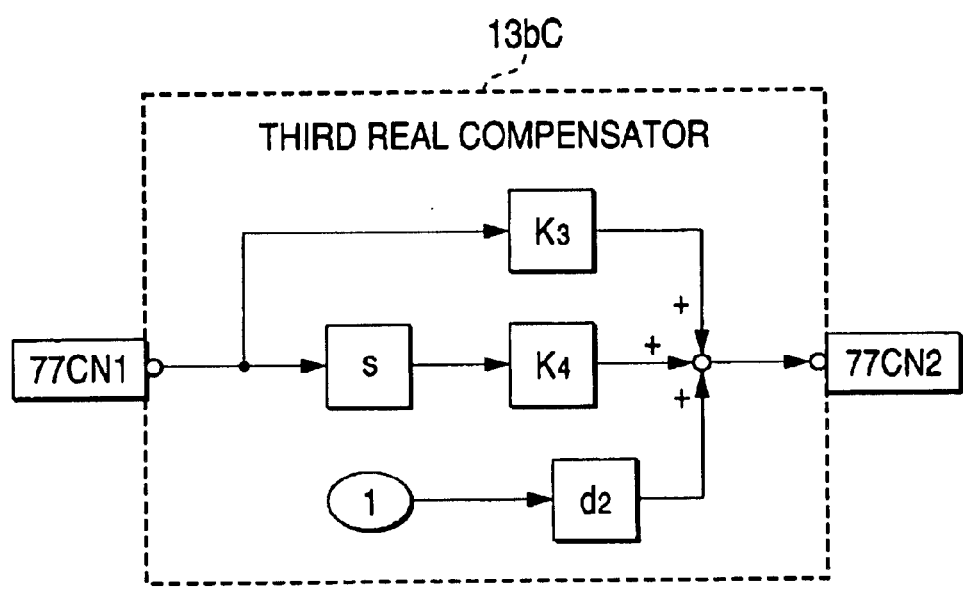
FIG. 59 is a block diagram showing the third real compensating portion according to the ninth embodiment of the invention.

FIG. 59 is a block diagram showing a detailed construction of the third real compensator 13dC. In FIG. 59, the real compensator 13dC is composed of one differentiator, three coefficient units, and one adder.

Figure 52:
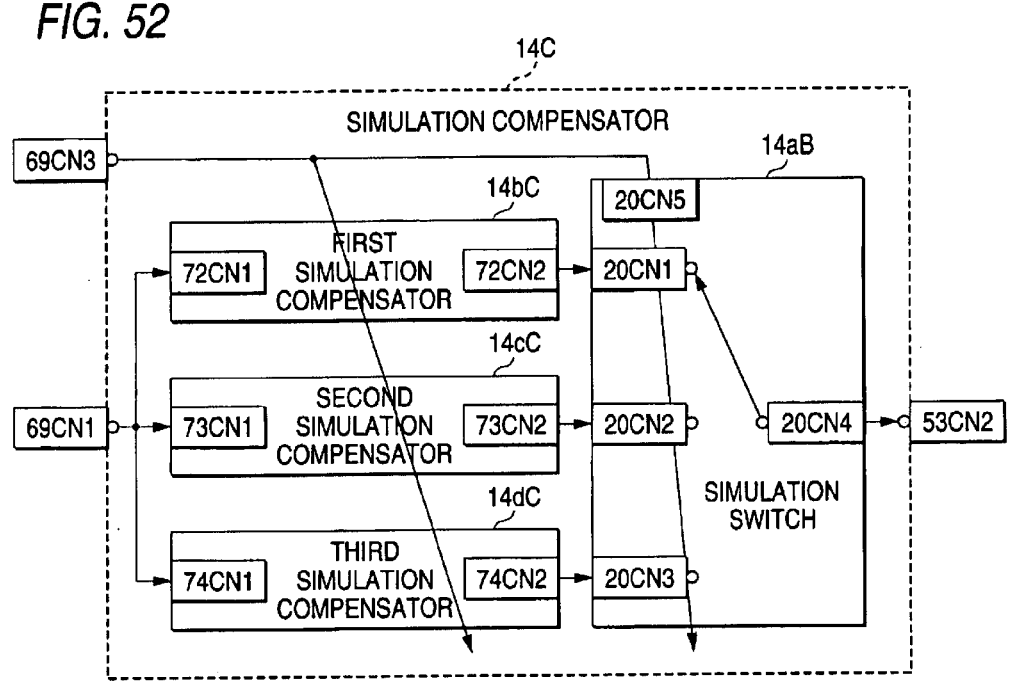
FIG. 52 is a block diagram showing a simulation compensating portion according to the ninth embodiment of the invention.

FIG. 52 is a block diagram showing a detailed construction of the simulation compensator 14C. In FIG. 52, the simulation compensator 14C is composed of the first simulation compensator 14CC, the second simulation compensator 14dC and a simulation switch 14aB.

Figure 53:
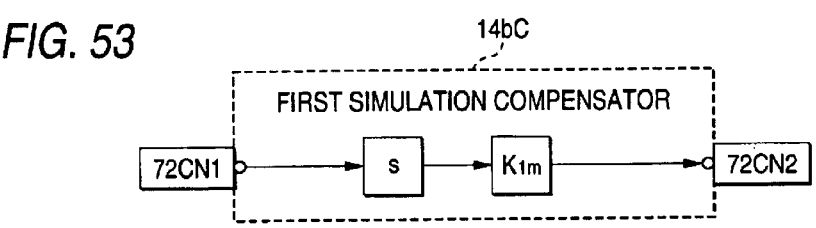
FIG. 53 is a block diagram showing the first simulation compensating portion according to the ninth embodiment of the invention.

FIG. 53 is a block diagram showing a detailed construction of the first simulation compensator 14bC. In FIG. 53, the simulation compensator 14bC is composed of one differentiator and one coefficient unit.

Figure 54:
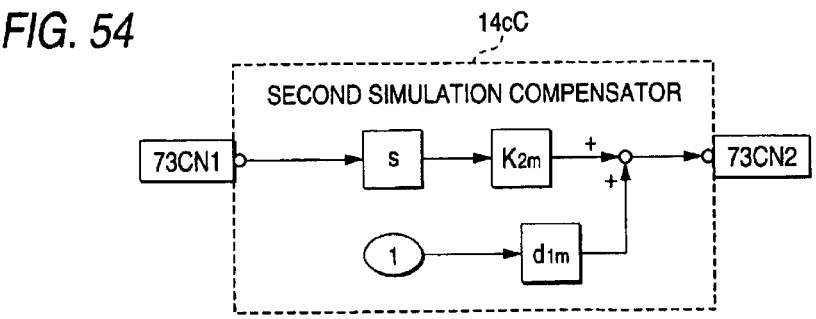
FIG. 54 is a block diagram showing the second simulation compensating portion according to the ninth embodiment of the invention.

FIG. 54 is a block diagram showing a detailed construction of the second simulation compensator 14cC. In FIG. 54, the simulation compensator 14cC is composed of one differentiator, two coefficient units and one adder.

Figure 55:
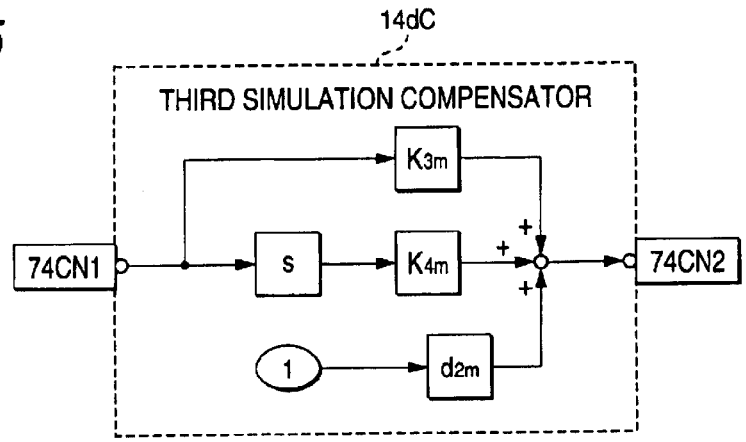
FIG. 55 is a block diagram showing the third simulation compensating portion according to the ninth embodiment of the invention.

FIG. 55 is a block diagram showing a detailed construction of the third simulation compensator 14dC. In FIG. 55, the simulation compensator 14dC is composed of one differentiator, three coefficient units, and one adder.

Figure 50:
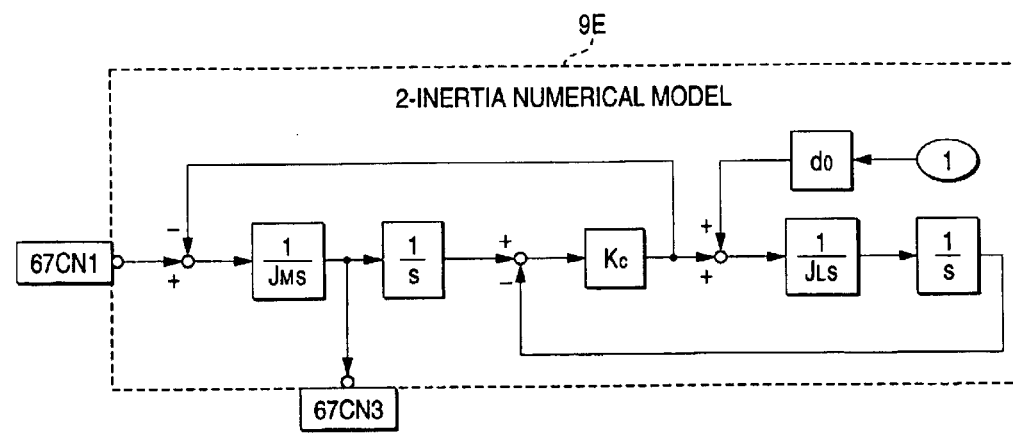
FIG. 50 is a block diagram showing a 2-inertia numerical model according to a ninth embodiment of the invention.
Figure 51:
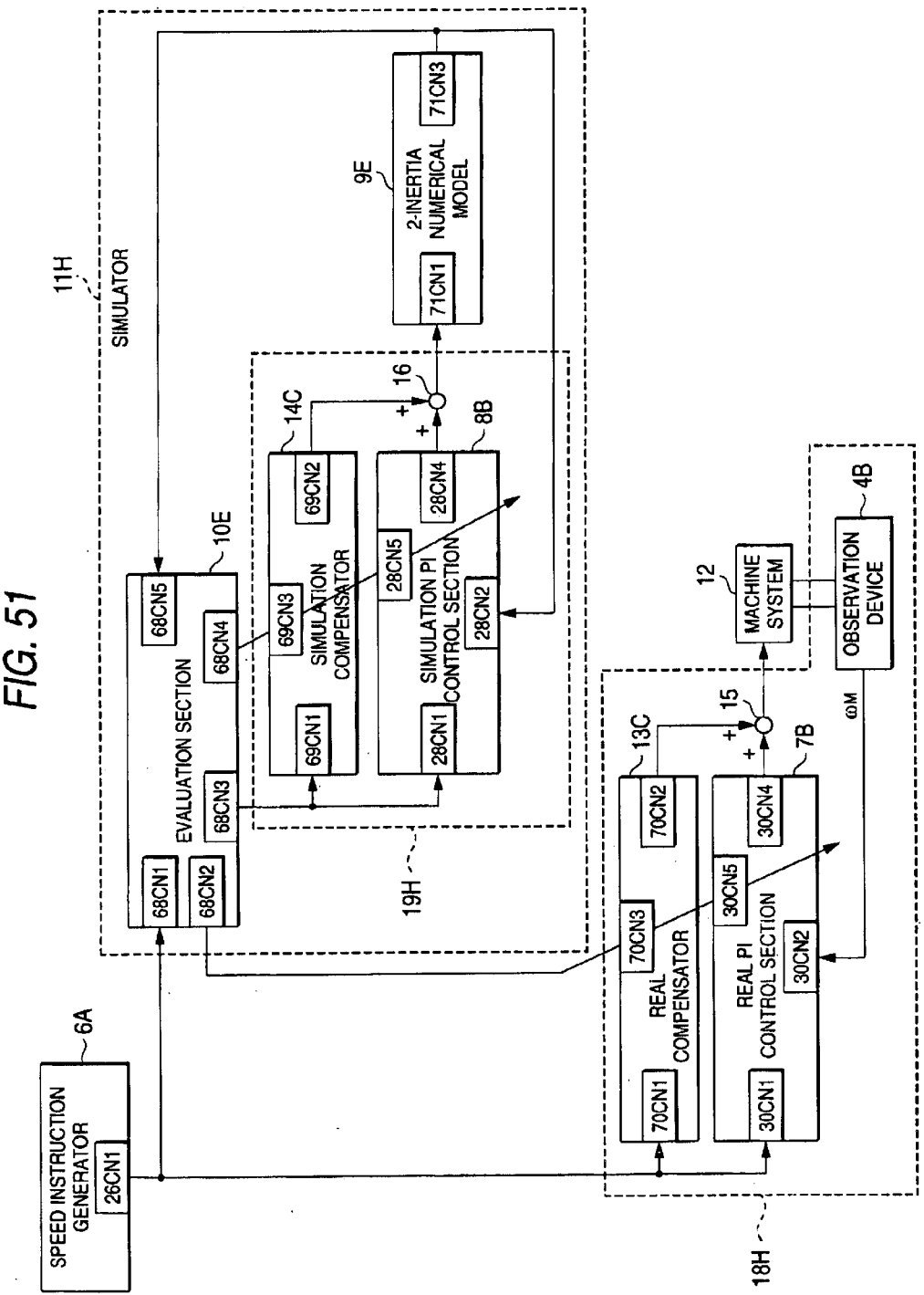
FIG. 51 is a block diagram showing the ninth embodiment of the invention.

FIG. 50 is a block diagram showing a detailed construction of the 2-inertia numerical model 9E. In FIG. 50, the 2-inertia numerical model 9E is composed of four integrators, two coefficient units, two subtracters, and one adder.

Figure 60:
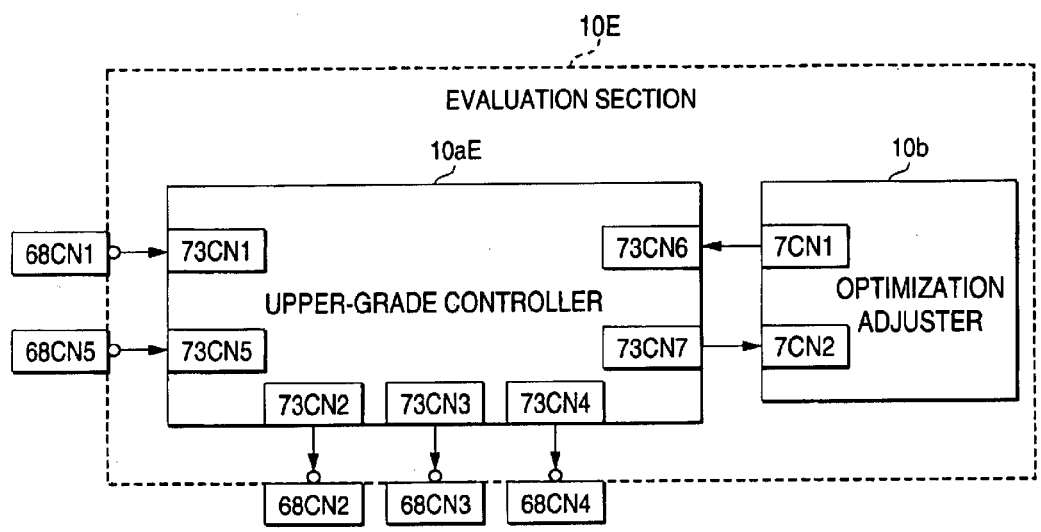
FIG. 60 is a block diagram showing an evaluation portion according to the ninth embodiment of the invention.

FIG. 60 is a block diagram showing a detailed construction of the above-described evaluation portion 10E. In FIG. 60, the evaluation portion 10E is composed of an upper-grade controller 10aE and an optimization adjuster 10b. The optimization adjuster 10b is one that is described above. Hereinafter, overlapping description thereof is omitted.

Figure 62:
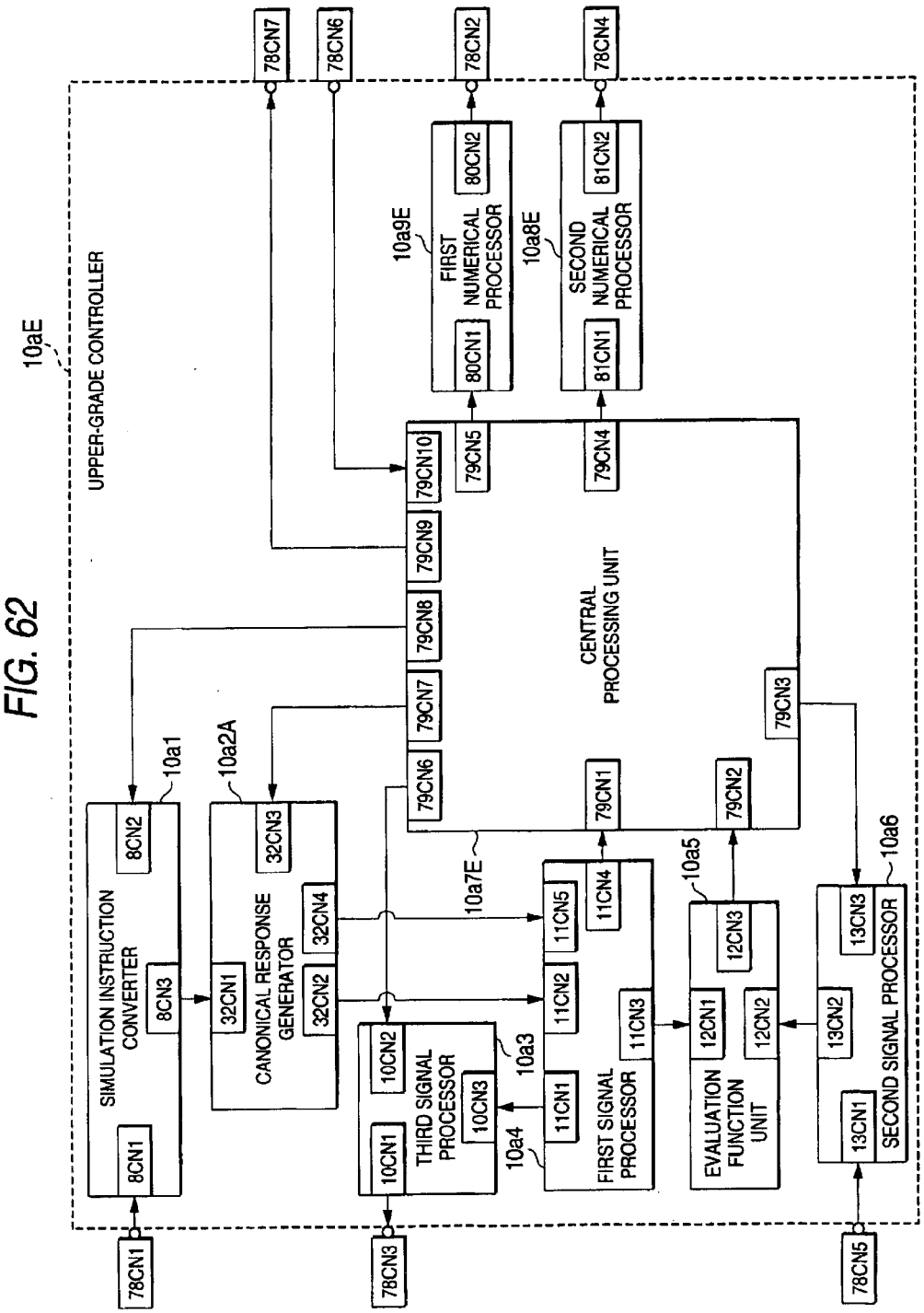
FIG. 62 is a block diagram showing an upper-grade controller according to the ninth embodiment of the invention.

FIG. 62 is a block diagram showing a detailed construction of the above-described upper-grade controller 10aE. In FIG. 62, the upper-grade controller 10aE is composed of a simulation instruction converter 10a1, a canonical response generator 10a2A, the third signal processor 10a3, the first signal processor 10a4, an evaluation function unit 10a5, the second signal processor 10a6, a central processor 10a7E, the second numerical processor 10a8E, and the first numerical processor 10a9E. The simulation instruction converter 10a1, canonical response generator 10a2A, the third signal processor 10a3, the first signal processor 10a4, evaluation function unit 10a5, and the second signal processor 10a6 are those described above. Hereinafter, overlapping thereof is omitted.

FIG. 59 is a flow chart showing a detailed construction of the above-described central processor 10a7E. In FIG. 59, the central processor 10a7E is composed of an adjustment step 10a7a, the first E step, and the second E step. The adjustment step 10a7a is one that is described above. Hereinafter, overlapping description is omitted.

Next, a description is given of actions of the ninth embodiment with reference to FIG. 50 through FIG. 62.

First, the 2-inertia numerical model 9E shown in FIG. 50 carries out an approximation expression of the input and output characteristics of the above-described machine system 12. In the 2-inertia numerical model 9E shown in FIG. 50, a simulation speed signal is obtained by the four integrators, three adders and two coefficient units, which are shown in FIG. 50, with respect to the simulation torque signal that is inputted through a connector 67CN1, and is outputted through a connector 67CN3.

In the evaluation portion 10E shown in FIG. 60, the real speed instruction and simulation speed signal, which are inputted through connectors 66CN1 and 66CN5, are inputted into connectors 78CN1 and 78CN5 of the upper-grade controller 10aE. The first simulation speed instruction signal is obtained from a connector 78CN3 of the upper-grade controller 10aE by the upper-grade controller 10aE and optimization adjuster 10b, and are outputted through a connector 66CN3. The real speed gain, real integration gain, and real compensation gain are obtained through a connector 78CN2 of the upper-grade controller 10aE, and are outputted from a connector 66CN2. The simulation speed gain, simulation integration gain and simulation compensation gain are obtained from a connector 78CN4 of the upper-grade controller 10aE, and are outputted from a connector 66CN4.

In the upper-grade controller 10aE shown in FIG. 62, the real speed instruction that is inputted through a connector 78CN1 is inputted into a connector 8CN1 of the simulation instruction converter 10a1. The simulation speed signal that is inputted through a connector 78CN5 is inputted into a connector 13CN1 of the second signal processor 10a6. A child group of gains, which are inputted through a connector 78CN6, are inputted into a connector 79CN10 of the central processor 10a7E. By the simulation instruction converter 10a1, canonical response generator 10a2A, the third signal processor 10a3, the first signal processor 10a4, evaluation function unit 10a5, the second signal processor 10a6, central processor 10a7E, the second numerical processor 10a8E, and the first numerical processor 10a9E, the first simulation position instruction signal obtained from the connector 10CN1 of the third signal processor 10a3 is outputted from a connector 78CN3, and the evaluation value array and parent group of gains, which are obtained a connector 79CN9 of the central processor 10a7E, are outputted from a connector 78CN7. Further, the real speed gain real integration gain, and real compensation gain, which are obtained from a connector 80CN2 of the first numerical processor 10a9E, are outputted from a connector 78CN2, and the simulation speed gain, simulation integration gain and simulation compensation gain, which are obtained from a connector 81CN2 of the second numerical processor 10a8E, are outputted from a connector 78CN4.

The first numerical processor 10a9E is provided with a means for dividing a new real gain array, which is inputted through a connector 80CN1, into a real speed gain, real integration gain and real compensation gain, outputting the same from a connector 80CN2, and renewing the real speed gain and real integration of the real PI controlling portion 7B, and the real compensation gain of the real compensator 13C.

The second numerical processor 10a8E is provided with a means for dividing a new simulation gain array, which is inputted through a connector 81CN1, into a simulation speed gain, simulation integration gain and simulation compensation gain, outputting the same through a connector 81CN2, and renewing the simulation position gain, simulation speed gain and simulation integration gain of the simulation PI controlling portion, and the simulation compensation gain of the simulation compensator 14C.

Figure 61:
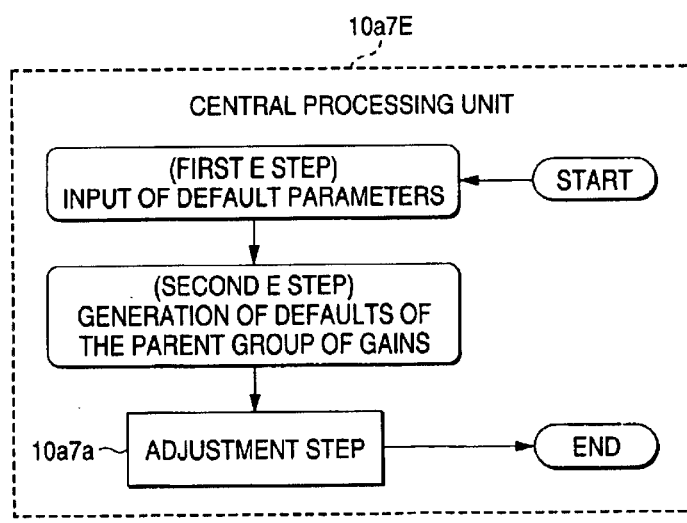
FIG. 61 is a flow chart showing the central processing unit according to the ninth embodiment of the invention.

In the central processor 10a7E shown in FIG. 61, the first E step, second E step and adjustment step 10a7a are carried out in the sequence shown in FIG. 61.

The first E step establishes a simulation speed instruction array, canonical gain, the first size array, the second size array, the third size array, number of child gains in a child group of gains, number of parent gains in a parent group of gains, and number of generations. However, the parent gains in the parent group of gains are those established so as to become a gain array including a speed gain, integration gain and compensation gain. The compensation gain is established so as to include coefficients of the compensator and switching conditions of the switch.

The second E step initializes the parent group of gains at random and codes the parent group of gains.

In the real compensator 13C shown in FIG. 56, the second real torque signal is obtained from a connector 20CN4 of the real switch 13aB by the first real compensator 13cC, the second real compensator 13dC and real switch 13aB with respect to the real speed instruction that is inputted through a connector 70CN1, and is outputted from a connector 70CN2.

The switch shown in FIG. 56 is one that is described above. Hereinafter, overlapping description thereof is omitted.

In the first real compensator 13bC shown in FIG. 57, the first real compensation torque signal is obtained by one differentiator and one coefficient unit with respect to the real speed instruction that is inputted through a connector 75CN1, and is outputted from a connector 75CN2. However, the coefficient of the above-described coefficient unit is renewed by renewing the second element of the real compensation gain that is inputted through a connector 75CN3.

In the second real compensator 13cC shown in FIG. 58, the second real compensation torque signal is obtained by one differentiator, two coefficient units and one adder with respect to the real speed instruction that is inputted through 67CN1, and is outputted from a connector 76CN2. However, the coefficient of the above-described coefficient unit is renewed by renewing the third element of the real compensation gain that is inputted through a connector 76CN3.

In the third real compensator 13dC shown in FIG. 59, the third real compensation torque signal is obtained by one differentiator, three coefficient units and one adder with respect to the real position instruction that is inputted through 77CN1, and is outputted from a connector 77CN2. However, the coefficient of the above-described coefficient unit is renewed by renewing the fourth element of the real compensation gain that is inputted through a connector 77CN3.

In the simulation compensator 14C shown in FIG. 52, the second simulation torque signal is obtained from a connector 21CN4 of the simulation switch 14aB by the first simulation compensator 14cC, the second simulation compensator 14dC and simulation switch 14aB with respect to the simulation speed instruction that is inputted through a connector 69CN1, and is outputted from a connector 69CN2.

The switch 14aB shown in FIG. 52 is one that is described above. Hereinafter, overlapping description thereof is omitted.

In the first simulation compensator 14bC shown in FIG. 53, the first simulation compensation torque signal is obtained by one differentiator and one coefficient unit with respect to the simulation speed instruction that is inputted through a connector 72CN1, and is outputted from a connector 72CN2. However, the coefficient of the above-described coefficient unit is renewed by renewing the second element of the simulation compensation gain that is inputted through a connector 72CN3.

In the second simulation compensator 14cC shown in FIG. 54, the second simulation compensation torque signal is obtained by one differentiator, two coefficient units and one adder with respect to the simulation speed instruction that is inputted through a connector 73CN1, and is outputted from a connector 73CN2. However, the coefficient of the above-described coefficient unit is renewed by renewing the third element of the simulation compensation gain that is inputted through a connector 73CN3.

In the third simulation compensator 14dC shown in FIG. 55, the third simulation compensation torque signal is obtained by one differentiator, three coefficient units and one adder with respect to the simulation speed instruction that is inputted through a connector 74CN1, and is outputted from a connector 74CN2. However, the coefficient of the above-described coefficient units is renewed by renewing the fourth element of the simulation compensation gain that is inputted through a connector 74CN3.

Hereinafter, a description is given of the tenth embodiment of the invention with reference to FIG. 63 through FIG. 71.

Figure 63:
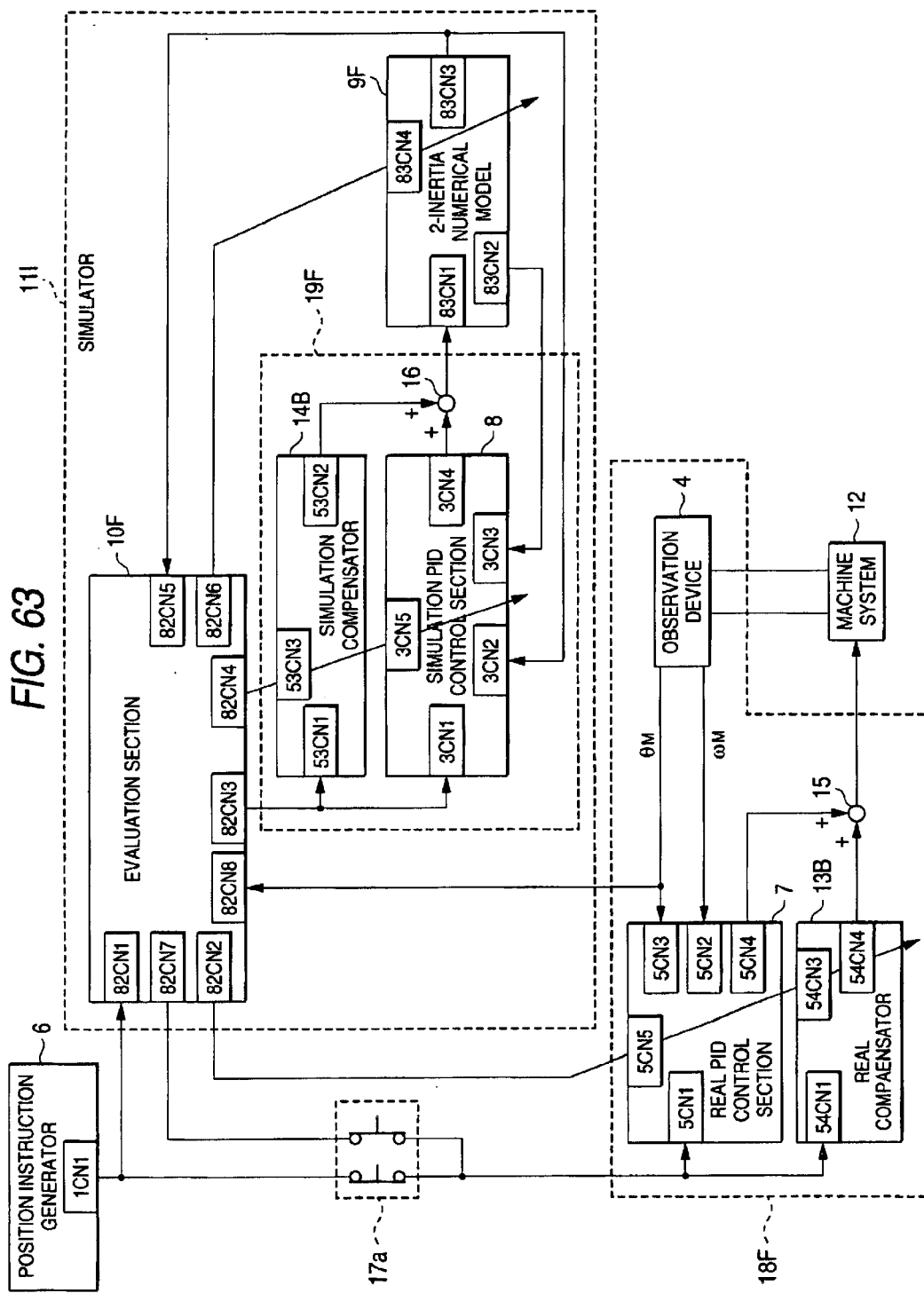
FIG. 63 is a block diagram showing a tenth embodiment of the invention.

FIG. 63 is a block diagram showing the entirety of the tenth embodiment of the invention. In FIG. 63, the tenth embodiment of the invention is composed of a machine system 12, an observation device 4, a position instruction generator 6, a real PID controlling portion 7, a simulation PID controlling portion 8, a 2-inertia numerical model 9F, an evaluation portion 10F, a real compensator 13B, a simulation compensator 14B, adders 15 and 16, and a relay 17. The machine system 12, observation device 4, and position instruction generator 6 are identical to those described above.

The real PID controlling portion 7, real compensator 13B, simulation compensator 14B, simulation PID controlling portion 8, adders 15 and 16 are those that are described above. Hereinafter overlapping description thereof is omitted.

Figure 64:
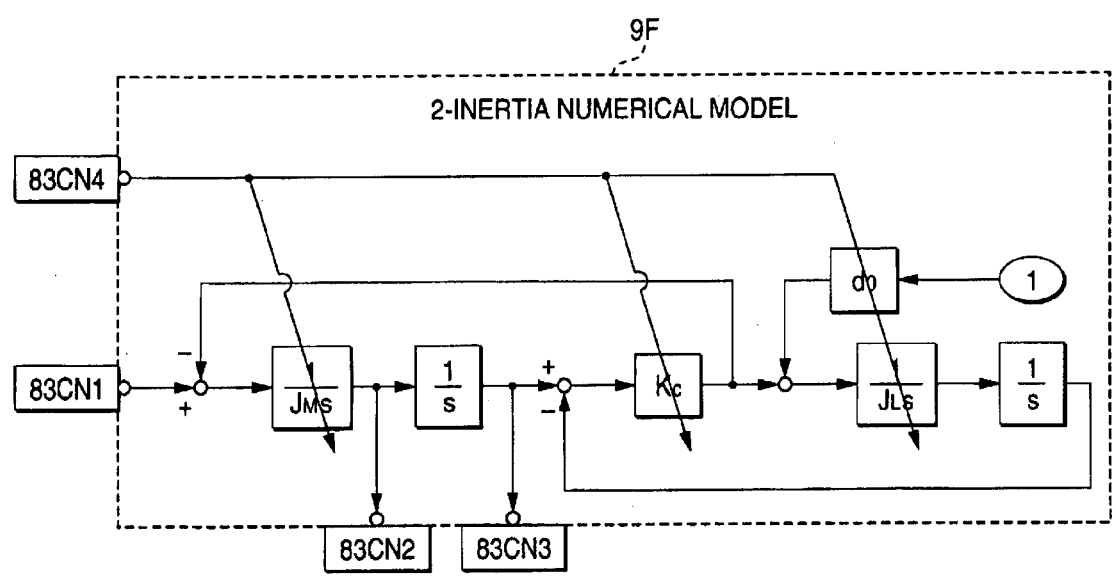
FIG. 64 is a block diagram showing a 2-inertia numerical model according to the tenth embodiment of the invention.

FIG. 64 is a block diagram showing a detailed construction of the 2-inertia numerical model 9F. In FIG. 64, the 2-inertia numerical model 9F is composed of four integrators, three coefficient units, two subtracters, and one adder.

Figure 65:
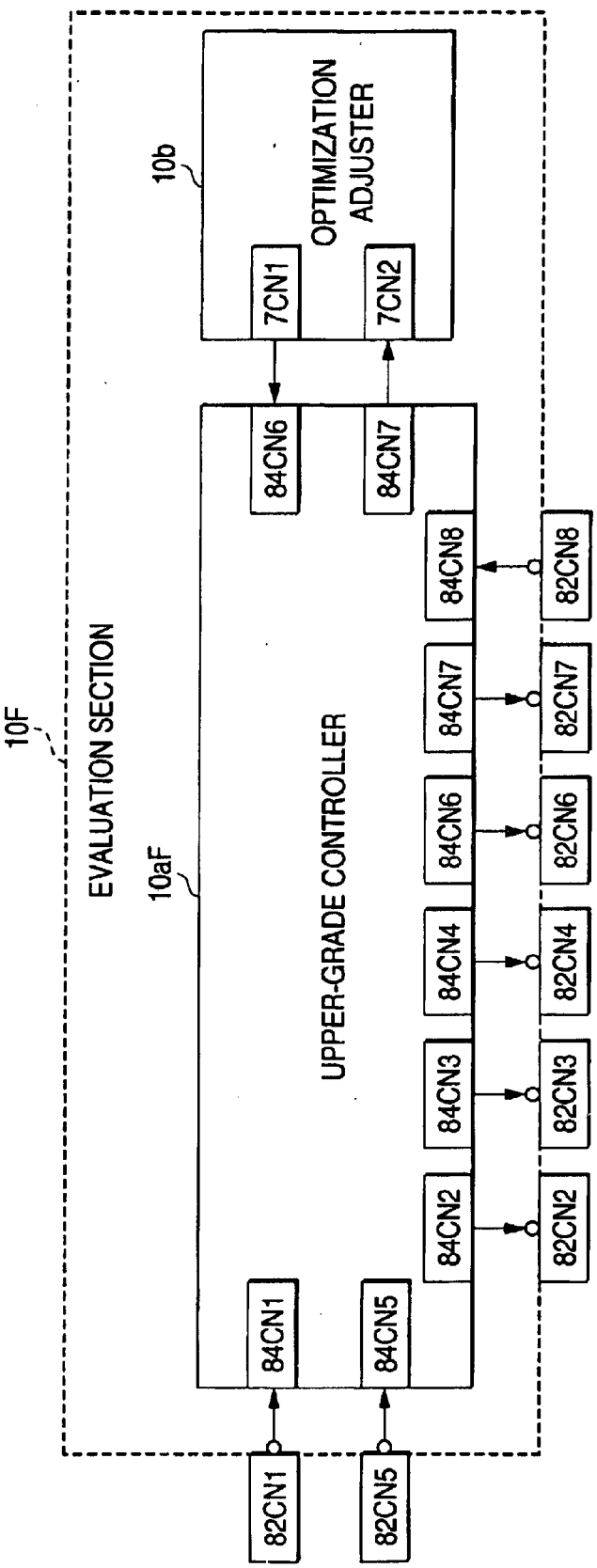
FIG. 65 is a block diagram showing an evaluation portion according to the tenth embodiment of the invention.

FIG. 65 is a block diagram showing a detailed construction of the above-described evaluation portion 10F. In FIG. 65, the evaluation portion 10F is composed of an upper-grade controller 10aF and an optimization adjuster 10b. The optimization adjuster 10b is one that is described above. Hereinafter, overlapping description is omitted.

Figure 66:
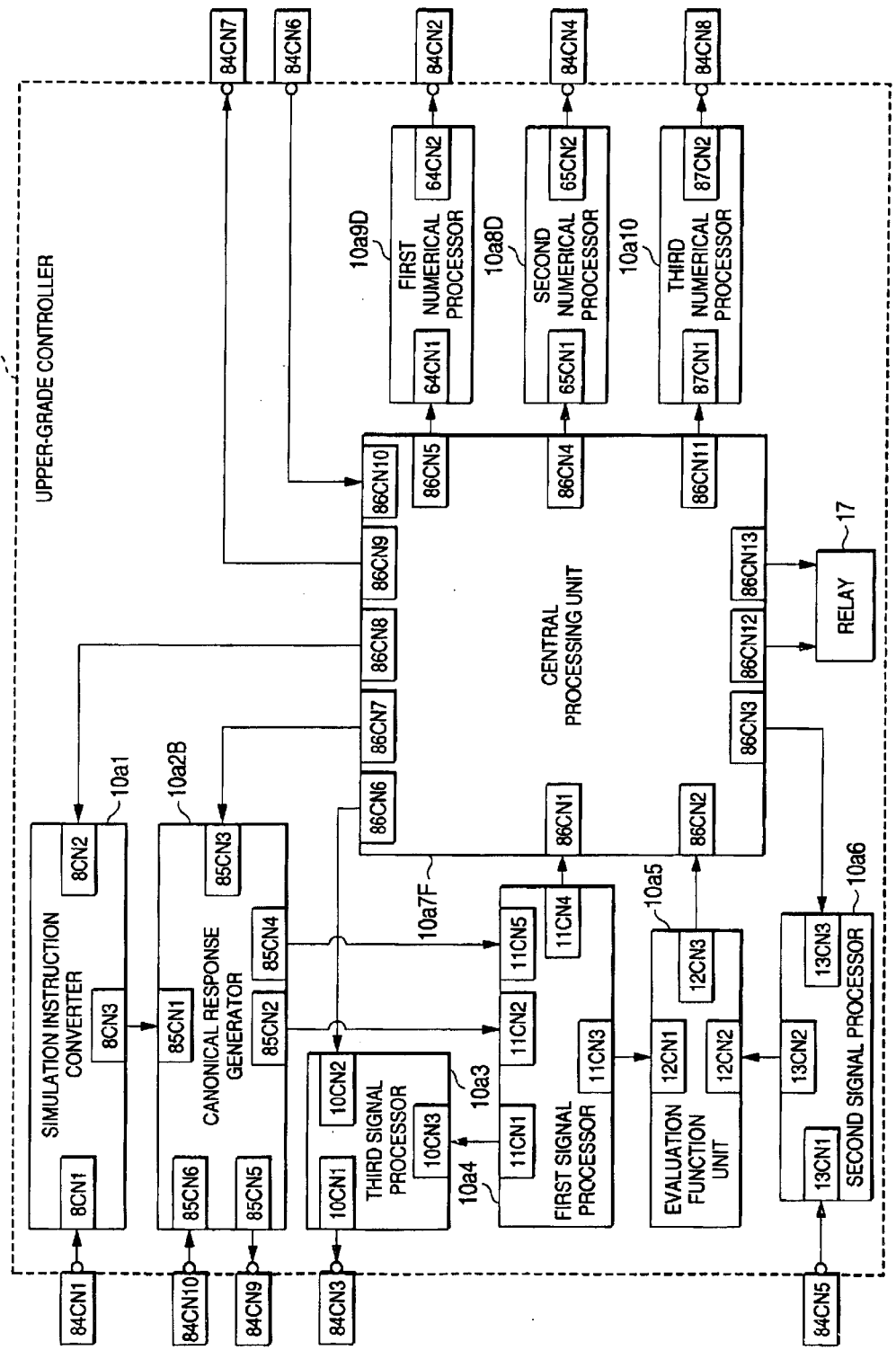
FIG. 66 is a block diagram showing an upper-grade controller according to the tenth embodiment of the invention.

FIG. 66 is a block diagram showing a detailed construction of the above-described upper-grade controller 10aF. In FIG. 66, the upper-grade controller 10aF is composed of a simulation instruction converter 10a1, canonical response generator 10a2B, the third signal processor 10a3, the first signal processor 10a4, evaluation function unit 10a5, the second signal processor 10a6, central processor 10a7F, the second numerical processor 10a8D, the first numerical processor 10a9D, and the third numerical processor 10a10. The simulation instruction converter 10a1, the third signal processor 10a3, the first signal processor 10a4, evaluation function unit 10a5, the second signal processor 10a6, the second numerical processor 10a8D and the first numerical processor 10a9D are those that are described above. Hereinafter, overlapping description thereof is omitted.

Figure 67:
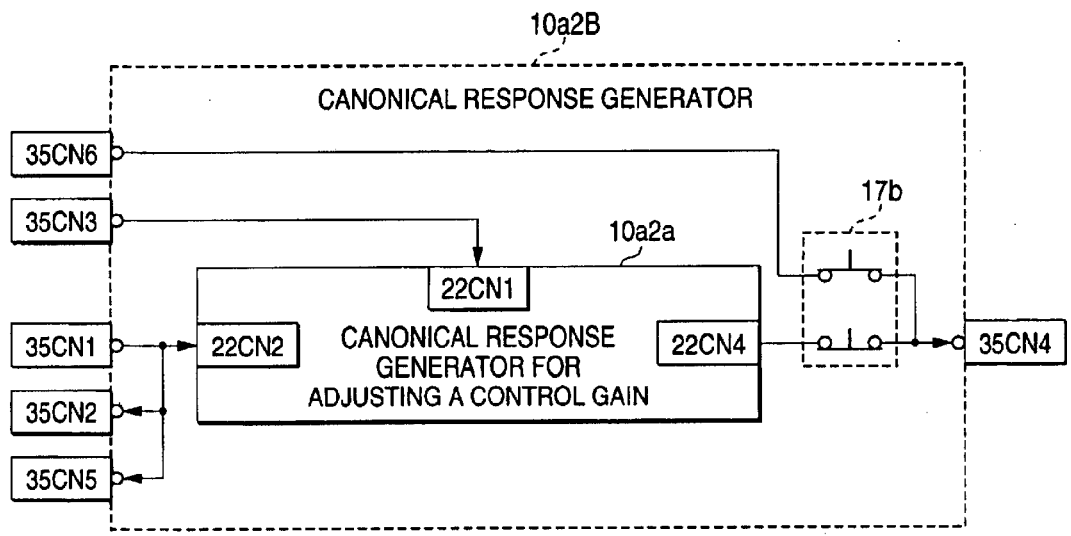
FIG. 67 is a block diagram showing a canonical response generator according to the tenth embodiment of the invention.

FIG. 67 is a block diagram showing a detailed construction of the above-described canonical response generator 10a2B. In FIG. 67, the canonical response generator 10a2B is composed of a canonical response generator 10a2a for adjusting a control gain, and a contact set 17b of the relay 17. The canonical response generator 10a2a for adjusting the control gain is one that is described above. Hereinafter, overlapping description thereof is omitted.

Figure 68:
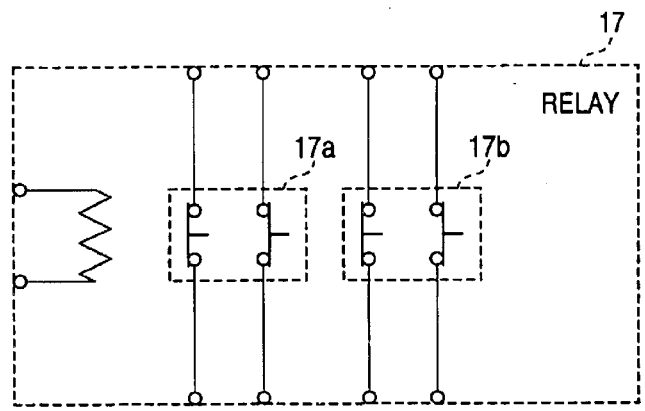
FIG. 68 is a block diagram showing a relay according to the tenth embodiment of the invention.

FIG. 68 is a block diagram showing a detailed construction of the above-described relay 17. In FIG. 68, the relay 17 is a commonly used relay. It is composed of at least a contact set 17a, a contact set 17b and a relay condition side.

Figure 69:
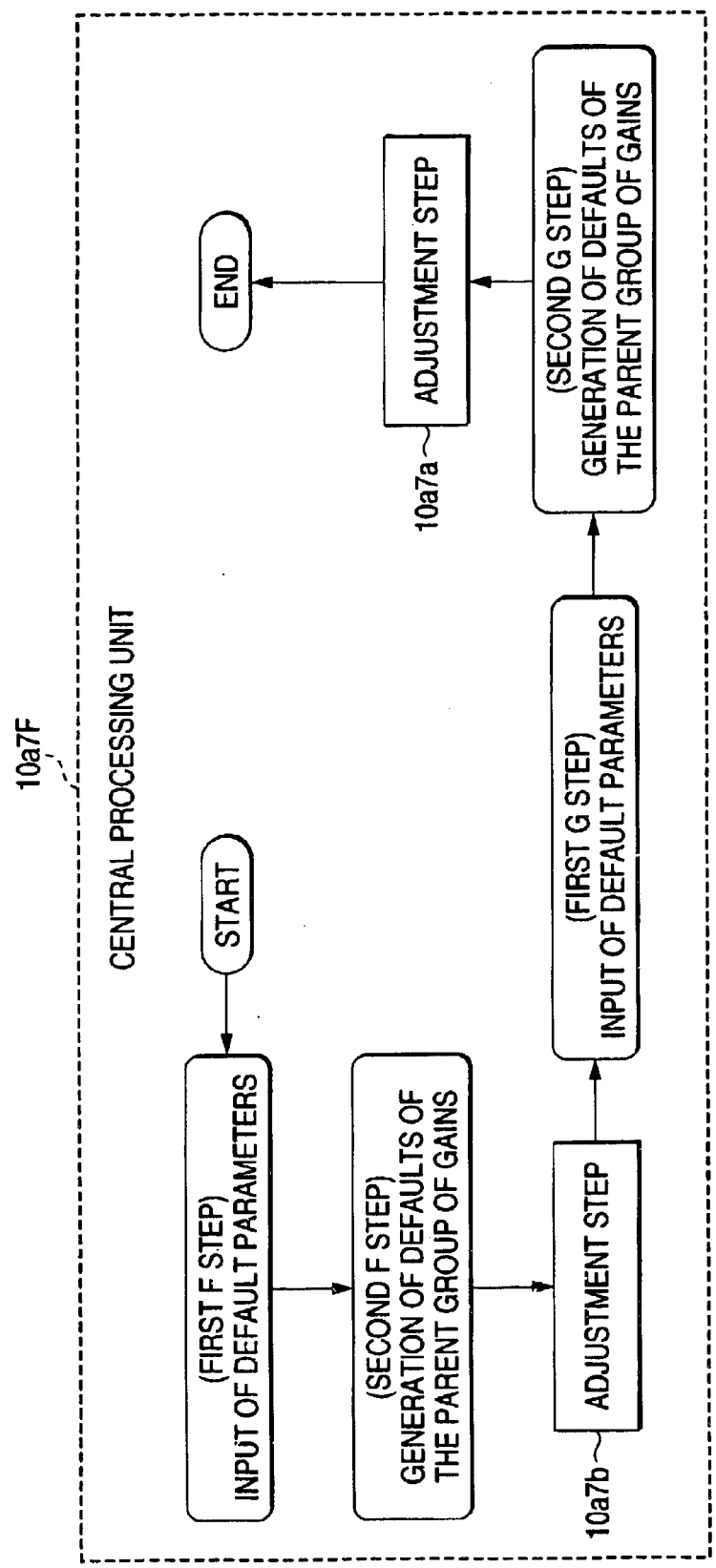
FIG. 69 is a flow chart showing the central processing unit according to the tenth embodiment of the invention.

FIG. 69 is a flow chart showing a detailed construction of the above-described central processor 10a7F. In FIG. 69, the above-described central processor 10a7F is composed of the first F step, second F step, identification step 10a7b, first G step, second G step and adjustment step 10a7a. The adjustment step 10a7a is one that is described above. Hereinafter, overlapping description thereof is omitted.

Figure 70:
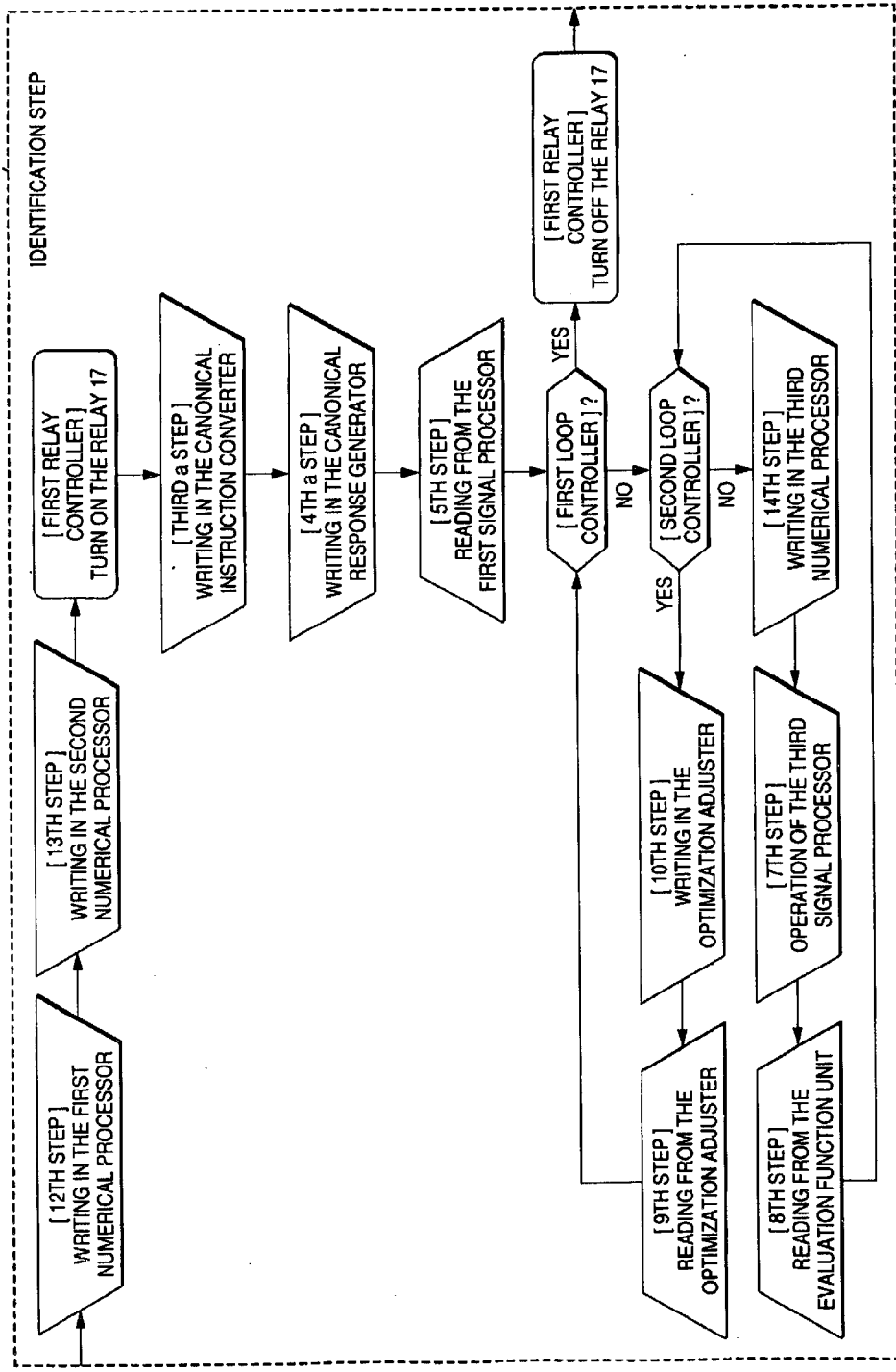
FIG. 70 is a flow chart showing an identification step according to the tenth embodiment of the invention.

FIG. 70 is a flow chart showing a detailed construction of the above-described identification step 10a7b. In FIG. 70, the identification step 10a7b is composed of the twelfth through fourteenth steps, third a step, fourth a step, fifth step, seventh through tenth steps, first relay controlling portion, second relay controlling portion, first loop controlling portion and second loop controlling portion.

Next, a description is given of actions of the tenth embodiment with reference to FIG. 63 through FIG. 70. First, the 2-inertia numerical model 9F shown in FIG. 63 carries out an approximation expression of the input and output characteristics of the above-described machine system. In the 2-inertia numerical model 9F shown in FIG. 63, a simulation position signal and a simulation speed signal are obtained by the four integrators, one adder, three coefficient units, and two subtracters, which are shown in FIG. 63, with respect to the simulation torque signal that is inputted through a connector 83CN1, and are, respectively, outputted through connectors 83CN2 83CN3. However, respective coefficients of the coefficient unit of the 2-inertia numerical model 9F are renewed by renewing the numerical gains that are inputted through a connector 83CN4.

In the evaluation portion 10F shown in FIG. 64, the real position instruction and simulation position signal that are inputted through connectors 82CN1 and 82CN5 are inputted into connectors 84CN1 and 84CN5 of the upper-grade controller 10aF, and the real position signal that is inputted through a connector 82CN8 is inputted into a connector 84CN10 of the upper-grade controller 10aF. The first simulation position instruction signal is obtained from a connector 84CN3 of the upper-grade controller 10aF by means of the upper-grade controller 10aF and optimization adjuster 10b, and is outputted from a connector 82CN3. The real position gain, real speed gain, real integration gain and real compensation gain are obtained through a connector 84CN2 of the upper-grade controller 10aF, and are outputted from a connector 82CN2. The simulation position gain, simulation speed gain, simulation integration gain and simulation compensation gain are obtained through a connector 84CN4 of the upper-grade controller 10aF, and are outputted from a connector 82CN4. The first real position instruction signal is obtained through a connector 84CN9 of the upper-grade controller 10aF and is outputted from a connector 82CN7.

In the upper-grade controller 10a shown in FIG. 66, the real position instruction that is inputted through a connector 84CN1 is inputted into a connector 8CN1 of the simulation instruction converter 10a1, and the simulation position signal that is inputted through a connector 84CN5 is inputted into a connector 13CN1 of the second signal processor 10a6. A child group of gains, which are inputted through a connector 84CN6, are inputted into a connector 86CN1 of the central processor 10a7F, and the real position signal that is inputted through a connector 84CN10 is inputted into a connector 85CN6 of the canonical response generator 10a2B. By the simulation instruction converter 10a1, canonical response generator 10a2B, the third signal processor 10a3, the first signal processor 10a4, evaluation function unit 10a5, the second signal processor 10a6, central processor 10a7D, the second numerical processor 10a8D, the first numerical processor 10a9D, and the third numerical processor 10a10, the first simulation position instruction signal that is obtained through a connector 10CN1 of the third signal processor 10a3 is outputted from a connector 84CN3, and the evaluation value array and parent group of gains, which are obtained from a connector 86CN9 of the central processor 10a7F, are outputted from a connector 84CN7. The real position gain, real speed gain, real integration gain and real compensation gain, which are obtained from a connector 64CN2 of the first numerical processor 10a9D, are outputted from a connector 84CN2. The simulation position gain, simulation speed gain, simulation integration gain and simulation compensation gain, which are obtained from a connector 65CN2 of the second numerical processor 10a8D, are outputted from a connector 84CN4. The numerical gain that is obtained from a connector 87CN2 of the third numerical processor 10a10 is outputted from a connector 84CN8, and the first real position instruction signal that is obtained from a connector 85CN5 of the canonical response generator 10a2B is outputted from a connector 84CN9.

In the canonical response generator 10a2B shown in FIG. 67, the second simulation position instruction signal that is inputted through a connector 85CN1 is inputted into a connector 22CN2 of the canonical response generator 10a2a for adjusting a control gain. The real position signal that is inputted through a connector 85CN6 is inputted into the contact set 17b of the relay 17. The canonical response signal is obtained from an output of the contact set 17b by the situations of the canonical response generator 10a2a for adjustment and the contact set 17b, and is outputted from a connector 85CN4. The canonical response generator 10a2a for adjusting the control gain is one that is described above. Hereinafter, overlapping description is omitted.

In the central processor 10a7F shown in FIG. 69, the first F step, second F step identification step 10a7b, first G step, second G step and adjustment step 10a7a are carried out in the sequence shown in FIG. 69.

The first F step establishes a simulation position instruction array, canonical gain, first size array, second size array, third size array, number of child gains in the child group of gains, number of parent gains in the parent group of gains, and number of generations. However, the parent gains in the parent group of gains are established so as to become a numerical gain array including coefficients of respective coefficients of the above-described 2-inertia numerical model 9F.

The second F step initializes the parent groups of gains at random and codes the parent groups of gains.

The first G step establishes a simulation position instruction array, canonical gain, first size array, second size array, third size array, number of child gains in the child group of gains, number of parent gains in the parent group of gains, and number of generations. However, the parent gains in the parent group of gains are established so as to become a gain array including a position gain, speed gain, integration gain, and compensation gain. The compensation gain is established so as to include a coefficient of the compensator and switching conditions of the switch.

The second G step initializes the parent group of gains at random and codes the parent group of gains.

The adjustment step 10a7a is one that is described above. Hereinafter, overlapping description is omitted.

In the identification step shown in FIG. 70, the twelfth through fourteenth steps, seventh trough tenth steps, identification step 7a7b, third a step, fourth a step, fifth step, first loop controlling portion, second loop controlling portion, first relay controlling portion, and second relay controlling portion are carried out in the sequence shown in FIG. 70.

The twelfth step writes the default of the real gain array in a connector 64CN1 of the first numerical processor 10a9D via a connector 86CN5, and commences the next operation, whereby the respective gains of the real PID controlling portion and real compensator are initialized.

The thirteenth step writes the default of the simulation gain array in a connector 65CN1 of the second numerical processor 10a8D via a connector 86CN4, and commences a next operation, whereby the respective gains of the simulation PID controlling portion and simulation compensator are initialized.

The first relay controlling portion turns on the relay 17. Thereby, the mode for identifying the 2-inertia numerical model 9F is enabled.

The third a step writes a simulation position instruction array in a connector BCN2 of the simulation instruction converter 10a1 via a connector 86CN8. Thereby, the second simulation instruction signal is obtained from a connector 8CN3 of the simulation instruction converter 10a1.

The fourth a step writes a canonical gain in a connector 85CN3 of the canonical response generator 10a2B via a connector 86CN7, whereby a canonical instruction signal is obtained from a connector 85CN2 of the canonical response generator 10a2B, and a canonical response signal is obtained from a connector 85CN4 of the canonical response generator 10a2B.

The fifth step, first loop controlling portion, second loop controlling portion, and seventh through tenth steps are those described above. Hereinafter, overlapping description is omitted.

The fourteenth step writes a numerical gain array, which is a parent of the parent group of gains, in a connector 87CN1 of the third numerical processor 10a10 in a fixed sequence through a connector 86CN11, whereby the coefficients of respective coefficient units of the 2-inertia numerical model 9F are renewed through a connector 87CN2 of the third numerical processor 10a10.

The second relay controlling portion turns off the relay 17, thereby entering a mode for identifying a control gain.

Figure 71:
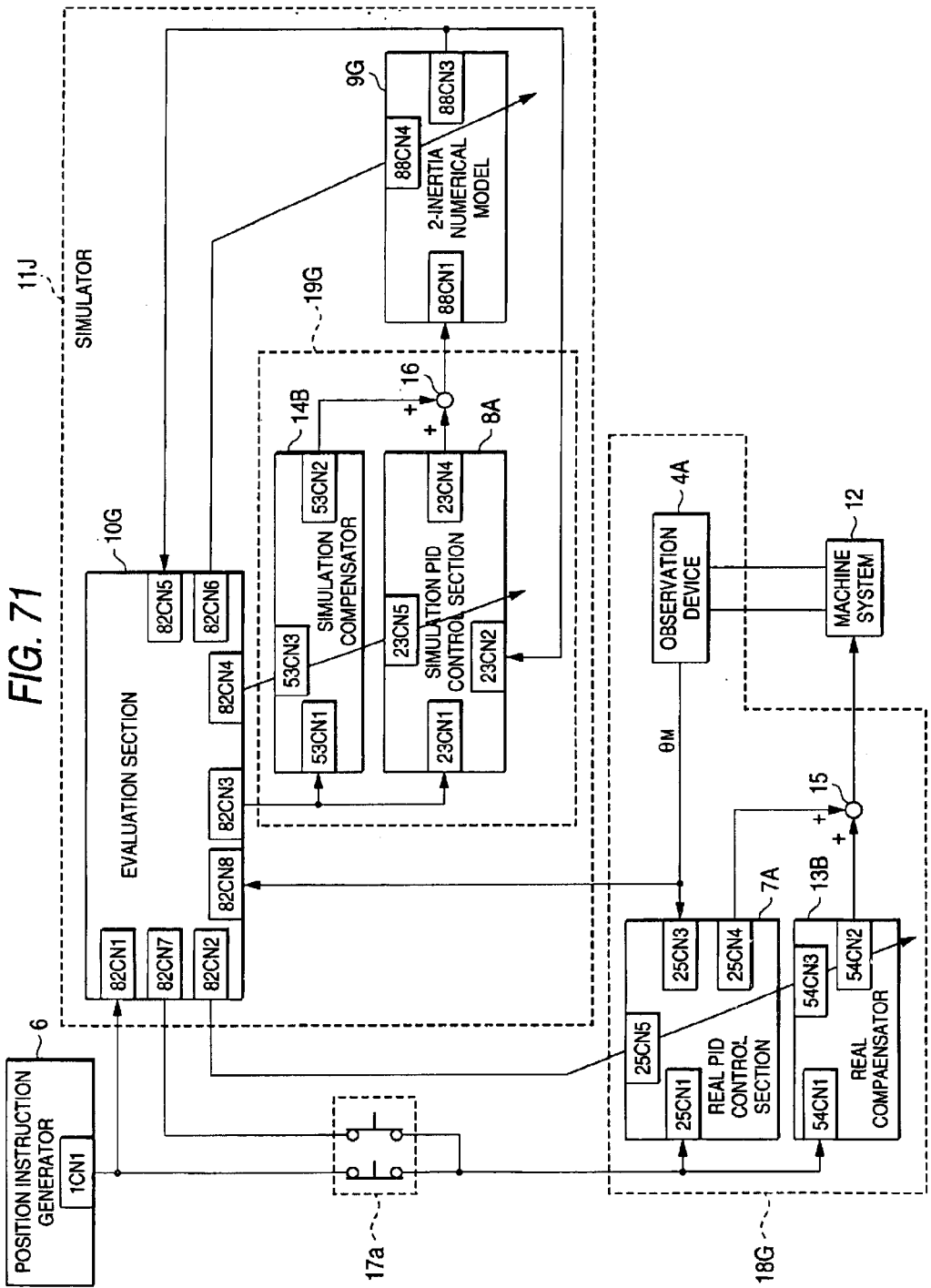
FIG. 71 is a block diagram showing an eleventh embodiment of the invention.

Hereinafter, a description is given of the eleventh embodiment of the invention with reference to FIG. 71 and FIG. 72. FIG. 71 is a bloc diagram showing the entirety of the eleventh embodiment of the invention. In FIG. 71, the eleventh embodiment of the invention is composed of a machine system 12, an observation device 4A, a position instruction generator 6, a real PID controlling portion 7A, a simulation PID controlling portion 8A, a 2-inertia numerical model 9G, an evaluation portion 10F, a real compensator 13B, a simulation compensator 14B, adders 15 and 16, and a relay 17. The machine system 12, observation device 4 and position instruction generator 6 are identical to those in the prior arts.

The real PID controlling portion 7A, real compensator 13B, simulation compensator 14B, simulation PID controlling portion 8A, adders 15 and 16, relay 17 and evaluation 10F are those that are described above. Hereinafter, overlapping description is omitted.

Figure 72:
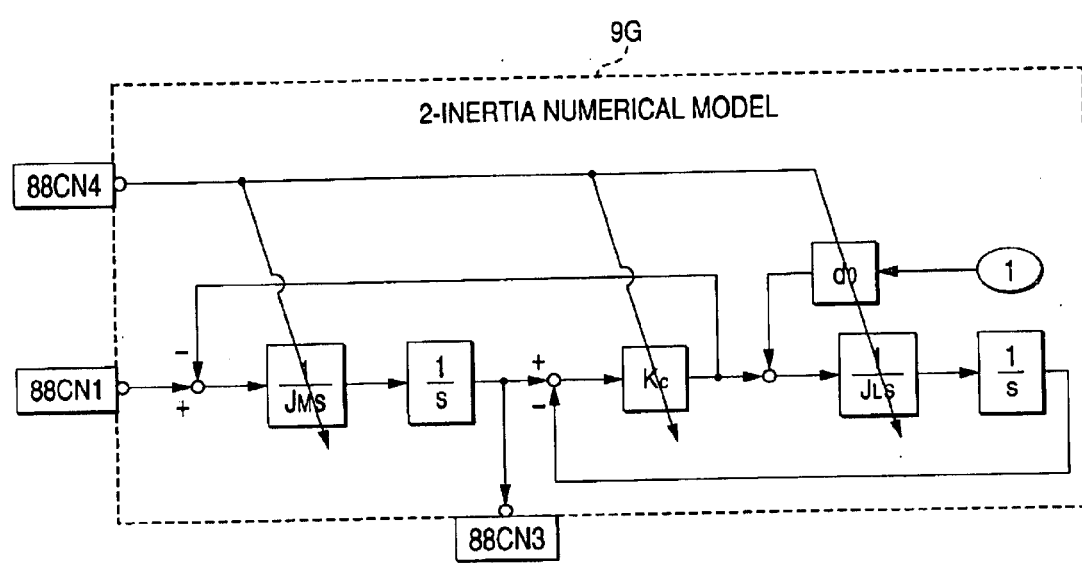
FIG. 72 is a block diagram showing a 2-inertia numerical model according to the eleventh embodiment of the invention.

FIG. 72 is a block diagram showing a detail construction of the above-described 2-inertia numerical model 9G. In FIG. 72, the above-described 2-inertia numerical model 9G is composed of four integrators, three coefficient units, two subtracters, and one adder.

The 2-inertia numerical model 9G shown in FIG. 72 carries out an approximation expression of the input/output characteristics of the above-described machine system. In the 2-inertia numerical model 9G shown in FIG. 72, simulation position signals are obtained by the four integrators, one adder, three coefficient units and two subtracters, which are shown in FIG. 72, with respect to the simulation torque signal that is inputted through a connector 88CN1, and are, respectively, outputted from a connector 88CN3. However, respective coefficients of the coefficient units of the 2-inertia numerical model 9G are renewed by renewing numerical gains that are inputted through a connector 88CN4.

Hereinafter, a description is given of the twelfth embodiment of the invention with reference to FIG. 73 through FIG. 78. FIG. 74 is a block diagram showing the entirety of the twelfth embodiment of the invention. In FIG. 74, the twelfth embodiment of the invention is composed of a machine system 12, an observation device 4B, a speed instruction generator 6A, a real PI controlling portion 7B, a simulation PI controlling portion 8B, a 2-inertia numerical model 9H, an evaluation portion 10G, a real compensator 13C, a simulation compensator 14C, adders 15 and 16, and a relay 17. The machine system 12 and speed instruction generator 6A are identical to those in the prior arts.

The real PI controlling portion 7B, simulation PI controlling portion 8B, adders 15 and 16, relay 17, real compensator 13C, and simulation compensator 14C are those described above. Hereinafter, overlapping description is omitted.

Figure 73:
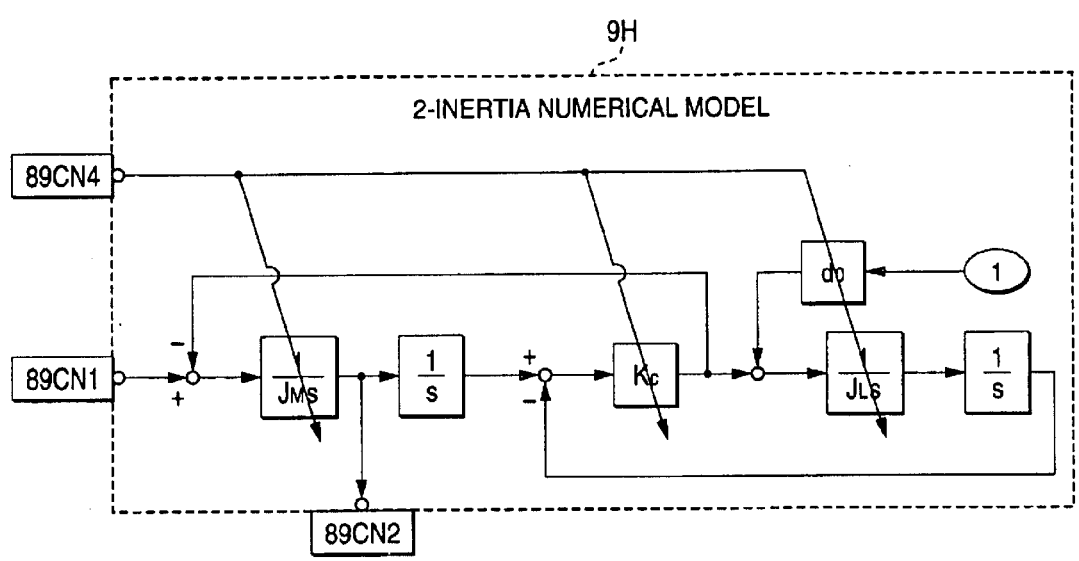
FIG. 73 is a block diagram showing a 2-inertia numerical model according to a twelfth embodiment of the invention.
Figure 74:
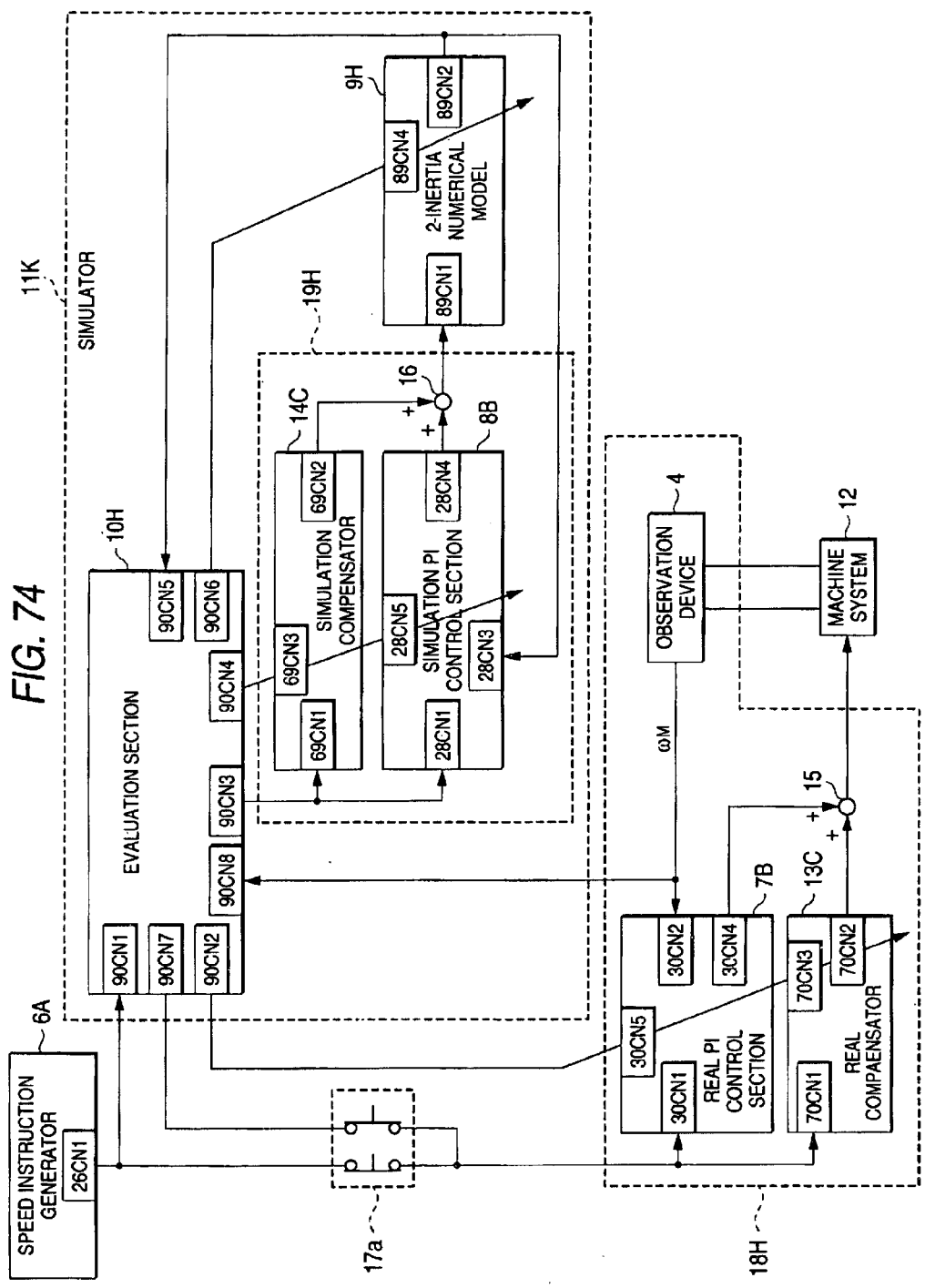
FIG. 74 is a block diagram showing the twelfth embodiment of the invention.

FIG. 73 is a block diagram showing a detailed construction of the above-described 2-inertia numerical model 9H. In FIG. 73, the above-described 2-inertia numerical model 9H is composed of four integrators, three coefficient units, two subtracters and one adder.

Figure 75:
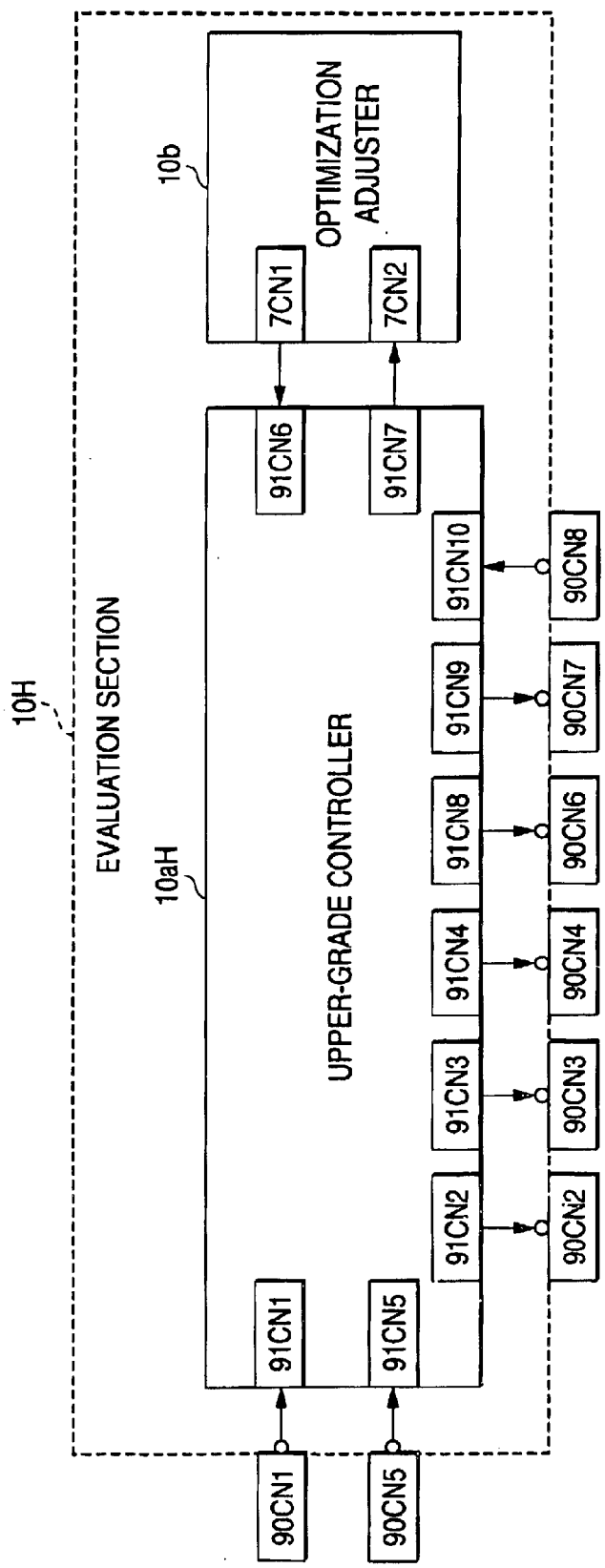
FIG. 75 is a block diagram showing an evaluation portion according to the twelfth embodiment of the invention.

FIG. 75 is a block diagram showing a detailed construction of the above-described evaluation portion 10G. In FIG. 75, the evaluation portion 10G is composed of an upper-grade controller 10aG and an optimization adjuster 10b. The optimization adjuster is one that is described above. Hereinafter, overlapping description is omitted.

Figure 76:
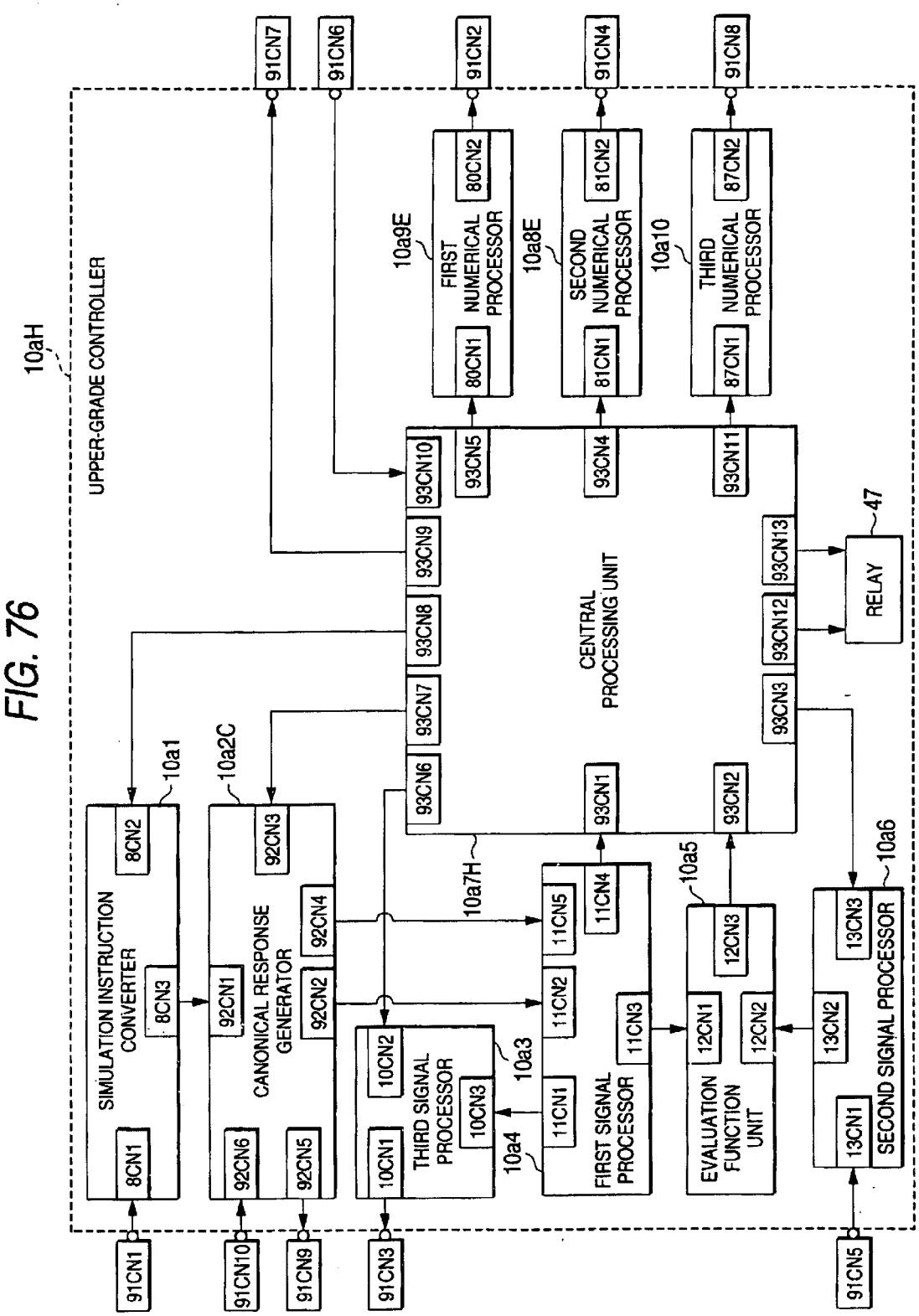
FIG. 76 is a block diagram showing an upper-grade controller according to the twelfth embodiment of the invention.

FIG. 76 is a block diagram showing a detailed construction of the above-described upper-grade controller 10aG. In FIG. 76, the upper-grade controller 10aG is composed of a simulation instruction converter 10a1, a canonical response generator 10a2C, the third signal processor 10a3, the first signal processor 10a4, an evaluation function unit 10a5, the second signal processor 10a6, a central processor 10a7F, the second numerical processor 10a8E, the first numerical processor 10a9E, and the third numerical processor 10a10. The simulation instruction converter 10a1, the third signal processor 10a3, the first signal processor 10a4, evaluation function unit 10a5, the second signal processor 10a6, the second numerical processor 10a8E, and the first numerical processor 10a9E are those described above. Hereinafter, overlapping description thereof is omitted.

Figure 77:
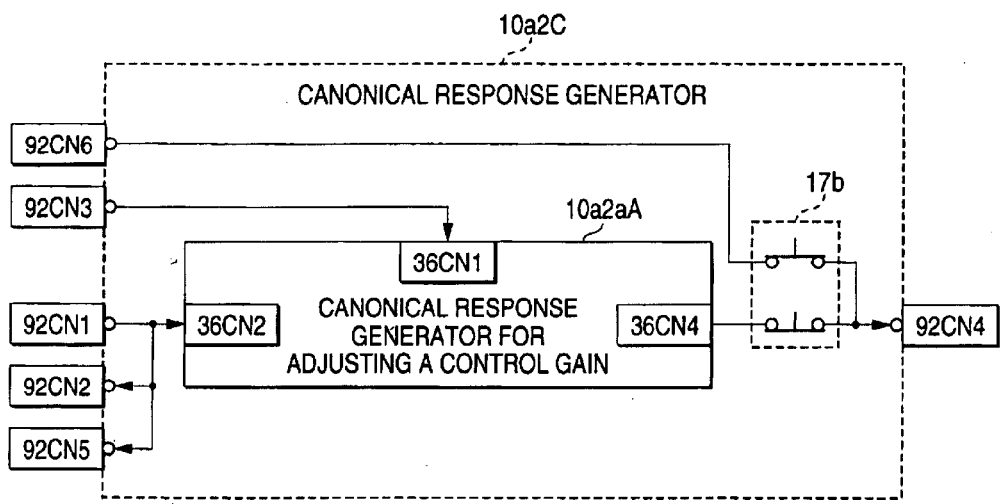
FIG. 77 is a block diagram showing a canonical response generator according to the twelfth embodiment of the invention.

FIG. 77 is a block diagram showing a detailed construction of the above-described canonical response generator 10a2C. In FIG. 77, the canonical response generator 10a2C is composed of a canonical response generator 10a2aA for adjusting a control gain, and a contact set 17b of the relay 17. The canonical response generator 10a2aA for adjusting the control gain and relay 17 are those described above. Hereinafter, overlapping description thereof is omitted.

Figure 78:
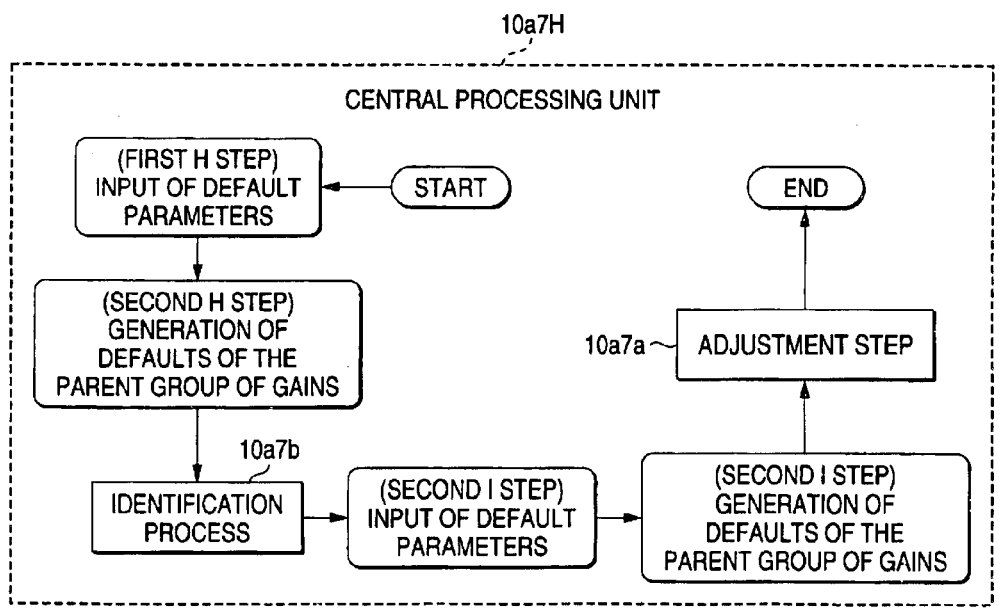
FIG. 78 is a flow chart showing the central processing unit according to the twelfth embodiment of the invention.
Figure 79:
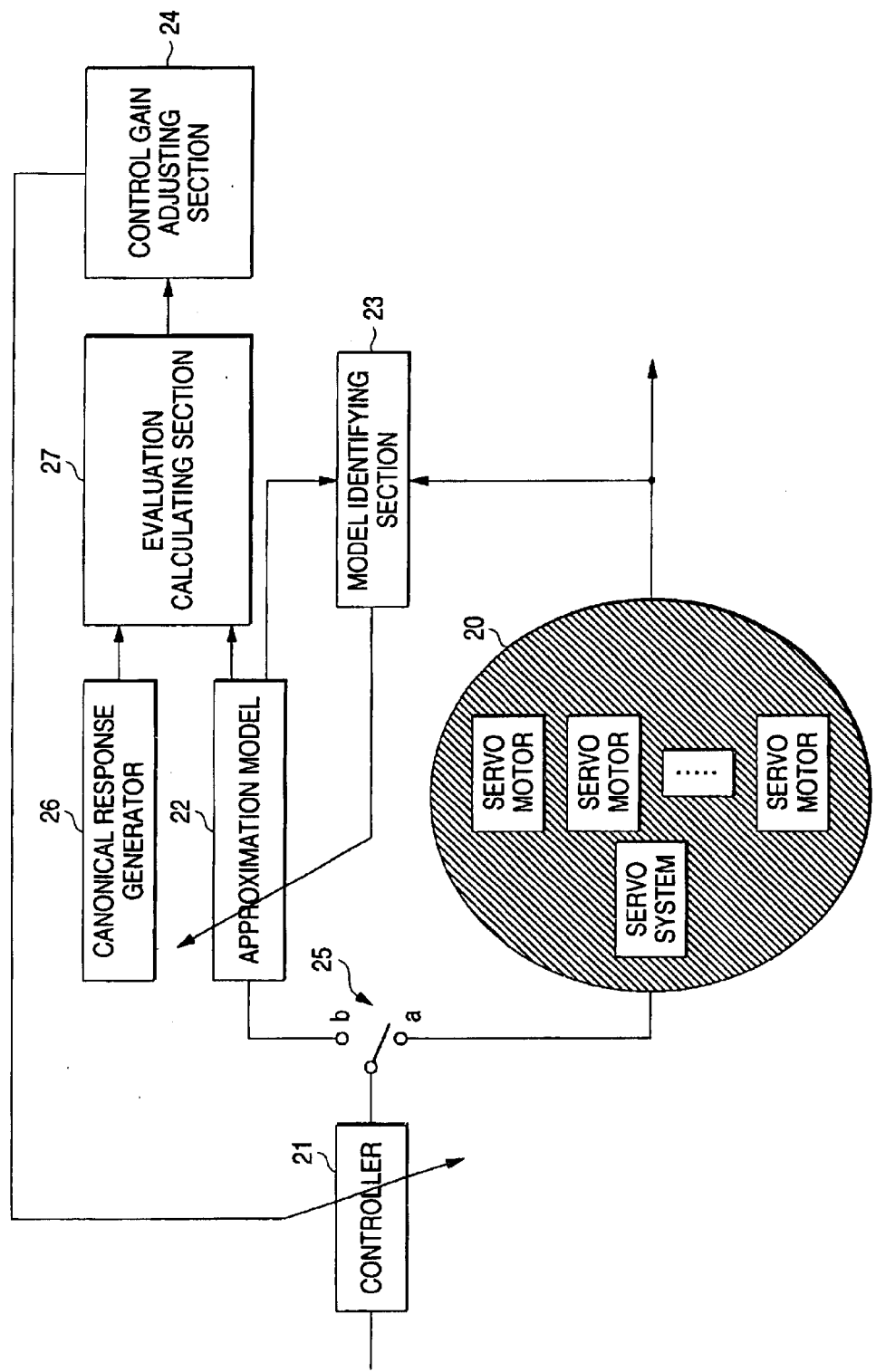
FIG. 79 is a block diagram showing a prior art controlling apparatus.

FIG. 78 is a flow chart showing a detailed construction of the above-described central processor 10a7G. In FIG. 78, the above-described central processor 10a7G is composed of the first H step, the second H step, an identification step 10a7b, the first I step, the second I step, and adjustment step 10a7a. The adjustment step 10a7a and identification step 10a7b are those described above. Hereinafter, overlapping description thereof is omitted.

Next, a description is given of actions of the twelfth embodiment with reference to FIG. 73 through FIG. 78. First, the 2-inertia numerical model 9H carries out an approximation expression of the input and output characteristics of the above-described machine system. In the 2-inertia numerical model 9H shown in FIG. 73, a simulation speed signal is obtained by the four integrators, one adder and three coefficient units, which are shown in FIG. 73, with respect to the simulation torque signal that is inputted through a connector 89CN, and is outputted through a connector 89CN2. However, respective coefficients of the respective coefficient units are renewed by renewing numerical gains that are inputted through a connector 89CN4.

In the evaluation portion 10G shown in FIG. 75, the real speed instruction and simulation speed signal that are inputted through connectors 90CN1 and 90CN5 are inputted into connectors 91CN1 and 91CN5 of the upper-grade controller 10aG. The real speed signal that is inputted through a connector 90CN8 is inputted into a connector 91CN10 of the upper-grade controller 10aG. The first simulation speed instruction signal is obtained from a connector 91CN3 of the upper-grade controller 10aG by the upper-grade controller 10aG and optimization adjuster 10b and is outputted from a connector 90CN3. The real speed gain, real integration gain and real compensation gain are obtained from a connector 91CN2 of the upper-grade controller 10aG, and are outputted from a connector 90CN2. The simulation speed gain, simulation integration gain and simulation compensation gain are obtained from a connector 91CN4 of the upper-grade controller 10aG and are outputted through a connector 90CN4. The first speed instruction signal is obtained from a connector 91CN9 of the upper-grade controller 10aG and is outputted from a connector 90CN7.

In the upper-grade controller 10aG shown in FIG. 76, the real speed instruction that is inputted through a connector 91CN1 is inputted into a connector 81CN1 of the simulation instruction converter 10a1. The simulation speed signal that is inputted through a connector 91CN5 is inputted into a connector 13CN1 of the second signal processor 10a6. Child groups of gains that are inputted through a connector 91CN6 are inputted into a connector 93CN10 of the central processor 10a7G. The real speed signal that is inputted through a connector 91CN10 is inputted into a connector 92CN6 of the canonical response generator 10a2C. By the simulation instruction converter 10a1, canonical response generator 10a2C, the third signal processor 10a3, the first signal processor 10a4, evaluation function unit 10a5, the second signal processor 10a6, central processor 10a7D, the second numerical processor 10a8E, the first numerical processor 10a9E and the third numerical processor 10a10, the first simulation speed instruction signal that is obtained from a connector 10CN1 of the third signal processor 10a3 is outputted from a connector 91CN3. The evaluation value array and parent groups of gains, which are obtained from a connector 93CN9 of the central processor 10a7G, are outputted from a connector 91CN7, and the real speed gain, real integration gain and real compensation gain, which are obtained from a connector 80CM2 of the first numerical processor 10a9E, are outputted from a connector 91CN2. The simulation speed gain, simulation integration gain and simulation compensation gain, which are obtained from a connector 81CN2 of the second numerical processor 10a8E, are outputted from a connector 91CN4. The numerical gain, which is obtained from a connector 87CN2 of the third numerical processor 10a10, outputted from a connector 91CN8, and the first real speed instruction signal, which is obtained from a connector 92CN5 of the canonical response generator 10a2C is outputted from a connector 91CN9.

In the canonical response generator 10a2C shown in FIG. 77, the second simulation speed instruction signal that is inputted through a connector 91CN1 is inputted into a connector 36CN2 of the canonical response generator 10a2aA for adjusting a control gain. The real speed signal that is inputted through a connector 92CN6 is inputted into a contact set 17b of the relay 17. Depending on situations of the canonical response generator 10a2aA for adjustment and the contact set 17b, the canonical response signal is obtained from an output of the contact set 17b and is outputted from a connector 92CN4. The canonical response generator 10a2aA for adjusting the control gain is one that is described above. Hereinafter, overlapping description thereof is omitted.

In the central processor 10a7G shown in FIG. 78, the first H step, the second H step, identification step 10a7b, the first I step, the second I step and adjustment step 10a7a are carried out in the sequence described in FIG. 69.

The first H step establishes a simulation speed instruction array, canonical gain, first size array, second size array, third size array, number of child gains of child groups of gains, number of parents of parent groups of gains, and number of generations. However, The parent gains of the parent groups of gains are those that are established so as to become a numerical gain array including coefficients of the respective coefficient units of the above-described 2-inertia numerical model 9H.

The second H step initializes the parent groups of gains at random, and codes the parent groups of gains.

The first I step establishes a simulation speed instruction array, a canonical gain, the first size array, the second size array, the third size array, number of child gains of child groups of gains, number of parent gains of parent group of gains, and number of generations. However, the parent gains of the parent groups of gains are those that are established so as to become a gain array including a speed gain, integration gain, and compensation gain. The compensation gain is one that is established so as to include a coefficient of a compensation unit and switching conditions.

The second I step initializes the parent groups of gains at random and codes the parent groups of gains.

Industrial Applicability

As described above, according to aspects described in claims 1 through 3 of the invention, by adding a simulation PID controlling portion 8 that has the same structure as that of a real PID controlling portion 7, an evaluation portion 10 and a 2-inertia numerical model 9 that carries out an approximation calculation of the above-described machine system 12 to the real controlling portion 18 consisting of an observation device 4 and a real PID controlling portion 7, the following effect, which can automatically and optimally adjust the PID control gain at a high speed, can brought about in PID control for positioning, which is provided with position and speed metering devices.

According to as aspect described in claim 4 of the invention, by adding a simulation PID controlling portion 8A that has the same structure as that of a real PID controlling portion 7A, an evaluation portion 10 and a 2-inertia numerical model 9A that carries out an approximation calculation of the above-described machine system 12 to the real controlling portion 18A consisting of an observation device 4A and a real PID controlling portion 7A, the following effect, which can automatically and optimally adjust the PID control gain at a high speed, can brought about in PID control for positioning, which is provided with a position metering device.

According to an aspect described in claim 5 of the invention, by adding a simulation PI controlling portion 8B that has the same structure as that of a real PI controlling portion 7B, an evaluation portion 10 and a 2-inertia numerical model 9B that carries out an approximation calculation of the above-described machine system 12 to the real controlling portion 18B consisting of an observation device 41 and a real PI controlling portion 7B, the following effect, which can automatically and optimally adjust the PI control gain at a high speed, can brought about in PI control for determining the speed, which is provided with a speed metering device.

According to an aspect described in claim 6 of the invention, by adding a simulation controlling portion 19C, which consists of a simulation PID controlling portion 8 having the same structure as that of the real controlling portion 18C and a simulation compensator 14, an evaluation portion 10B, and a 2-inertia numerical model 9 that carries out an approximation calculation of the above-described machine system 12 to the real controlling portion 18C consisting of an observation device 4, a real PID controlling portion 7 and a real compensator 13, the following effect, which can automatically and optimally adjust the PID control gain and compensator gain at a high speed, can be brought about in PID control provided with a positioning compensator, which is provided with position and speed metering devices.

According to an aspect described in claim 7 of the invention, by adding a simulation controlling portion 19D, which consists of a simulation PID controlling portion 8A having the same structure as that of the real controlling portion 18D and a simulation compensator 14, an evaluation portion 10B, and a 2-inertia numerical model 9A that carries out an approximation calculation of the above-described machine system 12 to the real controlling portion 18D consisting of an observation device 4A, a real PID controlling portion 7A and a real compensator 13, the following effect, which can automatically and optimally adjust the PID control gain and compensator gain at a high speed, can be brought about in PID control provided with a positioning compensator, which is provided with a position metering devices.

According to an aspect described in claim 8 of the invention, by adding a simulation controlling portion 19E, which consists of a simulation PI controlling portion 8B having the same structure as that of the real controlling portion 18E and a simulation compensator 14A, an evaluation portion 10B, and a 2-inertia numerical model 9B that carries out an approximation calculation of the above-described machine system 12 to the real controlling portion 18E consisting of an observation device 4B, a real PI controlling portion 7B and a real compensator 13A, the following effect, which can automatically and optimally adjust the PI control gain and compensator gain at a high speed, can be brought about in PI control provided with a speed-determining compensator, which is provided with a speed metering device.

According to an aspect described in claim 9 of the invention, by adding a simulation controlling portion 19F, which consists of a simulation PID controlling portion 8 having the same structure as that of the real controlling portion 18F and a simulation compensator 14B, an evaluation portion 10D, and a 2-inertia numerical model 9C that carries out an approximation calculation of the above-described machine system 12 to the real controlling portion 18F consisting of an observation device 4, a real PID controlling portion 7 and a real compensator 13B, the following effect, which can automatically and optimally adjust the PID control gain, the type and gain of a compensator at a high speed, can be brought about in PID control provided with a positioning compensator, which is provided with position and speed metering devices.

According to an aspect described in claim 10 of the invention, by adding a simulation controlling portion 19G, which consists of a simulation PID controlling portion 8A having the same structure as that of the real controlling portion 18G and a simulation compensator 14B, an evaluation portion 10D, and a 2-inertia numerical model 9D that carries out an approximation calculation of the above-described machine system 12 to the real controlling portion 18G consisting of an observation device 4A, a real PID controlling portion 7A and a real compensator 13B, the following effect, which can automatically and optimally adjust the PID control gain, the type and gain of a compensator at a high speed, can be brought about in PID control provided with a positioning compensator, which is provided with a position metering device.

According to an aspect described in claim 11 of the invention, by adding a simulation controlling portion 19H, which consists of a simulation PI controlling portion 8B having the same structure as that of the real controlling portion 18H and a simulation compensator 14C, an evaluation portion 10E, and a 2-inertia numerical model 9E that carries out an approximation calculation of the above-described machine system 12 to the real controlling portion 18H consisting of an observation device 4B, a real PI controlling portion 7B and a real compensator 13C, the following effect, which can automatically and optimally adjust the PI control gain, the type and gain of a compensator at a high speed, can be brought about in PI control provided with a speed-determining compensator, which is provided with a speed metering device.

According to aspects described in claims 12 and 13 of the invention, by adding a simulation controlling portion 19F, which consists of a simulation PID controlling portion 8 having the same structure as that of the real controlling portion 18F and a simulation compensator 14B, an evaluation portion 10F, and a 2-inertia numerical model 9F that carries out an approximation calculation of the above-described machine system 12 to the real controlling portion 18F consisting of an observation device 4, a real PID controlling portion 7 and a real compensator 13B, the following effect, which can automatically and optimally identify parameters in the above-described machine system 12 and adjust the PID control gain, the type and gain of a compensator at a high speed, can be brought about in PID control provided with a positioning compensator, which is provided with position and speed metering devices.

According to an aspect described in claim 14 of the invention, by adding a simulation controlling portion 19G, which consists of a simulation PID controlling portion 8A having the same structure as that of the real controlling portion 18G and a simulation compensator 14B, an evaluation portion 10G, and a 2-inertia numerical model 9G that carries out an approximation calculation of the above-described machine system 12 to the real controlling portion 18G consisting of an observation device 4A, a real PID controlling portion 7A and a real compensator 13B, the following effect, which can automatically and optimally identify parameters in the above-described machine system 12 and adjust the PID control gain, the type and gain of a compensator at a high speed, can be brought about in PID control provided with a positioning compensator, which is provided with a position metering device.

According to an aspect described in claim 15 of the invention, by adding a simulation controlling portion 19H, which consists of a simulation PI controlling portion 8B having the same structure as that of the real controlling portion 18H and a simulation compensator 14C, an evaluation portion 10H, and a 2-inertia numerical model 9H that carries out an approximation calculation of the above-described machine system 12 to the real controlling portion 18H consisting of an observation device 4B, a real PI controlling portion 7B and a real compensator 13C, the following effect, which can automatically and optimally identify parameters in the above-described machine system 12 and adjust the PI control gain, the type and gain of a compensator at a high speed, can be brought about in PI control provided with a speed-determining compensator, which is provided with a speed metering device.

What is claimed is:

1. In a machine system, an apparatus for controlling an electric motor, comprising:
    a simulator section further comprising:
        a position instruction generator for providing a real position instruction;
        a numerical model that simulates said machine system and provides a simulation quantity of state on the basis of a simulation torque signal;
        a simulation controller that provides said numerical model with the simulation torque signal on the basis of said simulation quantity of state, a simulation control parameter and a first simulation position instruction signal; and
        an evaluation section that provides a real control parameter, a simulation control parameter, and a first simulation position signal on the basis of said real position instruction and said simulation quantity of state; and
    a real controller section that provides a real torque signal to an electric motor, on the basis of said real position instruction, said real control parameter and a real quantity of state observable from a real system.

2. In a machine system, an apparatus for controlling an electric motor, comprising:
    a simulator section further comprising:
    a position instruction generator for providing a real position instruction;

a numerical model that simulates said machine system and provides a simulation quantity of state on the basis of a simulation torque signal;

a simulation controller that provides said numerical model with the simulation torque signal on the basis of said simulation quantity of state, a simulation control parameter and a first simulation position instruction signal, and an evaluation section that provides a real control parameter, a simulation control parameter, and a first simulation position signal on the basis of said real position instruction and said simulation quantity of state by a means of a genetic algorithm; and a real controller section that provides a real torque signal to an electric motor, on the basis of said real position instruction, said real control parameter and a real quantity of state observable from a real system.

3. The apparatus for controlling an electric motor as set forth in claim 1, wherein said apparatus is provided with a means for supplying control parameters, which are obtained by the evaluation unit of said simulation section to the real control section after said simulation section is driven prior to a real operation and a simulation evaluation function for evaluating the behaviors of said numerical model satisfies the initial conditions established in advance.

4. The apparatus for controlling an electric motor as set forth in claim 3, wherein said apparatus is provided with said numerical model that provides a simulation speed signal and a simulation position signal based on a simulation torque with respect to a given real position instruction; a simulation PI controlling section that provides a simulation torque instruction to said numerical model on the basis of the simulation speed signal and simulation position signal of said numerical model; and a real PI controlling section that provides a real torque signal on the basis of said real position instruction, real position signal and real speed signal.

5. The apparatus for controlling an electric motor as set forth in claim 3, wherein said apparatus is provided with a numerical model that provides a simulation position signal on the basis of a simulation torque instruction with a respect to a given real position instruction; a simulation PID controlling section that provides said numerical model with said simulation torque instruction on the basis of a simulation position signal of said numerical model; and a real PID controlling section that provides a real torque signal on the basis of said real position instruction and said real position signal.

6. The apparatus for controlling an electric motor as set forth in claim 3, wherein said apparatus is provided with a numerical model that provides a simulation speed signal on the basis of a simulation torque instruction with respect to a given real speed instruction; a simulation PID controlling section that provides said numerical model with a simulation torque instruction on the basis of said simulation speed signal of said numerical model; and a real PI controlling section that provides a real torque signal on the basis of said real speed instruction and real speed signal.

7. The apparatus for controlling an electric motor as set forth in claim 4, wherein said apparatus is provided with a simulation controlling section consisting of a simulation PID controlling section, which provides said numerical model with a simulation torque instruction on the basis of the simulation speed signal and simulation position signal of said numerical model, and a simulation compensating section; and a real controlling section consisting of a real PID controlling section that provides a real torque signal based on the real position instruction, real position signal and real speed signal, and a real compensating section.

8. The apparatus for controlling an electric motor as set forth in claim 5, wherein said apparatus is provided with a simulation controlling section consisting of a simulation PID controlling section, which provides said numerical model with a simulation torque instruction on the basis of the simulation position signal of said numerical model, and a simulation compensating section; and a real controlling section consisting of a real PID controlling section, which provides a real torque on the basis of the real position instruction and real position signal; and a real controlling section.

9. The apparatus for controlling an electric motor as set forth in claim 6, wherein said apparatus is provided with a real controlling section consisting of a simulation PI controlling section that provides said numerical model with a simulation torque instruction on the basis of a simulation speed signal of said numerical model, a simulation compensating section, a real PI controlling section that provides a real torque signal on the basis of a real speed instruction and said real speed signal, and a real compensating section.

10. The apparatus for controlling an electric motor as set forth in claim 4, wherein said apparatus is provided with a simulation controlling section that is constructed of a simulation PID controlling section, which provides said numerical model with a simulation torque instruction on the basis of a simulation speed signal of said numerical model and a simulation position signal thereof, and a simulation controlling section consisting of a plurality of types of simulation compensators; and a real controlling section that is constructed of a real PID controlling section, which provides a real torque signal on the basis of a real position instruction, said real position signal and said real speed signal, and a real compensating section consisting of a plurality of types of said real compensators.

11. The apparatus for controlling an electric motor as set forth in claim 5, wherein said apparatus is provided with a simulation controlling section that is constructed of a simulation PID controlling section, which provides said numerical model with a simulation torque instruction on the basis of a simulation position signal of said numerical model, and a simulation compensating section consisting of a plurality of types of simulation compensators; and a real controlling section that is constructed of a real PID controlling section, which provides a real torque signal on the basis of a real position instruction and said real position signal, and a real compensating section consisting of a plurality of real compensators.

12. The apparatus for controlling an electric motor as set forth in claim 6, wherein said apparatus is provided with a simulation controlling section that is constructed of a simulation PI controlling section, which provides said numerical model with a simulation torque instruction on the basis of a simulation speed signal of said numerical model, and a simulation compensating section consisting of a plurality of types of simulation compensators; and a real controlling section that is constructed of a real PI controlling section, which provides a real torque signal on the basis of a real speed instruction and said real speed signal, and a real compensating section consisting of a plurality of real compensators.

13. The apparatus for controlling an electric motor as set forth in claim 1, wherein said apparatus comprise a numerical model by using an observable quantity of state, which is obtained by driving the real system based on the initial controlling parameters initially established by the real controlling section, and an initial torque instruction given to a real driving section in the initial state where said numerical model is constituted; driving the real system after the controlling parameters are provided; re-determining said numerical model by, where the behaviors of the real system do not satisfy the on-real running evaluation function established in advance, using the real running torque instruction at that time and the observable quantity of real running state of the real system; and re-starting the simulator section to re-determine the controlling parameters in said evaluation section.

14. The apparatus for controlling an electric motor as set forth in claim 13, wherein said apparatus includes a simulation controlling section that is constructed of a simulation PID controlling section, which provides said numerical model with a simulation torque instruction on the basis of a simulation speed signal of said numerical model and simulation position signal thereof, and a simulation compensating section consisting of a plurality of types of simulation compensators; and a real controlling section that is constructed of a real PID controlling section, which provides a real torque signal on the basis of a real position instruction, said real position signal and said real speed signal, and a real compensating section consisting of a plurality of real compensators.

15. The apparatus for controlling an electric motor as set forth in claim 13, wherein said apparatus includes a simulation controlling section that is constructed of a simulation PID controlling section, which provides said numerical model with a simulation torque instruction on the basis of a simulation position signal of said numerical model, and a simulation compensating section consisting of a plurality of types of simulation compensators; and a real controlling section that is constructed of a real PID controlling section, which provides a real torque signal on the basis of a real position instruction and said real position signal, and a real compensating section consisting of a plurality of real compensators.

16. The apparatus for controlling an electric motor as set forth in claim 13, wherein said apparatus includes a simulation controlling section that is constructed of a simulation PI controlling section, which provides said numerical model with a simulation torque instruction on the basis of a simulation speed signal of said numerical model, and a simulation compensating section consisting of a plurality of types of simulation compensators; and a real controlling section that is constructed of a real PI controlling section, which provides a real torque signal on the basis of a real speed instruction and said real speed signal, and a real compensating section consisting of a plurality of real compensators.

* * * * *